(12) United States Patent
Usui et al.

(10) Patent No.: US 7,251,996 B2
(45) Date of Patent: *Aug. 7, 2007

(54) LIQUID DETECTING PIEZOELECTRIC DEVICE, LIQUID CONTAINER AND MOUNTING MODULE MEMBER

(75) Inventors: Minoru Usui, Nagano (JP); Kenji Tsukada, Nagano (JP); Munehide Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/794,393

(22) Filed: Mar. 8, 2004

(65) Prior Publication Data

US 2004/0226361 A1 Nov. 18, 2004

Related U.S. Application Data

(63) Continuation of application No. 10/191,423, filed on Jul. 10, 2002, now Pat. No. 6,745,626.

(30) Foreign Application Priority Data

| May 20, 1999 | (JP) | ................................. 11-139683 |
| May 27, 1999 | (JP) | ................................. 11-147538 |
| Sep. 10, 1999 | (JP) | ................................. 11-256522 |

(51) Int. Cl.
*G01F 23/00* (2006.01)

(52) U.S. Cl. .................... 73/290 R; 73/1.73; 73/53.04; 73/301

(58) Field of Classification Search ............. 73/290 R, 73/1.73, 53.04, 301, 1.15, 1.82, 1.83, 861.02, 73/866.02, 290 V, 866.2, 53.06, 54.01, 1.4, 73/1.02, 1.48, 620, 861.01; 340/620

See application file for complete search history.

(56) References Cited

U.S. PATENT DOCUMENTS

| 3,110,890 A | 11/1963 | Westcott et al. |
| 3,220,258 A | 11/1965 | Rod |

(Continued)

FOREIGN PATENT DOCUMENTS

EP 0 553 535 8/1993

(Continued)

OTHER PUBLICATIONS

Patent Abstracts of Japan, 02034353, vol. 014, No. 186.

(Continued)

*Primary Examiner*—Hezron Williams
*Assistant Examiner*—Jaques M. Saint-Surin
(74) *Attorney, Agent, or Firm*—Sughrue Mion, PLLC

(57) ABSTRACT

A liquid detection device attached on a liquid container for detecting a liquid consumption status of the liquid contained in the liquid container, the liquid detection device including a vibrating section symmetrical about a center thereof, and at least one electrode electrically connecting with said vibrating section.

67 Claims, 55 Drawing Sheets

U.S. PATENT DOCUMENTS

| | | | |
|---|---|---|---|
| 3,703,693 A | 11/1972 | Levinn |
| 3,832,900 A | 9/1974 | Ross |
| 3,889,247 A | 6/1975 | Voll |
| 4,008,612 A | 2/1977 | Nagaoka et al. |
| 4,107,994 A | 8/1978 | Sogo |
| 4,329,875 A | 5/1982 | Nolting et al. |
| 4,403,227 A | 9/1983 | Bertschy et al. |
| 4,419,677 A | 12/1983 | Kasugayama et al. |
| 4,479,982 A | 10/1984 | Nilsson et al. |
| 4,570,482 A | 2/1986 | Murata et al. |
| 4,594,891 A | 6/1986 | Benz et al. |
| 4,604,633 A | 8/1986 | Kimura et al. |
| 4,636,814 A | 1/1987 | Terasawa |
| 4,703,652 A | 11/1987 | Itoh et al. |
| 4,770,038 A | 9/1988 | Zuckerwar et al. |
| 4,796,782 A | 1/1989 | Wales et al. |
| 4,811,595 A | 3/1989 | Marciniak et al. |
| 4,853,718 A | 8/1989 | El Hatem et al. |
| 4,984,449 A | 1/1991 | Caldwell et al. |
| 4,984,457 A | 1/1991 | Morris |
| 5,035,140 A | 7/1991 | Daniels et al. |
| 5,068,836 A | 11/1991 | Steel |
| 5,179,389 A | 1/1993 | Arai et al. |
| 5,233,369 A | 8/1993 | Carlotta et al. |
| 5,247,832 A | 9/1993 | Umezawa et al. |
| 5,315,317 A | 5/1994 | Terasawa et al. |
| 5,353,631 A | 10/1994 | Woringer et al. |
| 5,410,518 A | 4/1995 | Birkett |
| 5,463,377 A | 10/1995 | Kronberg |
| 5,473,353 A | 12/1995 | Soucemarianadin et al. |
| 5,524,486 A | 6/1996 | Hermann |
| 5,583,544 A | 12/1996 | Stamer et al. |
| 5,586,085 A | 12/1996 | Lichte |
| 5,616,929 A | 4/1997 | Hara |
| 5,619,238 A | 4/1997 | Higuma et al. |
| 5,675,367 A | 10/1997 | Scheffelin et al. |
| 5,689,288 A | 11/1997 | Wimmer et al. |
| 5,697,248 A | 12/1997 | Brown |
| 5,712,667 A | 1/1998 | Sato |
| 5,737,963 A | 4/1998 | Eckert et al. |
| 5,747,689 A | 5/1998 | Hampo et al. |
| 5,774,136 A | 6/1998 | Barbehenn et al. |
| 5,788,388 A | 8/1998 | Cowger et al. |
| 5,788,819 A | 8/1998 | Onishi et al. |
| 5,793,705 A | 8/1998 | Gazis et al. |
| 5,841,454 A | 11/1998 | Hall et al. |
| 5,877,997 A | 3/1999 | Fell |
| 5,949,447 A | 9/1999 | Arai et al. |
| 5,975,102 A | 11/1999 | Schalk |
| 6,003,966 A | 12/1999 | Ahn |
| 6,007,190 A | 12/1999 | Murray et al. |
| 6,012,793 A | 1/2000 | Haigo |
| 6,050,669 A | 4/2000 | Yano et al. |
| 6,044,694 A | 5/2000 | Anderson et al. |
| 6,089,686 A | 7/2000 | Thornton et al. |
| 6,089,688 A | 7/2000 | Froger et al. |
| 6,164,744 A | 12/2000 | Froger et al. |
| 6,302,527 B1 | 10/2001 | Walker |
| 6,312,074 B1 | 11/2001 | Walker |
| 6,312,106 B1 | 11/2001 | Walker |
| 6,312,115 B1 | 11/2001 | Hara et al. |
| 6,390,590 B1 | 5/2002 | Hansburg |
| 6,435,638 B1 | 8/2002 | Wilson et al. |
| 6,470,744 B1 | 10/2002 | Usui et al. |
| 6,536,861 B1 | 3/2003 | Usui et al. |
| 6,729,184 B2 * | 5/2004 | Tsukada et al. ........... 73/290 V |
| 6,745,626 B2 | 6/2004 | Usui et al. |
| 6,799,820 B1 * | 10/2004 | Usui et al. .................. 347/7 |
| 6,921,160 B2 * | 7/2005 | Tsukada ................. 347/86 |
| 2002/0012015 A1 | 1/2002 | Tsukada et al. |
| 2002/0015084 A1 | 2/2002 | Tsukada et al. |
| 2002/0105555 A1 | 8/2002 | Tsukada et al. |
| 2002/0135623 A1 | 9/2002 | Tsukada et al. |
| 2003/0117450 A1 | 6/2003 | Usui et al. |
| 2004/0168514 A1 * | 9/2004 | Tsukada et al. ........... 73/290 V |

FOREIGN PATENT DOCUMENTS

| | | |
|---|---|---|
| EP | 0 660 092 | 6/1995 |
| EP | 0 676 624 | 10/1995 |
| EP | 0 684 136 A2 | 11/1995 |
| EP | 0 684 136 A3 | 11/1995 |
| EP | 0 803 364 | 10/1997 |
| EP | 0 803 364 A3 | 10/1997 |
| EP | 0 853 236 | 7/1998 |
| EP | 0 853 236 A1 | 7/1998 |
| EP | 0 873 873 | 10/1998 |
| EP | 1 088 668 | 4/2001 |
| EP | 1 088 668 A1 | 4/2001 |
| FR | 2572519 | 5/1986 |
| GB | 2 304 898 | 3/1997 |
| GB | 2 304 898 A | 3/1997 |
| GB | 2321107 | 7/1998 |
| JP | 56-27625 | 8/1979 |
| JP | 56-59629 | 10/1979 |
| JP | 56-039413 | 4/1981 |
| JP | 57-208260 | 12/1982 |
| JP | 58-32332 | 3/1983 |
| JP | 58-201027 | 11/1983 |
| JP | 58-205820 | 11/1983 |
| JP | 59-19816 | 2/1984 |
| JP | 59-031417 | 2/1984 |
| JP | 59-47829 | 3/1984 |
| JP | 59-52422 | 4/1984 |
| JP | 59-187227 | 10/1984 |
| JP | 60-4820 | 1/1985 |
| JP | 62-95225 | 5/1987 |
| JP | 63247047 | 10/1988 |
| JP | 01-67530 | 5/1989 |
| JP | 1-70128 | 5/1989 |
| JP | 03-169642 | 7/1991 |
| JP | 03-211907 | 9/1991 |
| JP | 04135862 | 5/1992 |
| JP | 04-241505 | 8/1992 |
| JP | 05-25325 | 4/1993 |
| JP | 05-318757 | 12/1993 |
| JP | 06297726 | 10/1994 |
| JP | 7-101127 | 4/1995 |
| JP | 07-137291 | 5/1995 |
| JP | 07137276 | 5/1995 |
| JP | 8-122172 | 5/1996 |
| JP | 09-267488 | 10/1997 |
| JP | 09-286121 | 11/1997 |
| JP | 10026549 | 1/1998 |
| JP | 10-175312 | 6/1998 |
| JP | 10-305590 | 11/1998 |
| JP | 11-115201 | 4/1999 |
| JP | 11-286121 | 10/1999 |
| JP | 56-61421 | 10/2000 |
| JP | 2000318183 | 11/2000 |
| WO | WO 98/09139 | 3/1998 |
| WO | WO 98/31548 | 7/1998 |
| WO | 99/34453 | 7/1999 |
| WO | WO 99/42293 | 8/1999 |

OTHER PUBLICATIONS

Patent Abstracts of Japan, 07081290, vol. 1995, No. 06.
Patent Abstracts of Japan, 11020186, Apr. 30, 1999, vol. 1999, No. 4.
Patent Abstracts of Japan, vol. 1995, No. 08, Sep. 29, 1995 &JP07137276, May 30, 1995 Abstract.
Patent Abstracts of Japan, vol. 1998, No. 05, Apr. 30, 1998 &JP10026549, Jan. 27, 1998 Abstract.

Patent Abstracts of Japan, vol. 2000, No. 14, Mar. 5, 2001 & JP 2000318183, Nov. 21, 2000 Abstract.
U.S. Appl. No. 09/572,849, filed May 18, 2000, Minoru Usui et al.
U.S. Appl. No. 09/573,335, filed May 18, 2000, Minoru Usui et al.
U.S. Appl. No. 09/574,015, filed May 19, 2000, Minoru Usui et al.
U.S. Appl. No. 10/019,682, filed Jan. 4, 2003, Kenji Tsukada et al.
U.S. Appl. No. 09/574,012, filed May 19, 2000, Usui et al.
U.S. Appl. No. 10/243,730, filed Sep. 16, 2002, Usui et al.

* cited by examiner

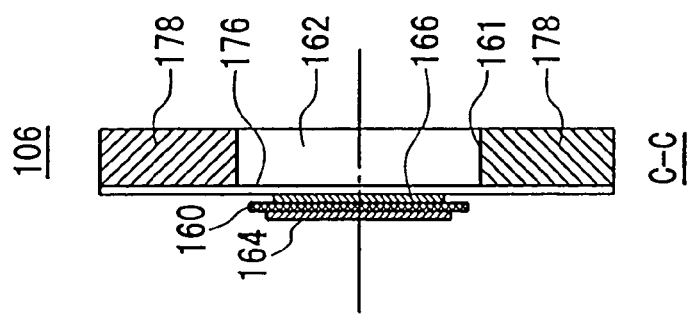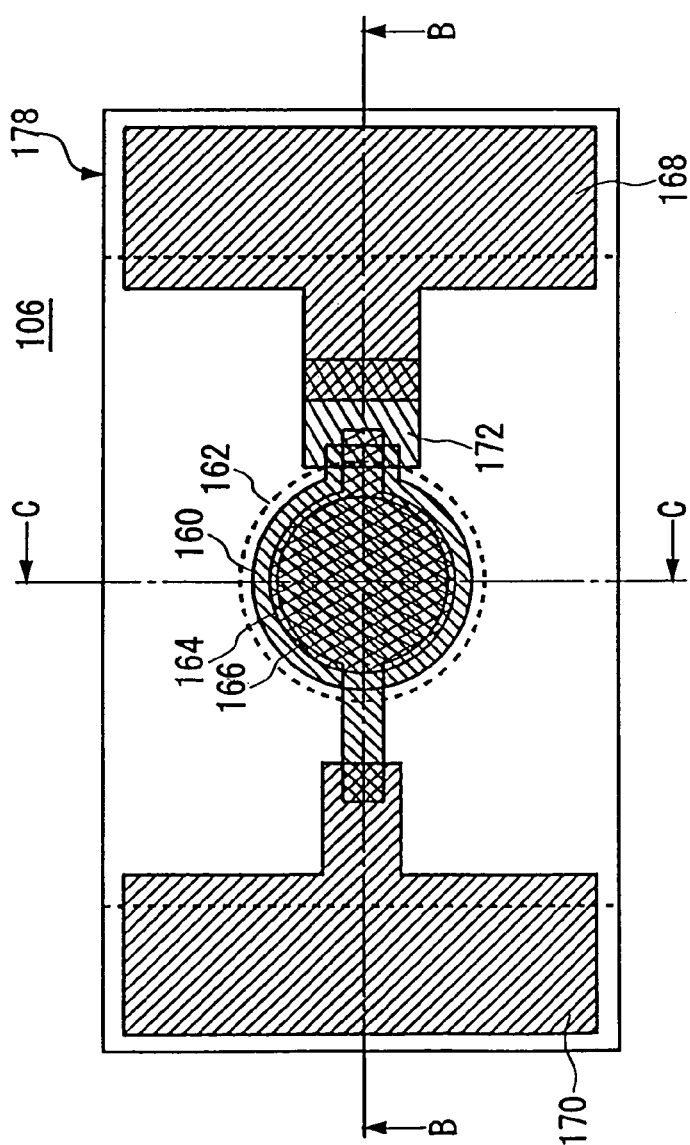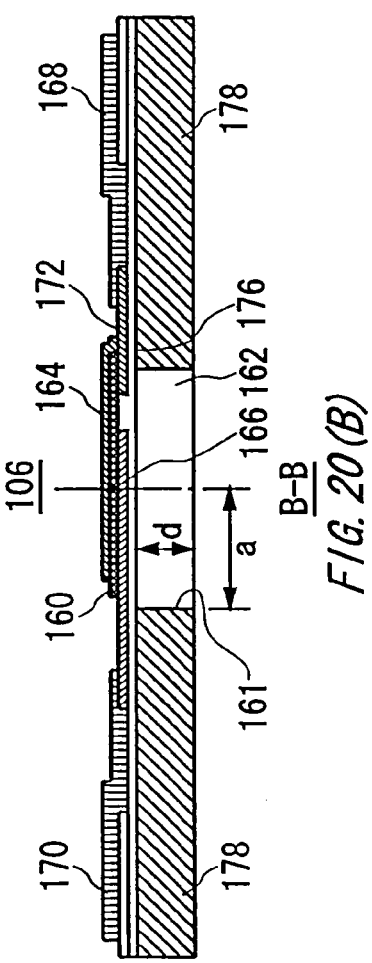
FIG. 20(A)
FIG. 20(B)
FIG. 20(C)

670

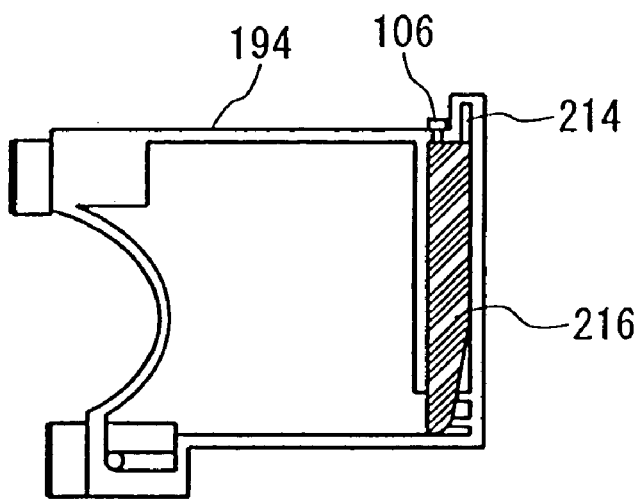
FIG. 46(A)
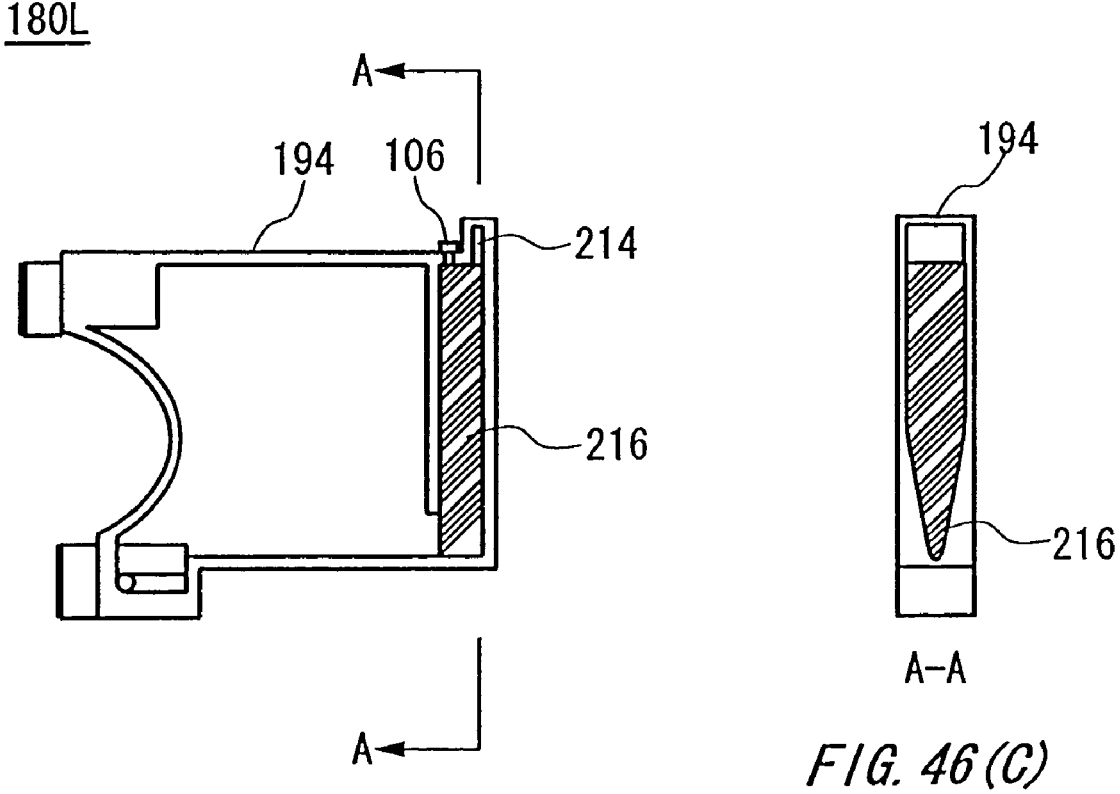
FIG. 46(B)
FIG. 46(C)

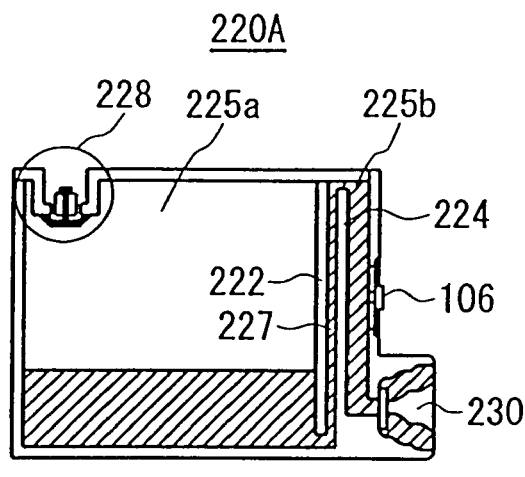
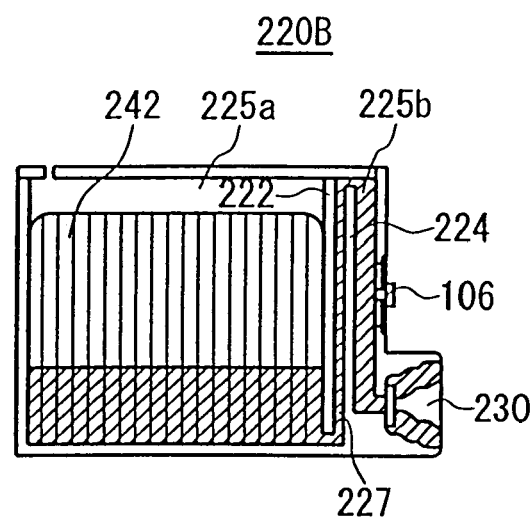
FIG. 47(A)      FIG. 47(B)
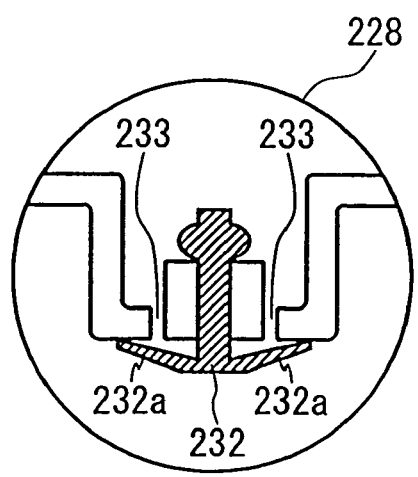
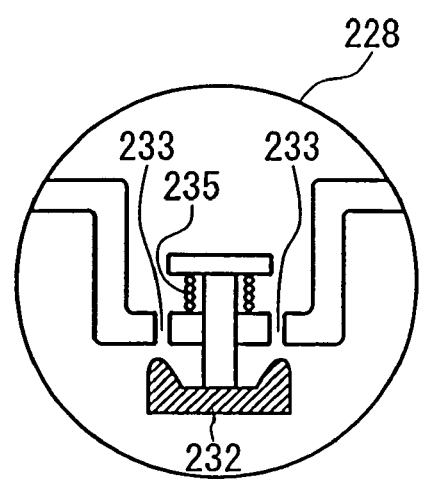
FIG. 47(C)      FIG. 47(D)

LIQUID DETECTING PIEZOELECTRIC DEVICE, LIQUID CONTAINER AND MOUNTING MODULE MEMBER

This is a continuation of application Ser. No. 10/191,423 filed Jul. 10, 2002, now U.S. Pat. No. 6,745,626; the disclosure of which is incorporated herein by reference.

The present patent application claims priority from Japanese patent applications Nos. H. 11-139683 filed on May 20, 1999, H. 11-147538 filed on May 27, 1999 and H. 11-256522 filed on Sep. 10, 1999, the contents of which are incorporated herein by reference.

BACKGROUND OF THE INVENTION

1. Field of the Invention

The present invention relates to a liquid container equipped with a piezoelectric apparatus therein which detects the consumption state of liquid inside a liquid container which houses the liquid, by means of detecting change of the level of the acoustic impedance, especially detecting the change of the resonant frequency. More particularly, the present invention relates to the piezoelectric apparatus detecting ink consumption in an ink cartridge and a mounting module member thereof, which are provided in the ink cartridge for use with an ink-jet recording apparatus. The ink-jet recording apparatus performs the printing operation by discharging ink droplets from a nozzle opening, in a manner such that ink in a pressure generating chamber is compressed by a pressure generating means corresponding to printing data.

2. Description of the Related Art

An ink cartridge mounted on an ink-jet type recording apparatus is taken as an example of a liquid container and is described below. In general, an ink-jet recording apparatus comprises: a carriage equipped with an ink-jet type recording head comprised of a pressure generating means which compresses a pressure generating chamber and a nozzle opening which discharges the compressed ink from a nozzle opening in the form of ink droplets; and an ink tank which houses ink supplied to the recording head through a passage, and is structured such that the printing operation can be performed continuously. In general, the ink tank is structured as a cartridge that can be detached from the recording apparatus, so that a user can easily replace it at the time when the ink is used up.

Conventionally, as a method of controlling the ink consumption of the ink cartridge, a method is known of controlling the ink consumption by means of a calculation in which the counted number of ink droplets discharged by the recording head and the amount of ink sucked in a maintenance process of the printing head are integrated by software, and another method of controlling the ink consumption in which the time at which the ink is actually consumed is detected by directly mounting to the ink cartridge two electrodes for use in detecting the liquid surface, and so forth.

However, in the calculation-based method of controlling the ink consumption by integrating the discharged number of ink droplets and the amount of ink or the like by the software, the pressure inside the ink cartridge and the viscosity of the ink change depending on usage environment such as ambient temperature and humidity, elapsed time after an ink cartridge has been opened for use, and usage frequency at a user side. Thus, a problem is caused where a considerable error occurs between the calculated ink consumption and the actual ink consumption. Moreover, another problem is caused in which the actual amount of ink remaining is not known because once the same cartridge is removed and then mounted again, the integrated counted value is reset.

On the other hand, in the method of controlling by electrodes the time at which the ink is consumed, the remaining amount of ink can be controlled with high reliability since the actual ink consumption can be detected at one point. However, in order that the liquid surface of the ink can be detected, the ink need be conductive, so suitable types of ink for use are very limited. Moreover, a problem is caused in that a fluid-tight structure between the electrodes and the cartridge might be complicated. Moreover, since precious metal is usually used as the electrode material, which is highly conductive and erosive, manufacturing costs of the ink cartridge increases thereby. Moreover, since it is necessary to attach the two electrodes to two separate positions of the ink cartridge, the manufacturing process increases, thus causing a problem which increases the manufacturing costs.

SUMMARY OF THE INVENTION

Therefore, it is an object of the present invention to provide a liquid detecting piezoelectric device capable of reliably detecting a liquid consumption status and dispensing with a complicated sealing structure. It is an other object of the present invention to provide an ink cartridge capable of reliably detecting a liquid consumption status by use of a liquid detecting piezoelectric device and capable of dispensing with a complicated sealing structure. It is still another object of the present invention to provide a detection device capable of reliably detecting a liquid consumption status. It is still another object of the present invention to provide a mounting module for use in detecting liquid, capable of reliably detecting a liquid consumption status and capable of dispensing with a complicated sealing structure. It is still another object of the present invention to provide a liquid container capable of reliably detecting a liquid consumption status and capable of dispensing with a complicated sealing structure. These objects are achieved by combinations described in the independent claims. The dependent claims define further advantageous and exemplary combinations of the present invention.

According to an aspect of the present invention, there is provided a piezoelectric device, mounted on a liquid container, for detecting a liquid consumption status of the liquid contained in the liquid container, comprising: a vibrating section which generates vibration by deforming a piezoelectric element, wherein the vibrating section is preferably symmetrical about a center thereof.

Moreover, it is preferable that the vibrating section of the piezoelectric device is of a substantially circular shape. Moreover, the piezoelectric device comprises: a piezoelectric layer; an upper electrode provided on an upper surface of the piezoelectric layer; a lower electrode provided on a lower surface of the piezoelectric layer; and a vibrating plate having a first surface contacting the lower electrode and a second surface a part of which contacting the liquid contained in the liquid container, wherein at least part of the piezoelectric layer, the lower electrode and the vibrating plate constitute the vibrating section. Moreover, it is preferable that respective main portions of the piezoelectric layer are approximately concentrically circular with the vibrating section.

Moreover, it is preferable that the piezoelectric device further comprises a base plate having an upper surface contacting the lower surface of the vibrating plate and a lower surface contacting the liquid contained in the liquid container. It is preferable that the base plate includes a cavity which contacts and holds the liquid contained in the liquid container. It is preferable that the cavity is approximately concentrically circular with the vibrating section. Moreover, it is preferable that the deformation of the vibrating plate due to a residual vibration is greater than that of the base plate. An edge of vibration of the vibrating section locates in the vicinity of an outer periphery of the cavity. It is preferable that the piezoelectric device further comprises a mounting member having an upper surface contacting the lower surface of the vibrating plate and a lower surface facing inside the liquid container, and the mounting member has an opening corresponding to a center of the vibrating section. Moreover, preferable is the liquid container mounting the above the piezoelectric device According to another aspect of the present invention, it is preferable that a module comprises: the piezoelectric device; and a mounting structure formed integrally with the piezoelectric device for mounting the liquid detection device onto the liquid container.

The mounting structure may include a projected portion which is projected inward the liquid container, and a center of the vibrating section may be arranged on a center line of the projected portion. Moreover, the projected portion may be of a circular shape. It may further comprise a terminal which provides a drive signal to the upper electrode and lower electrode of the piezoelectric device. Moreover, preferable is the liquid container mounting the above module. Moreover, the liquid container may be an ink cartridge which houses ink supplied to an ink-jet recording apparatus.

According to another aspect of the present invention, there is provided a piezoelectric device, mounted on a liquid container, for detecting a liquid consumption status of the liquid contained in the liquid container, comprising: a vibrating section which generates vibration including: a vibrating plate whose one surface contacts the liquid in the liquid container; a lower electrode formed in other surface of the vibrating plate; a piezoelectric layer, formed on the lower electrode, which vibrates the vibrating plate by oscillation caused by piezoelectric phenomenon; an upper electrode formed on the piezoelectric layer, wherein it is preferable that the vibrating section is formed so that the piezoelectric layer covers the lower electrode and that the upper electrode covers the lower electrode and that the piezoelectric layer is protruded from the upper electrode.

Moreover, it is preferable that the piezoelectric device further comprises a base plate having an upper surface contacting the lower surface of the vibrating plate and a lower surface contacting the liquid contained in the liquid container, and that the base plate includes a cavity which contacts the liquid at a position of a vibrating portion of the vibrating plate. Moreover, it is preferable that the area of the cavity is greater than that of the lower electrode. It is preferable that the compliance of the vibrating plate due to residual vibration is greater than that of the base plate. The area of a piezoelectric layer portion generating the piezoelectric effect may be approximately same as that of the lower electrode. The respective main portions of the upper electrode, piezoelectric layer and lower electrode are preferably rectangular. The respective main portions of the upper electrode, piezoelectric layer and lower electrode may be circular. It is preferable that the cavity is substantially circular and that a ratio of a radius of the cavity to a depth thereof is greater than $3\pi/8$. It is preferable that the piezoelectric device detects the consumption status of the liquid inside the liquid container by detecting change in the acoustic impedance in the vicinity of the vibrating section. In the piezoelectric device, it is preferable that a counter electromotive force is generated by the residual vibration caused by the vibration of the piezoelectric layer and that the liquid consumption status in the liquid container is detected by detecting a change in the acoustic impedance. Moreover, preferable is the liquid container mounting the above piezoelectric device.

According to still another aspect of the present invention, there is provided a module, mounted on a liquid container, for detecting a liquid consumption status of the liquid contained in the liquid container, comprising: a piezoelectric device which detects the liquid consumption status by generating the counter electromotive force by the residual vibration which remains after vibration; a mounting structure formed integrally with the piezoelectric device, wherein the piezoelectric device comprises: a vibrating plate whose one surface contacts the liquid in the liquid container; a lower electrode formed in other surface of the vibrating plate; a piezoelectric layer formed on the lower electrode; an upper electrode formed on the piezoelectric layer, wherein it is preferable that the piezoelectric layer is formed so as to cover the lower electrode, the upper electrode covers the lower electrode and the piezoelectric layer is protruded from the upper electrode.

Moreover, the mounting structure is preferably such that the upper surface contacts the lower surface side of the vibrating, which is in contact with the liquid, the lower surface has amounting member which is in contact with the liquid in the liquid container, and the mounting member has a cavity which is in contact with the liquid at a position of a vibrating portion of the vibrating plate. Moreover, the area of the cavity is preferably larger than that of the lower electrode. It is preferable that the cavity is substantially circular and that a ratio of a radius of the cavity to a depth thereof is greater than $3\pi/8$. The mounting structure of the module may have an opening in its center and that the piezoelectric device may be arranged in the opening. Moreover, the area of the opening is preferably larger than that of a piezoelectric effect generating portion of the piezoelectric layer. Moreover, the piezoelectric device maybe provided in a detachable manner. Moreover, preferable is a liquid container in which the above module is arranged.

In a preferred embodiment, there are provided a liquid container housing the liquid, a liquid detecting device mounted to the liquid container and a mounting module therefor which are used for detecting the liquid consumption status in the liquid container. The liquid detecting device includes a piezoelectric element, and the piezoelectric element outputs a signal corresponding to the liquid consumption status by conversion between electric energy and vibration energy. The piezoelectric element is formed on a base member. In particular, an opening cavity is provided in the base member. The opening cavity is provided in a position counter to the piezoelectric element so as to communicate with an interior portion of the liquid container. It is preferable that the opening cavity be provided in a position directed toward the interior portion of the ink container so as to communicate with the interior portion of the ink container.

In the state where the liquid consumption has not yet progressed, the inside and outside of the opening cavity are filled with the liquid. On the other hand, when the liquid consumption progresses, the liquid surface is lowered and then the opening cavity is exposed. Then, an approximately fixed amount of the liquid remains in the opening cavity.

Utilizing the fact that the output signals of the piezoelectric element differ in these two states, the liquid consumption state can be suitably detected.

According to the present invention, an embodiment thereof can be designed so that erroneous detection due to undulated liquid wave caused by provision of the cavity can be avoided.

Moreover, according to the present invention, by providing the cavity the number of members to be placed between the piezoelectric element and the liquid can be reduced, or the thickness of such members can be reduced, so that the liquid consumption state can be further reliably detected.

Moreover, according to the present invention, by providing the opening cavity locally, an appropriate liquid sealing state can be realized by utilizing a surrounding base member thereof. Thereby, exposure of the piezoelectric element to the liquid can be avoided. This is particularly effective for the conductive-like liquid such as ink.

Preferably, utilizing the piezoelectric element, the liquid consumption state is detected based on the change in the acoustic impedance corresponding to the liquid consumption status. Preferably, the piezoelectric element outputs a signal indicating the residual vibration state after vibration has been applied. The residual vibration of the piezoelectric element changes depending on the surrounding liquid. For example, the residual vibration states differ between when the large amount of liquid is present and when the small amount of liquid is present. This is based on the change in the acoustic impedance according to the liquid consumption state. Thus, the liquid consumption state is detected utilizing the fact that the residual vibration state changes according to the liquid consumption state.

Here, it is to be noted that a limited amount of liquid in the close vicinity of the piezoelectric element is one that substantially affects the residual vibration. According to the present invention, by provision of the opening cavity the number of intermediate members to be placed between the piezoelectric element and the liquid can be reduced, or the thickness of such members can be reduced. Thus, the limited amount of liquid affecting the residual vibration approaches or comes in contact with the piezoelectric element. Thereby, the change of the residual vibration corresponding to the liquid consumption state becomes clearer, so that the liquid consumption state can be further reliably detected.

Moreover, the piezoelectric element may not only generate the elastic wave through the opening cavity, but also output a signal corresponding to the reflected wave which is reflected back through the opening cavity. In this case too, since the vibration is satisfactorily transferred in between the piezoelectric element and the liquid by providing the opening cavity, detection capacity can be improved. How the piezoelectric element plays a role in the course of detecting the liquid consumption state may be determined according to the specifications of the liquid container and a required measurement accuracy.

The liquid detecting device according to the present invention, may generate a detection signal indicating the residual vibration state corresponding to the liquid inside the opening cavity when the liquid comes to a state of being held inside the opening cavity in a detection-targeted predetermined liquid consumption state.

The opening cavity is preferably of a shape which holds the liquid in a predetermined liquid state. The opening cavity is preferably of a shape which still holds the liquid in the detection-targeted predetermined liquid consumption state.

The opening cavity may penetrate the base member. An intermediate member may be provided between the piezoelectric element and the base member. The intermediate member seals off the opening cavity and vibrates together with the piezoelectric element.

Preferably, the piezoelectric element includes a lower electrode formed on the base member, a piezoelectric layer formed on the lower electrode, and an upper electrode formed on the piezoelectric layer. An opening area of the opening cavity in the piezoelectric element side is set to be greater than that of the overlapped portion of the piezoelectric layer and the lower electrode.

Preferably, the depth of the cavity is set to be less than the narrowest width of a cavity opening. Preferably, the depth of the cavity is less than one third of the narrowest width of the cavity. If the cavity is of a circular shape, the opening narrowest-width will be an opening dimension (opening diameter).

Preferably, the opening cavity has a shape substantially symmetrical about the center of the piezoelectric element. Preferably, the opening cavity is of a substantially circular shape.

Preferably, an opening area of the opening cavity inside the container is set to be greater than that in the piezoelectric element side. The opening dimension in the piezoelectric element side is preferably greater than that inside the container. Configured in this manner, the opening cavity is of a shape that radiates inwardly toward the inside of the container. The peripheral surface of the opening cavity may be of a tapered shape. The peripheral surface of the opening cavity may be of a stepped shape.

A communicating groove which communicates with the opening cavity may be provided in the base member. The communicating groove being provided on the base member is provided in a portion facing the inside of the container. The communicating groove may be provided along a direction toward a supply port by which the liquid container supplies the liquid to the outside thereof.

The liquid detecting device may be formed integrally with the mounting structure for mounting to the liquid container. A module is constructed by integrating the liquid detecting device with the mounting structure.

Still another embodiment of the present invention is a liquid container equipped with the above-described liquid detecting device. The liquid container may be an ink cartridge mounted in the ink-jet recording apparatus.

Still another embodiment of the present invention is a module for use in detecting the liquid. This module includes a piezoelectric device and a mounting structure. The piezoelectric device is used for detecting the consumption state of the liquid contained in the liquid container. The mounting structure is integrated with the piezoelectric device, an the piezoelectric device is mounted to the liquid container. In the mounting structure, there is particularly provided an opening cavity.

Still another embodiment of the present invention is a liquid container which houses the liquid. Though a typical liquid container is an ink cartridge, the present invention is not limited thereto. The liquid container is equipped with a piezoelectric device used for detecting the consumption state of the liquid contained in the container.

The opening cavity may penetrate a container wall. An intermediate member may be provided between the piezoelectric device and the container wall. The intermediate member seals off the opening cavity, and vibrates together with the piezoelectric device. A concave part formed in the internal surface of the container wall may serve as the opening cavity.

A communicating groove which communicates with the opening cavity may be provide so as to face the inside of the container. The communicating groove may be provided along a direction toward a supply port by which the liquid container supplies the liquid to the outside thereof.

The piezoelectric device may be inserted into a through hole provided in the liquid container in a tightly engaged manner. The through hole may be a hole formed by that the piezoelectric device breaks through a thin portion strained in a set-up position of the container wall.

The opening cavity may be provided in the close vicinity of a liquid absorbing member provided inside the container. The liquid absorbing member may comprise porous material member.

On the other hand, a liquid absorbing member which holds the liquid may be provided inside the opening cavity. The liquid absorbing member may comprise porous material member.

The piezoelectric device may include a piezoelectric element and a base member on which the piezoelectric element is formed, and the opening cavity may be formed on the base member.

The piezoelectric device may be mounted in the form of a mounting module integrated with the mounting structure. The mounting structure is of a structure that mounts the piezoelectric device to the liquid container. The opening cavity may be provided in a front face of the inside of the container in the mounting module.

An ink tank mounted in the ink-jet recording apparatus serves as a suitable liquid container. The ink tank may be provided on a carriage to which the recording head is mounted. The ink tank may be provided in a fixed section of the ink-jet recording apparatus. The ink tank is provided in the close vicinity of the recording head, and may communicate with the replaceable ink cartridge. The ink tank includes partition members which divide the inside of the tank into a plurality of chambers, and a plurality of the piezoelectric devices may be respectively provided in a plurality of the chambers.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIGS. 20A, 20B and 20C show details of the actuator 106.

FIGS. 46A, 46B and 46C show another embodiments of the ink cartridge 180 shown in FIG. 45C.

FIGS. 47A, 47B, 47C and 47D show still another embodiment of the ink cartridge using the module 100.

DESCRIPTION OF THE PREFERRED EMBODIMENTS

Figure 1:
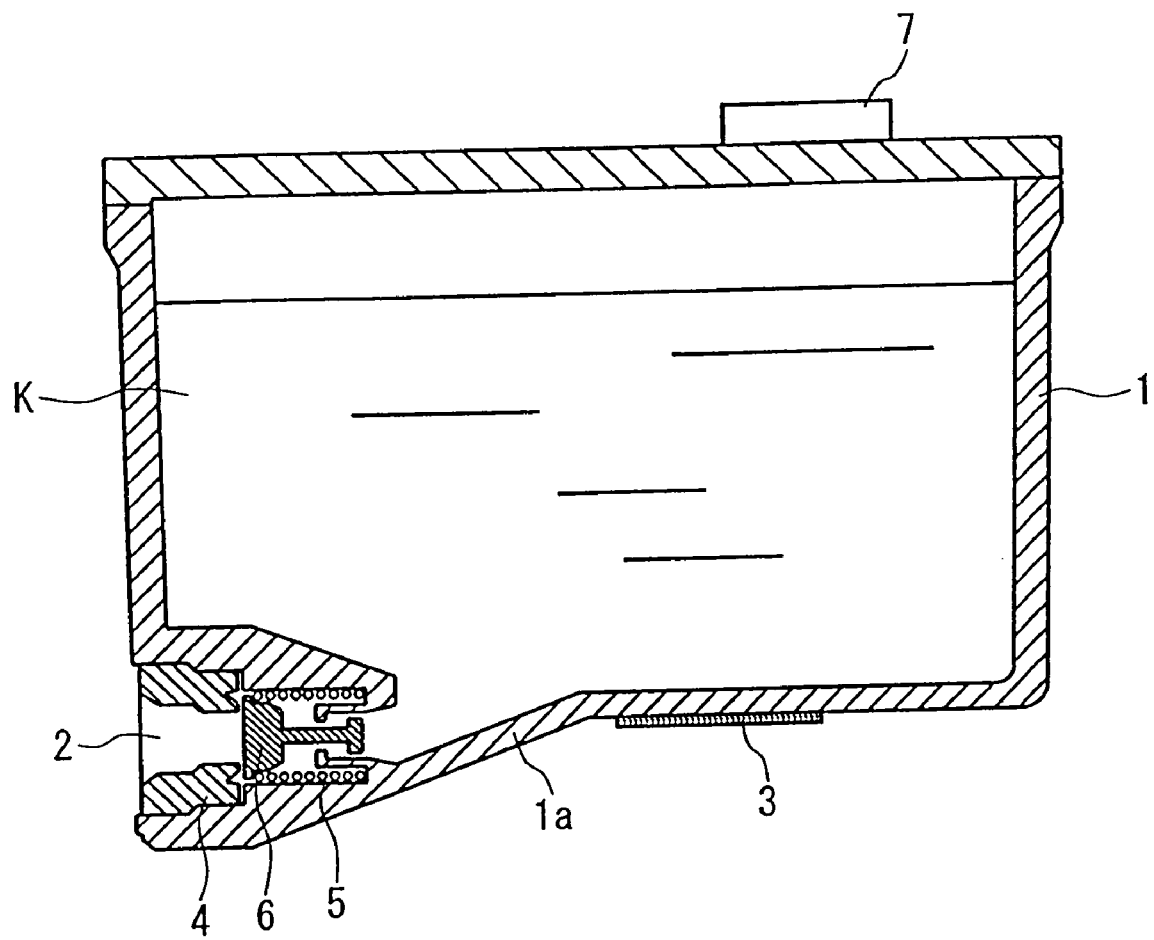
FIG. 1 shows an embodiment of an ink cartridge for use with a single color, for example, the black ink.

The invention will now be described based on the preferred embodiments, which do not intend to limit the scope of the present invention, but exemplify the invention. All of the features and the combinations thereof described in the embodiment are not necessarily essential to the invention.

The basic concept of the present invention is to detect a state of the liquid inside a liquid container by utilizing vibration phenomena. The state of the liquid includes whether or not the liquid in the liquid container is empty, amount of the liquid, level of the liquid, types of the liquid and combination of liquids. Several specific methods realizing for detection of the state of the liquid inside the liquid container utilizing vibration phenomena are considered. For example, a method is considered in which the medium and the change of its state inside the liquid container are detected in such a manner that an elastic wave generating means generates an elastic wave inside the liquid container, and then the reflected wave which is thus reflected by the liquid surface or a wall disposed counter thereto is captured. There is another method in which a change of acoustic impedance is detected by vibrating characteristics of a vibrating object. As a method utilizing the change of the acoustic impedance, a vibrating portion of a piezoelectric device or an actuator having a piezoelectric element therein is vibrated. Thereafter, a resonant frequency or an amplitude of the back electromotive force waveform is detected by measuring the back electromotive force which is caused by residual vibration which remains in the vibrating portion, so as to detect the change of the acoustic impedance. As another method utilizing the change of the acoustic impedance, the impedance characteristic or admittance characteristic of the liquid is measured by a measuring apparatus such as an impedance analyzer and a transmission circuit, so that the change of a current value or a voltage value, or the change of the current value or voltage value due to the frequency caused by the vibration given to the liquid is measured. The operational principles of the elastic wave generating means and the piezoelectric device or actuator will be described at a later stage.

In the present embodiment, the present invention is applied to technology in which to detect the state of ink consumption inside the ink container. The consumption state of the ink is detected by the piezoelectric element. The piezoelectric element outputs a signal corresponding to the ink consuming state, by conversion between electric energy and vibration energy.

As a detection principle, the acoustic impedance is utilized. Preferably, a residual vibration state after the piezoelectric element generated vibration, is detected and obtained from an output signal of the piezoelectric element. The residual vibration changes depending on the amount of ink in its periphery. This is based on the change of the acoustic impedance corresponding to the ink consumption state. Thus, the consumption state is detected by utilizing the fact that the residual vibration state changes depending on the ink consumption state.

According to another detection principle, the piezoelectric element generates the elastic wave through a cavity opening, and outputs a signal in response to the reflected wave that is reflected through the opening cavity. Thus, the change of the reflected wave in accordance with the ink consumption state is detected. How the piezoelectric element plays a role in the course of detecting the ink consumption state may be determined according to the specifications of the ink cartridge and a required measurement accuracy.

The piezoelectric element is provided in a position of the liquid in a detection-targeted predetermined ink consumption state. Thereby, whether or not the ink has passed the liquid position can be detected.

The piezoelectric element is formed on a base member. In the present embodiment, the opening cavity is, in particular, provided in the base member. The opening cavity is provided in a position counter to the piezoelectric element and directed toward an interior portion of the ink cartridge so as to communicate with the interior portion of the ink cartridge. In another embodiment, a mounting module is structured by the piezoelectric device and amounting structure. In particular, there is provided the opening cavity in the mounting structure. The opening cavity is, with the module in the state of being mounted, arranged in a position directed toward the interior portion of the ink container so as to communicate with the interior portion of the ink container. The opening cavity is positioned counter to the piezoelectric device, particularly its vibrating portion. In still another embodiment, there is particularly provided the opening cavity in the ink container. The opening cavity is formed such that the opening cavity is provided in the position counter to the piezoelectric device so as to communicate with the interior portion of the container. The opening cavity is provided in a position directed toward the interior portion of the container from the piezoelectric device. The opening cavity is positioned counter to the piezoelectric device, particularly its vibrating portion.

By providing the opening cavity, the following advantages are realized. In the state where the ink consumption is not yet started, the liquid surface of ink is high and thus the inside and outside of the opening cavity are filled with ink. On the other hand, when the ink consumption progresses, the liquid surface is lowered and then the opening cavity is exposed. Then, an approximately constant amount of ink remains in the opening cavity. Since the above-mentioned acoustic impedance, the condition of the piezoelectric device or the like differ in these two states, the output signals from the piezoelectric element also differ. Utilizing this phenomenon, the ink consumption state can be suitably detected.

It is preferable that a detected characteristic at the time when a small amount of ink is kept in the cavity be recorded in advance. Alternatively, the detected characteristic at the time when the ink is inside and outside the cavity may be recorded in advance. Both the above two states may of course be recorded.

According to the present embodiment, as will be described later in detail, the embodiment may be designed so that erroneous detection due to undulated ink wave caused by provision of the cavity can be avoided.

Moreover, according to the present embodiment, by providing the opening cavity, the number of members to be occupied and inserted between the piezoelectric elements and the ink can be reduced, or the thickness of such members can be reduced, so that the ink consumption state can be further reliably detected.

For example, considering the detection principle utilizing the residual vibration, it is to be noted that a limited amount of ink in the vicinity of the piezoelectric element is one that actually affects the residual vibration. By providing this opening cavity this limited amount of ink becomes closer to or comes in contact with the piezoelectric element. Thereby, the change of the residual vibration relative to the ink consumption state becomes further clearer and the ink consumption state can be detected with increased reliability.

In cases utilizing the elastic wave and reflected wave, the provision of the opening cavity results in favorable transmission of vibration between the piezoelectric element and ink, so that the ink detecting capability can be improved.

Moreover, according to the present embodiments, the base member in which the cavity is locally provided is used, thus the ink can be safely sealed utilizing a shape itself of the base member. Thereby, the piezoelectric element can be protected from the ink. A possible damage to the insulation state of the piezoelectric element by the ink having conductivity therein can be effectively prevented.

Figure 28A:
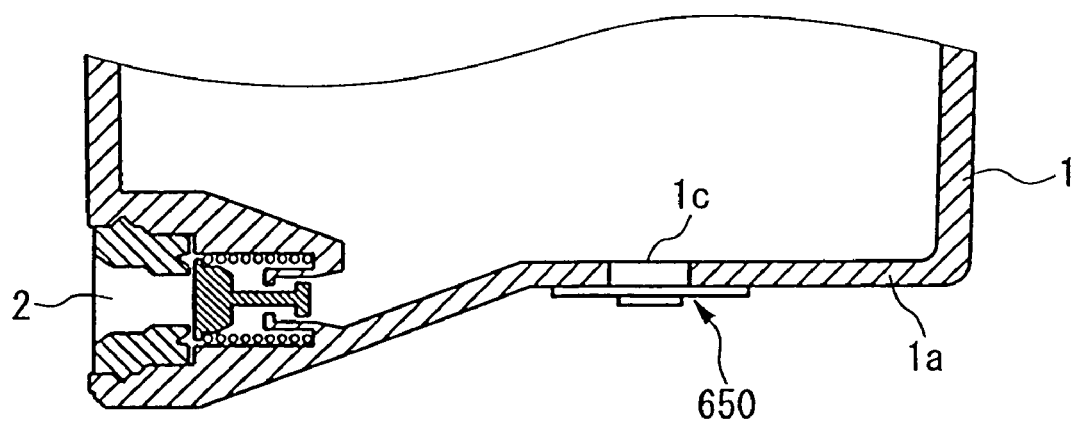
FIGS. 28A, 28B and 28C show an ink cartridge according to still another embodiment of the present invention.
Figure 28B:
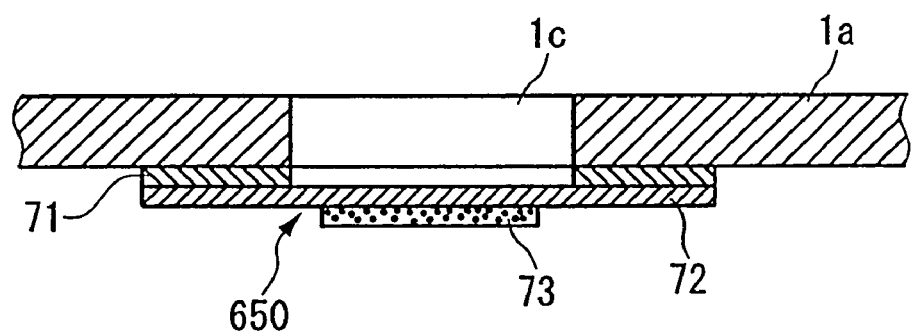
Figure 28C:
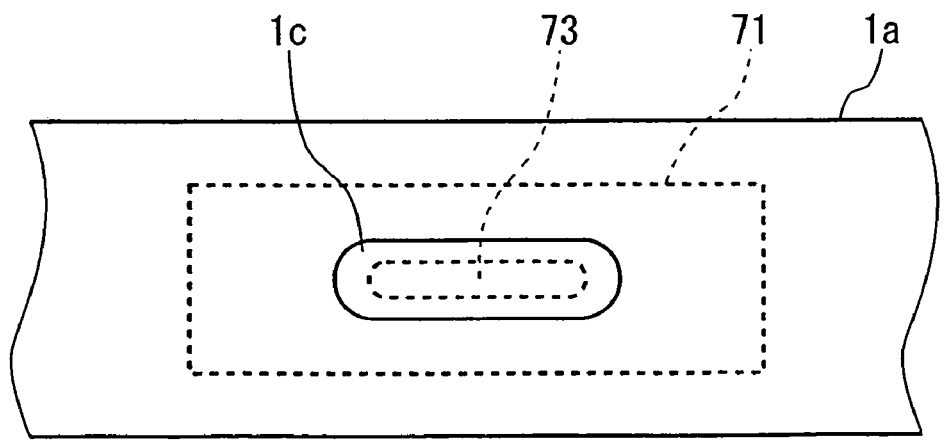

Hereinbelow, the present embodiments will be described in detail with reference to drawings. First, a fundamental of technology will be described which detects the ink consumption based on the vibration using the piezoelectric element, and will be followed by various applications of such a detection technology. During the course of describing these, a detection device with cavity which features the present embodiment will be described together with other variation thereof. FIGS. 28A–28C show a typical example of the ink cartridge with the cavity featured in the present embodiment, and other variations thereof. Moreover, as a mode of liquid detecting device, an actuator (typically shown in FIGS. 20A–20C, the reference numeral 106) and an elastic wave generating means (typically shown in FIG. 1, the reference numeral 3) are shown. However, these are merely one of embodiments for the liquid detecting device. For example, the liquid detecting device may be structured such that other components are implemented in addition to the actuator, or some of the components are removed from the actuator.

FIG. 1 is a cross sectional view of an embodiment of an ink cartridge for use with a single color, for example, the black ink. In the ink cartridge shown in FIG. 1, the detection method implemented is based on a method, among methods described above, in which the position of the liquid surface in the liquid container and whether or not the liquid is empty are detected by receiving the reflected wave of the elastic wave. As a means for generating and receiving the elastic wave, an elastic wave generating means 3 is utilized. An ink supply port 2 which comes in contact with an ink supply needle of the recording apparatus in a sealed manner is provided in a container 1 which houses the ink. In an outside portion of a bottom face 1a of the container 1, the elastic wave generating means 3 is mounted such that the elastic wave can be communicated, via the container, to the ink inside the container. In order that at a stage at which the ink K is almost used up, i.e. at the time when the ink becomes an ink-end state, the transfer of the elastic wave can change from the liquid to the gas, the elastic wave generating means 3 is provided in a slightly upward position from the ink supply port 2. Moreover, an elastic wave receiving means may be separately provided instead, so that the elastic wave generating means 3 is used as an elastic wave generating means only.

Figure 3:
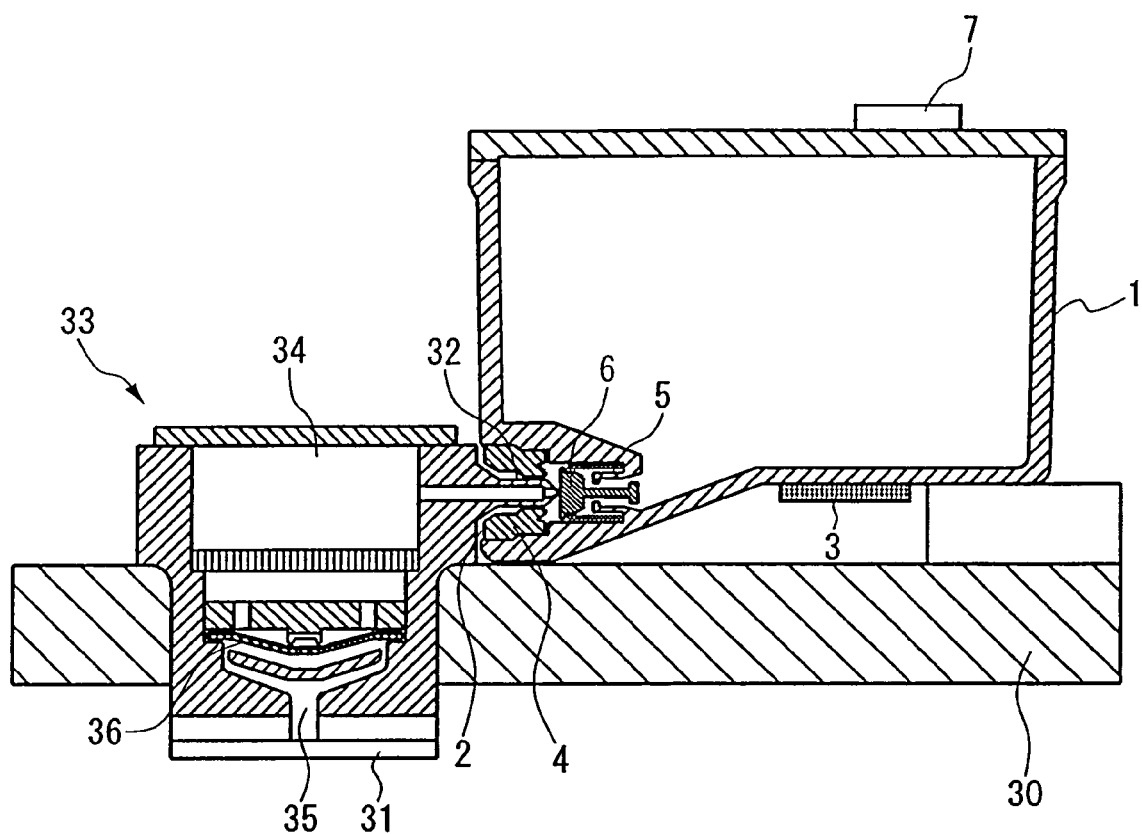
FIG. 3 shows an ink-jet recording apparatus suitable for the ink cartridges shown in FIG. 1 and FIG. 2, according to an embodiment of the present invention.

A packing ring 4 and a valve body 6 are provided in the ink supply port 2. Referring to FIG. 3, the packing ring 4 is engaged with the ink supply needle 32 communicating with a recording head 31, in a fluid-tight manner. The valve body 6 is constantly and elastically contacted against the packing ring 4 by way of a spring 5. When the ink supply needle 32 is inserted, the valve body 6 is pressed by the ink supply needle 32 so as to open an ink passage, so that ink inside the container 1 is supplied to the recording head 31 via the ink supply port 2 and the ink supply needle 32. On an upper wall of the container 1, there is mounted a semiconductor memory means 7 which stores data on ink inside the ink cartridge.

Figure 2:
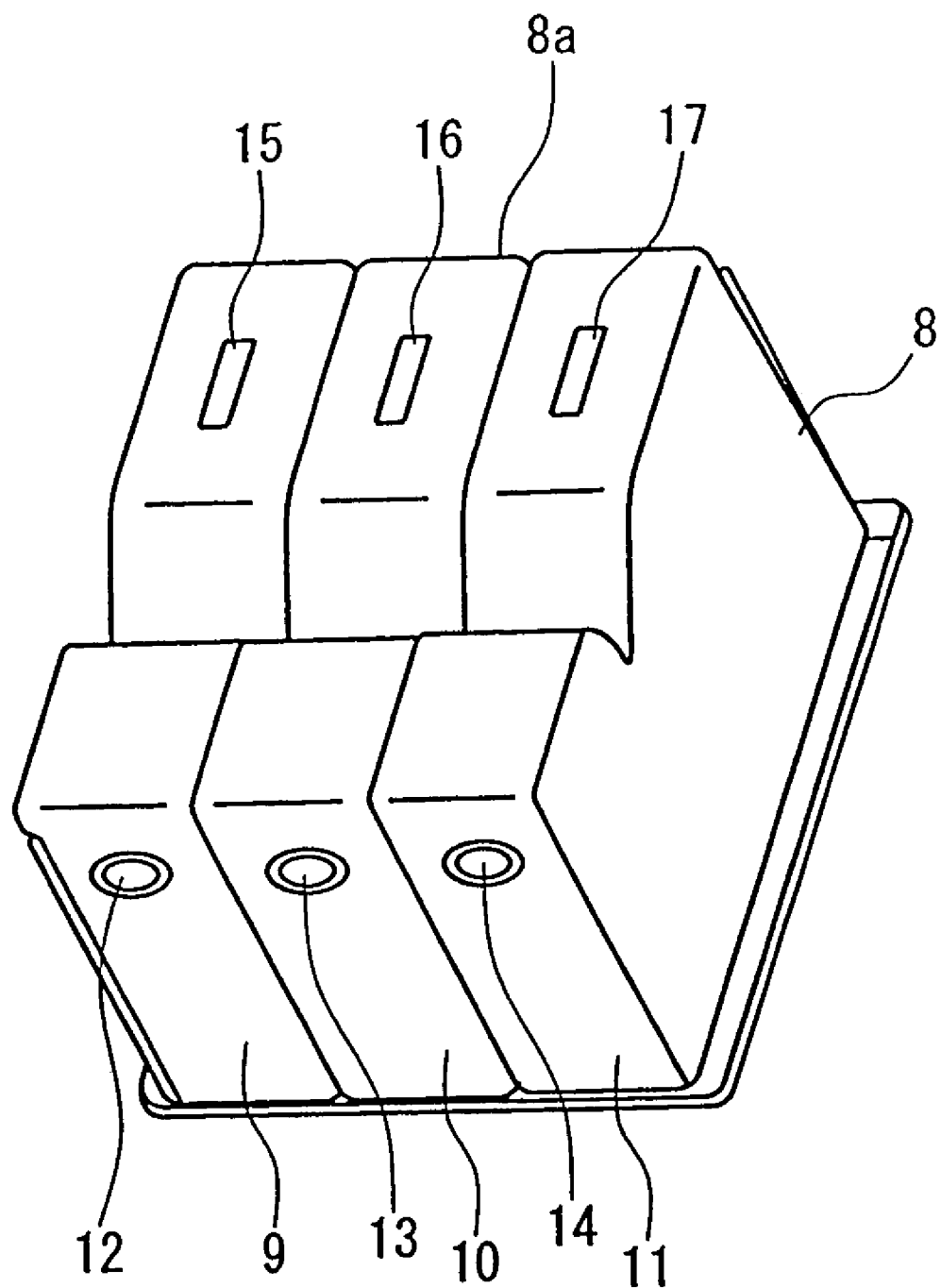
FIG. 2 shows an embodiment of the ink cartridge which houses a plural types of inks.

FIG. 2 is a perspective view of the ink cartridge which stores plural types of inks, viewed from a back side thereof, according to an embodiment. A container 8 is divided by division walls into three ink chambers 9, 10 and 11. Ink supply ports 12, 13 and 14 are formed for the respective ink chambers. In a bottom face 8a of the respective ink chambers 9, 10 and 11, the respective elastic wave generating means 15, 16 and 17 are mounted so that the elastic waves can be transferred to the ink housed in each ink chamber via the container.

FIG. 3 is a cross sectional view showing an embodiment of a major part of the ink-jet recording apparatus suitable for the ink cartridge shown in FIG. 1 and FIG. 2. A carriage 30 capable of reciprocating in the direction of the width of the recording paper is equipped with a sub-tank unit 33, while the recording head 3l is provided in a lower face of the sub-tank unit 33. Moreover, the ink supply needle 32 is provided in an ink cartridge mounting face side of the sub-tank unit 33.

Figure 4:
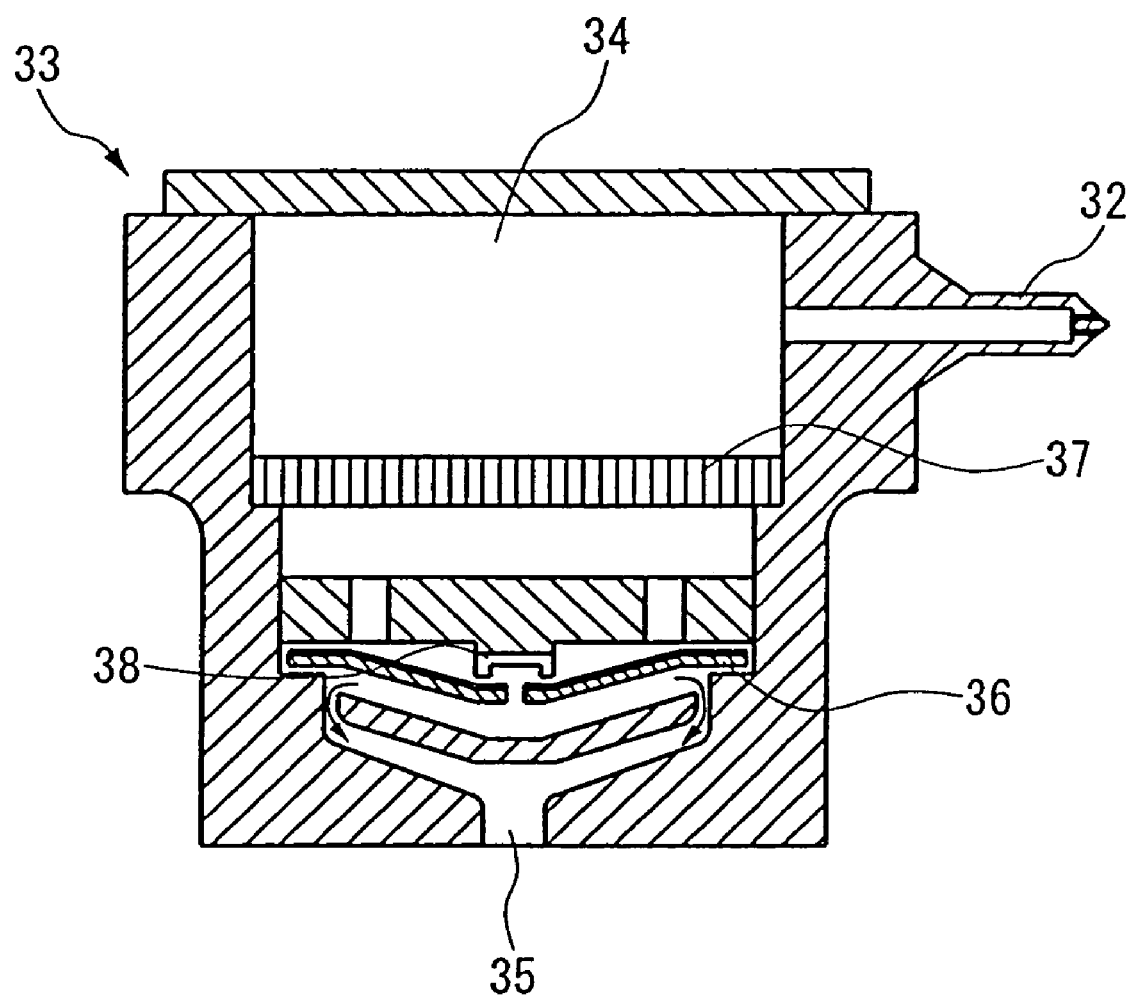
FIG. 4 is a detailed cross sectional view of a sub-tank unit 33.

FIG. 4 is a detailed cross sectional view of a sub-tank unit 33. The sub-tank unit 33 comprises the ink supply needle 32, the ink chamber 34, a flexible valve 36 and a filter 37. In the ink chamber 34, the ink is housed which is supplied from the ink cartridge via ink supply needle 32. The flexible valve 36 is so designed that the flexible valve 36 is opened and closed by means of the pressure difference between the ink chamber 34 and the ink supply passage 35. The sub-tank unit 33 is so constructed that the ink supply passage 35 is communicated with the recording head 31 so that the ink can be supplied up to the recording head 31.

Referring to FIG. 3, when the ink supply port 2 of the container 1 is inserted through the ink supply needle 32 of the sub-tank unit 33, the valve body 6 recedes against the spring 5, so that an ink passage is formed and the ink inside the container 1 flows into the ink chamber 34. At a stage where the ink chamber 34 is filled with ink, a negative pressure is applied to a nozzle opening of the recording head 31 so as to fill the recording head with ink. Thereafter, the recording operation is performed.

When the ink is consumed in the recording head 31 by the recording operation, a pressure in the downstream of the flexible valve 36 decreases. Then, the flexible valve 36 is positioned away from a valve body 38 so as to be come opened. When the flexible valve 36 is opened, the ink in the ink chamber 34 flows into the recording head 31 through the ink passage 35. Accompanied by the ink which has flowed into the recording head 31, the ink in the container 1 flows into the sub-tank unit 33 via the ink supply needle 32.

While the recording apparatus is operating, a drive signal is supplied to the elastic wave generating means 3 at a detection timing which is set in advance, for example, at a certain period of time. The elastic wave generated by the elastic wave generating means 3 is transferred to the ink by propagating through the bottom face 1a of the container 1 so as to be propagated to the ink.

By adhering the elastic wave generating means 3 to the container 1, the ink cartridge itself is given an ink remaining amount detecting capability. According to the present embodiment, since a process of embedding electrodes for use in detecting the liquid surface is unnecessary in the course of forming the container 1, an injection molding process can be simplified and the leakage of the liquid from a place in which the electrodes are supposedly embedded can be avoided, thus improving the reliability of the ink cartridge.

Figure 5:
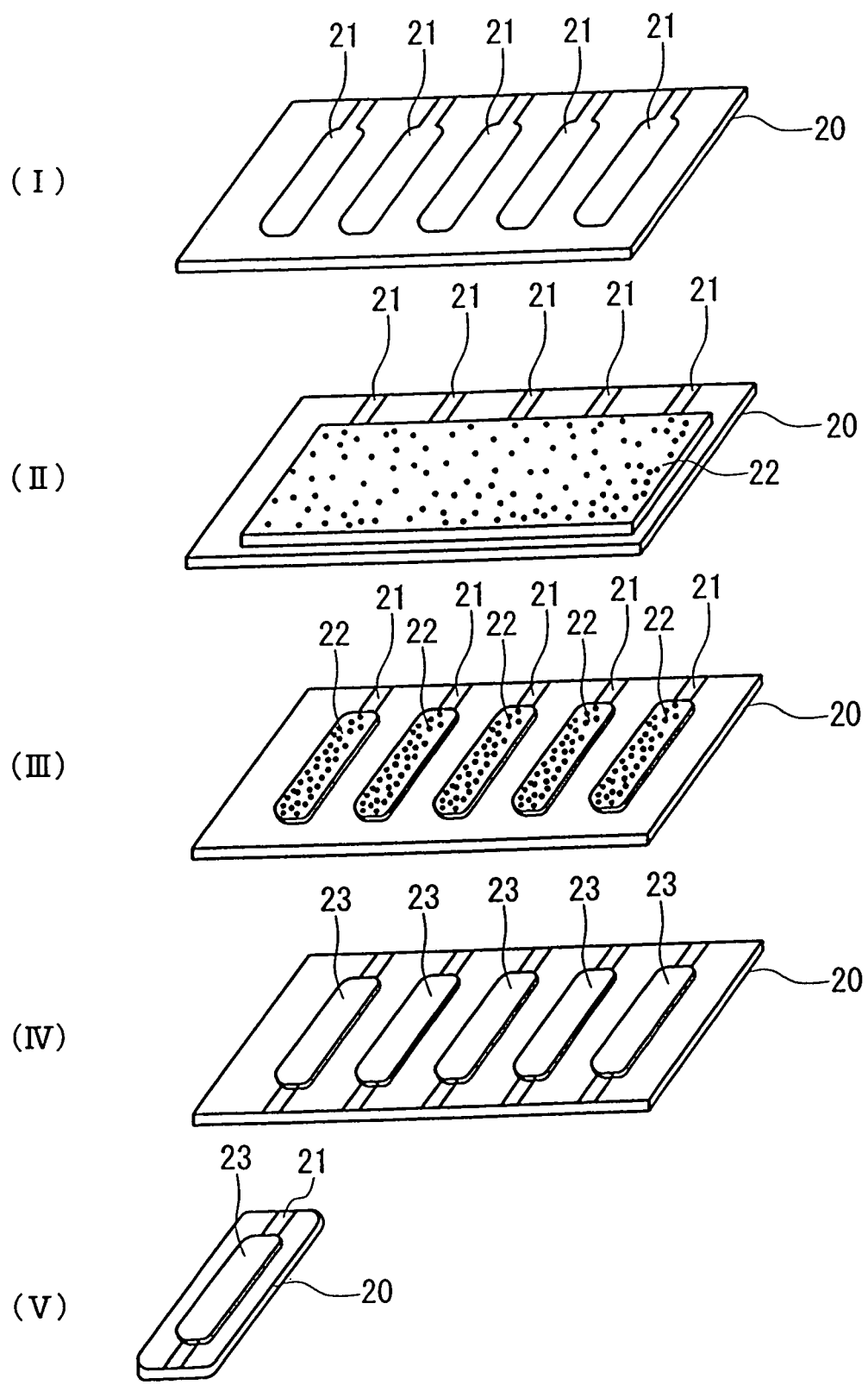
FIGS. 5(I)–5(V) show manufacturing methods o elastic wave generating means 3, 15, 16 and 17.

FIGS. 5(I)–5(V) show manufacturing methods of the elastic wave generating means 3, 15, 16 and 17. A base plate 20 is formed by material such as the burning-endurable ceramic. Referring to FIG. 5(I), first of all, a conductive material layer 21 which becomes an electrode at one side is formed on the base plate 20. Next, referring to FIG. 5(II), a green sheet 22 serving as piezoelectric material is placed on the conductive material layer 21. Next, referring to FIG. 5(III), the green sheet 22 is formed in a predetermined shape by a press processing or the like and is made into the form of a vibrator, and is air-dried. Thereafter, the burning is performed on the green sheet 22 at a burning temperature of, for example, 1200° C. Next, referring to FIG. 5 (IV), a conductive material layer 23 serving as other electrode is formed on the surface of the green sheet 22 so as to be polarized in a flexural-oscillatable manner. Finally, referring to FIG. 5(V), the base plate 20 is cut along each element. By fixing the base plate 20 in a predetermined face of the container 1 by use of adhesive or the like, the elastic wave generating means 3 can be fixed on the predetermined face of the container and the ink cartridge is completed which has a built-in function which detects the ink remaining amount.

Figure 6:
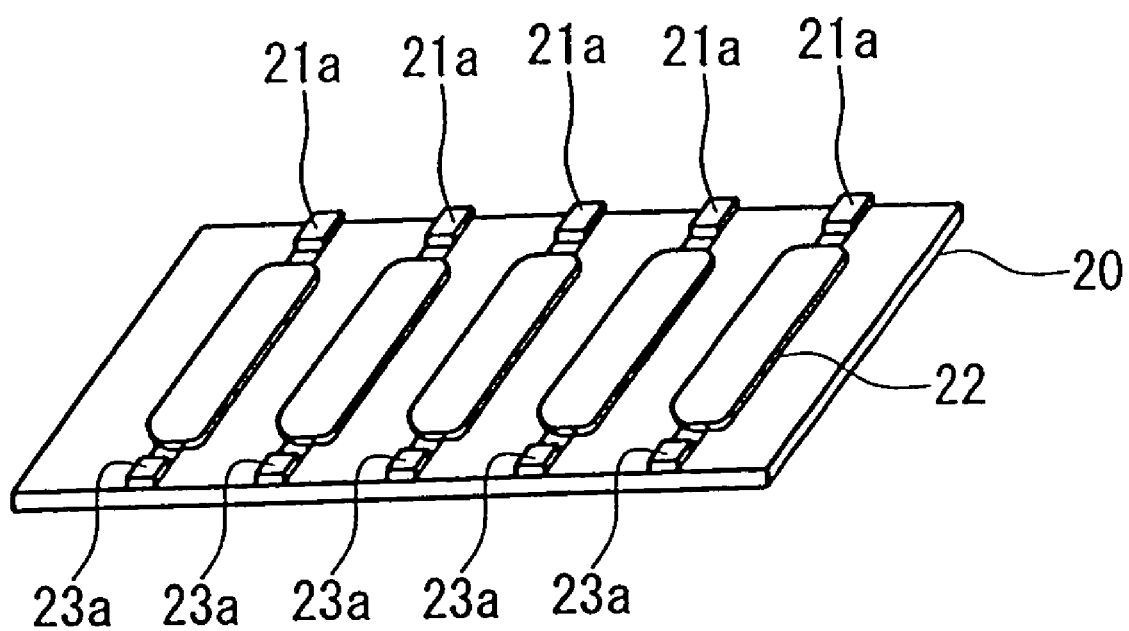
FIG. 6 shows another embodiment of the elastic wave generating means 3 shown in FIG. 5.

FIG. 6 shows another embodiment of the elastic wave generating means 3 shown in FIG. 5. In the embodiment shown in FIG. 5, the conductive material layer 21 is used as a connecting electrode. On the other hand, in the embodiment shown in FIG. 6, connecting terminals 21a and 23a are formed by a solder in an upper position than the surface of the piezoelectric material layer comprised of the green sheet 22. By the provision of the connecting terminals 21a and 23a, the elastic wave generating means 3 can be directly mounted to the circuit board, so that inefficient connection such as one by lead wires can be avoided.

Now, the elastic wave is a type of waves which can propagate through gas, liquid and solid as medium. Thus, the wavelength, amplitude, phase, frequency, propagating direction and propagating velocity of the elastic wave change based on the change of medium in question. On the other hand, the state and characteristic of the reflected wave of the elastic wave change according to the change of the medium. Thus, by utilizing the reflected wave which changes based on the change of the medium through which the elastic wave propagates, the state of the medium can be observed. In a case where the state of the liquid inside the liquid container is to be detected by this method, an elastic wave transmitter-receiver will be used for example. Let us explain this by referring to embodiments shown in FIGS. 1–3. First, the transmitter-receiver gives out the elastic wave to the medium, for example, the liquid or the liquid container. Then, the elastic wave propagates through the medium and arrives at the surface of the liquid. Since a boundary is formed between the liquid and the gas on the liquid surface, the reflected wave is returned to the transmitter-receiver. The transmitter-receiver receives the reflected wave. A distance between the liquid surface and a transmitter or receiver can be measured based on an overall traveled time of the reflected wave, or a damping factor of the amplitudes of the elastic wave generated by the transmitter and the reflected wave reflected on the liquid surface, and so on. Utilizing these, the state of the liquid inside the liquid container can be detected. The elastic wave generating means 3 may be used as a single unit of the transmitter-receiver in the method utilizing the reflected wave based on the change of the medium through which the elastic wave propagates, or a separately provided receiver may be mounted thereto.

As described above, in the elastic wave, generated by the elastic wave generating means 3, propagating through the ink liquid, the traveling time of the reflected wave occurring on the ink liquid surface to arrive at the elastic wave generating means 3 varies depending on density of the ink liquid and the liquid level. Thus, if the composition of ink is fixed, the traveling time of the reflected wave which occurred in the ink liquid surface varies depending on the ink amount. Therefore, the ink amount can be detected by detecting the time period during which the elastic wave generating means 3 generates the elastic wave and then the wave reflected from the ink surface arrives at the elastic wave generating means 3. Moreover, the elastic wave vibrates particles contained in the ink. Thus, in a case of using pigment-like ink which uses pigment as a coloring agent, the elastic wave contributes to prevent precipitation of the pigment or the like.

By providing the elastic wave generating means 3 in the container 1, when the ink of the ink cartridge approaches (decreases to) an ink-end state and the elastic wave generating means 3 can no longer receive the reflected wave, it is judged as an ink-near-end and thus can give indication to replace the cartridge.

Figure 7:
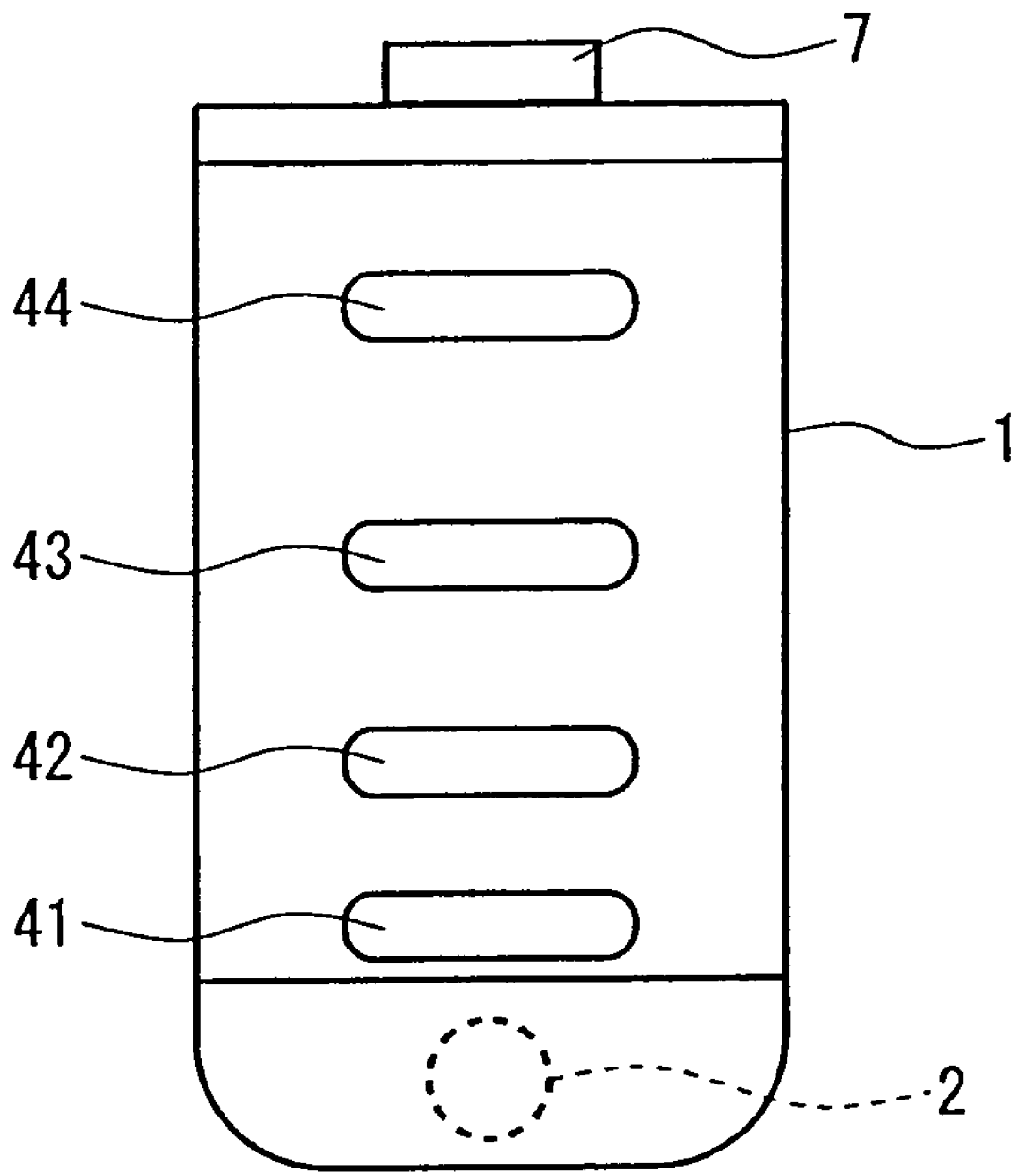
FIG. 7 shows an ink cartridge according to another embodiment of the present invention.

FIG. 7 shows an ink cartridge according to another embodiment of the present invention. Plural elastic wave generating means 41–44 are provided on the side wall of the container 1, spaced at a variable interval from one another in the vertical direction. In the ink cartridge shown in FIG. 7, whether or not the ink is present at mounting levels of respective elastic wave generating means 41–44 can be detected by whether or not the ink is present at respective positions of the elastic wave generating means 41–44. For example, suppose that the liquid level of ink is at a point between the elastic wave generating means 44 and 43. Then, the elastic wave generating means 44 detects and judges that the ink is empty while the elastic wave generating means 41, 42 and 43 detect and judge respectively that the ink is present. Thus, it can be known that the liquid level of ink lies in a level between the elastic wave generating means 44 and 43. Thus, provision of the plural elastic wave generating means 41–44 makes possible to detect the ink remaining amount in a step-by-step manner.

Figure 8:
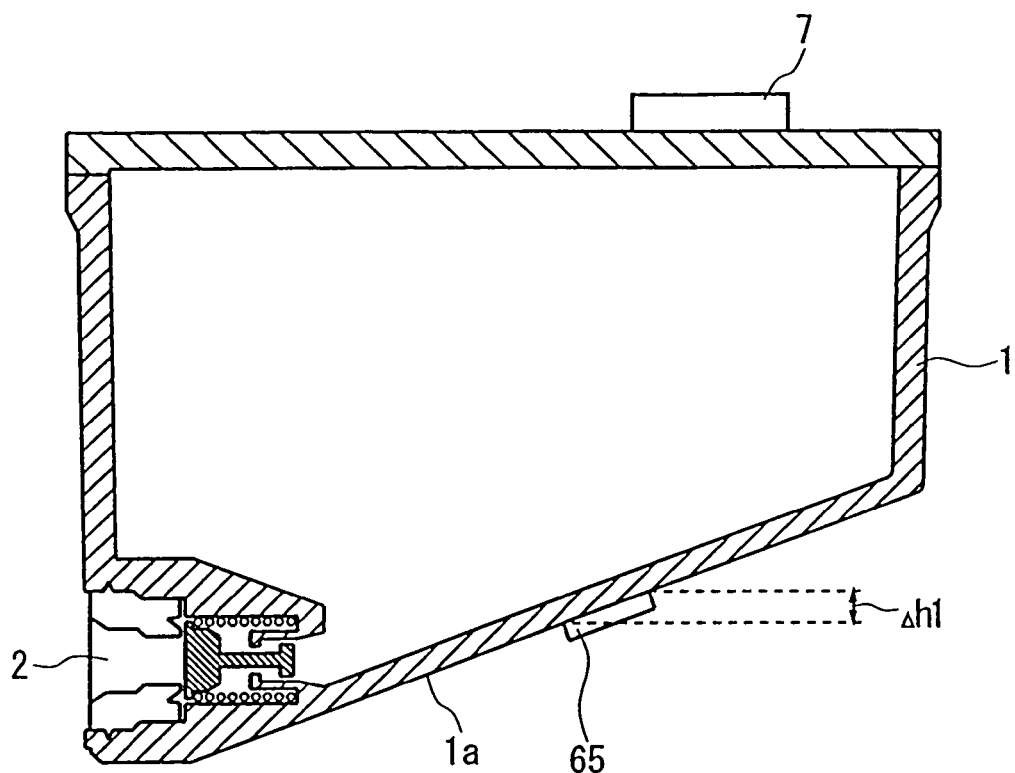
FIG. 8 shows an ink cartridge according to still another embodiment of the present invention.
Figure 9:
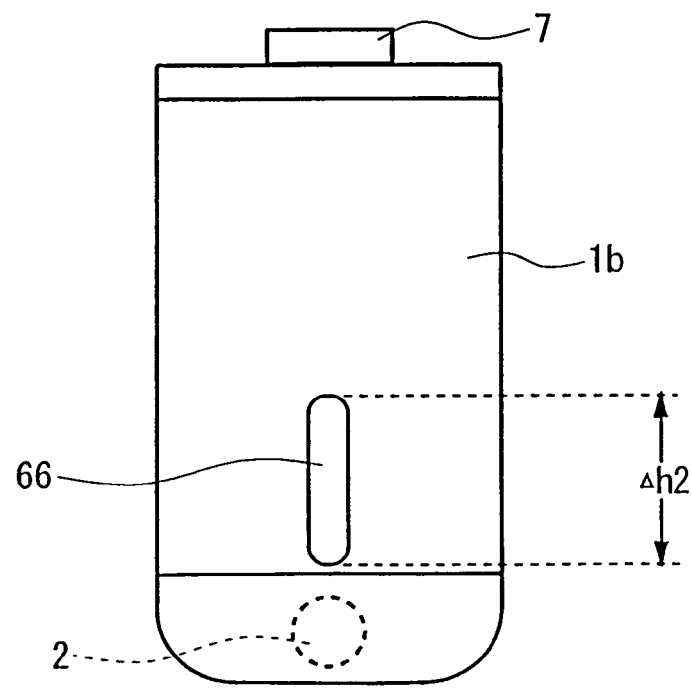
FIG. 9 shows an ink cartridge according to still another embodiment of the present invention.

FIG. 8 and FIG. 9 show ink cartridges according to still another embodiments of the present invention. In an embodiment shown in FIG. 8, an elastic wave generating means 65 is mounted in a bottom face 1a formed aslope in the vertical direction. In an embodiment shown in FIG. 9, an elastic wave generating means 66 of an elongated shape in the vertical direction is provided in the vicinity of the bottom face of a side wall 1b.

According to the embodiments shown in FIG. 8 and FIG. 9, when part of the elastic wave generating means 65 and 66 is exposed from the liquid surface, the traveled time of the reflected wave and the acoustic impedance of the elastic waves generated by the elastic wave generating means 65 continuously change corresponding to the change (Δh1, Δh2) of the liquid surface. Thus, the process from the ink-near-end state to the ink-end state of ink remaining amount can be accurately detected by detecting the degree of change in the traveled time of the reflected wave or the acoustic impedance of the elastic waves.

In the above embodiments, description has been made by exemplifying the ink cartridge of a type where the ink is directly stored in the liquid container. As still another embodiment of the ink cartridge, the above-described elastic wave generating means may be mounted on an ink cartridge of another type where the container 1 is loaded with a porous elastic member and the porous elastic member is impregnated with the liquid ink. Though in the above embodiments a flexural oscillating type piezoelectric vibrator is used so as to suppress the increase of the cartridge size, a vertically vibrating type piezoelectric vibrator may also be used. In the above embodiments, the elastic wave is transmitted and received by a same elastic wave generating means. In still another embodiment, the elastic wave generating means may be provided separately as one for use in transmitting the elastic wave and other for receiving the elastic wave, so as to detect the ink remaining amount.

Figure 10:
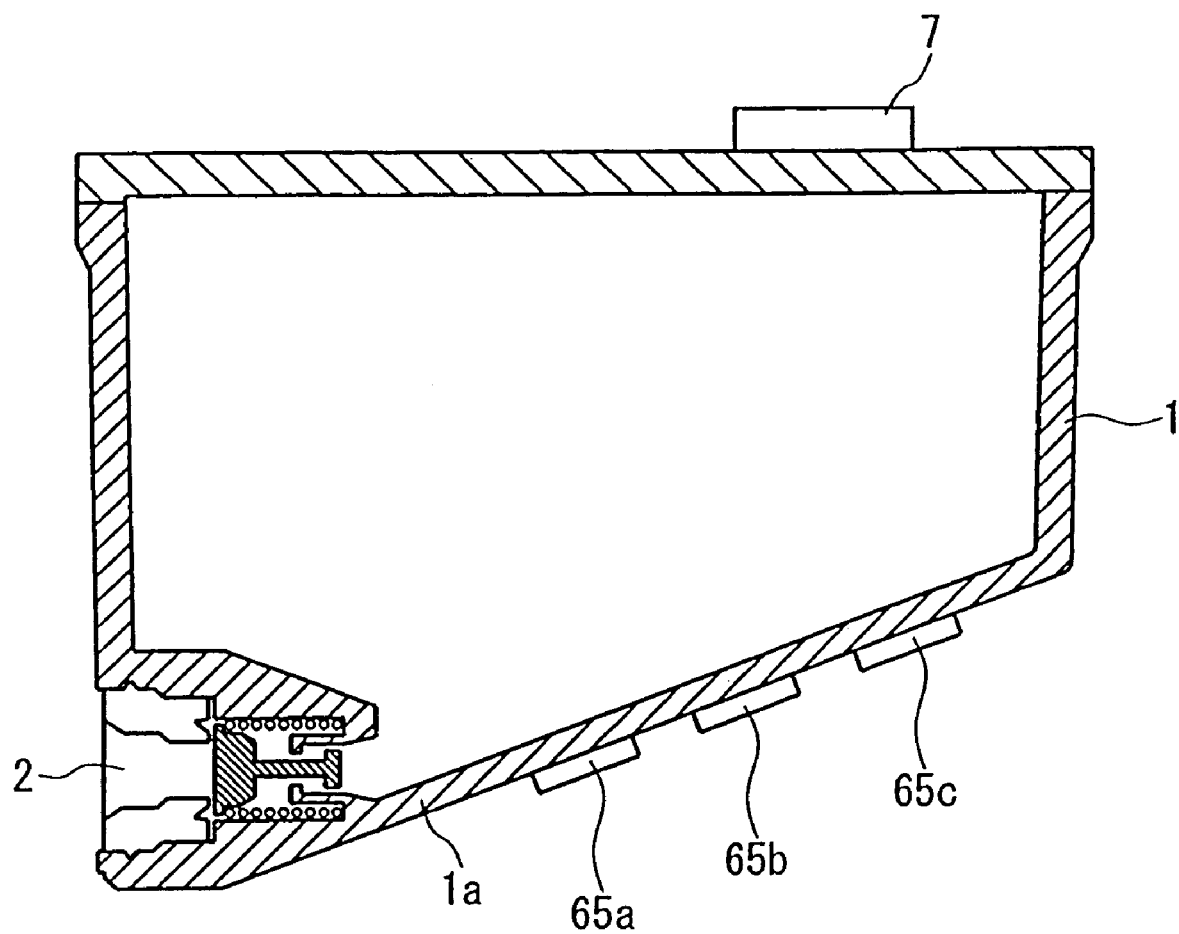
FIG. 10 shows an ink cartridge according to still another embodiment of the present invention.

FIG. 10 shows an ink cartridge according to still another embodiment of the present invention. Plural elastic wave generating means 65a, 65b and 65c on the bottom face 1a formed aslope in the vertical direction spaced at an interval are provided in the container 1. According to the present embodiment, the arrival time (traveled time) of the reflected waves of the elastic waves to the respective elastic wave generating means 65a, 65b and 65c in the respective mounting positions of the elastic wave generating means 65a, 65b and 65c differs depending on whether or not the ink is present in the respective positions of the plural elastic wave generating means 65a, 65b and 65c. Thus, whether or not the ink is present in the respective mounted position levels of the elastic wave generating means 65a, 65b and 65c can be detected by scanning each elastic generating means (65a, 65b and 65c) and by detecting the traveled time of the reflected wave of the elastic wave in the elastic wave generating means 65a, 65b and 65c. Hence, the ink remaining amount can be detected in a step-by-step manner. For example, suppose that the liquid level of ink is at a point between the elastic wave generating means 65b and 65c. Then, the elastic wave generating means 65c detects and judges that the ink is empty while the elastic wave generating means 65a and 65b detect and judge respectively that the ink is present. By overall evaluating these results, it becomes known that the liquid level of ink lies in a level between the elastic wave generating means 65b and 65c.

Figure 11:
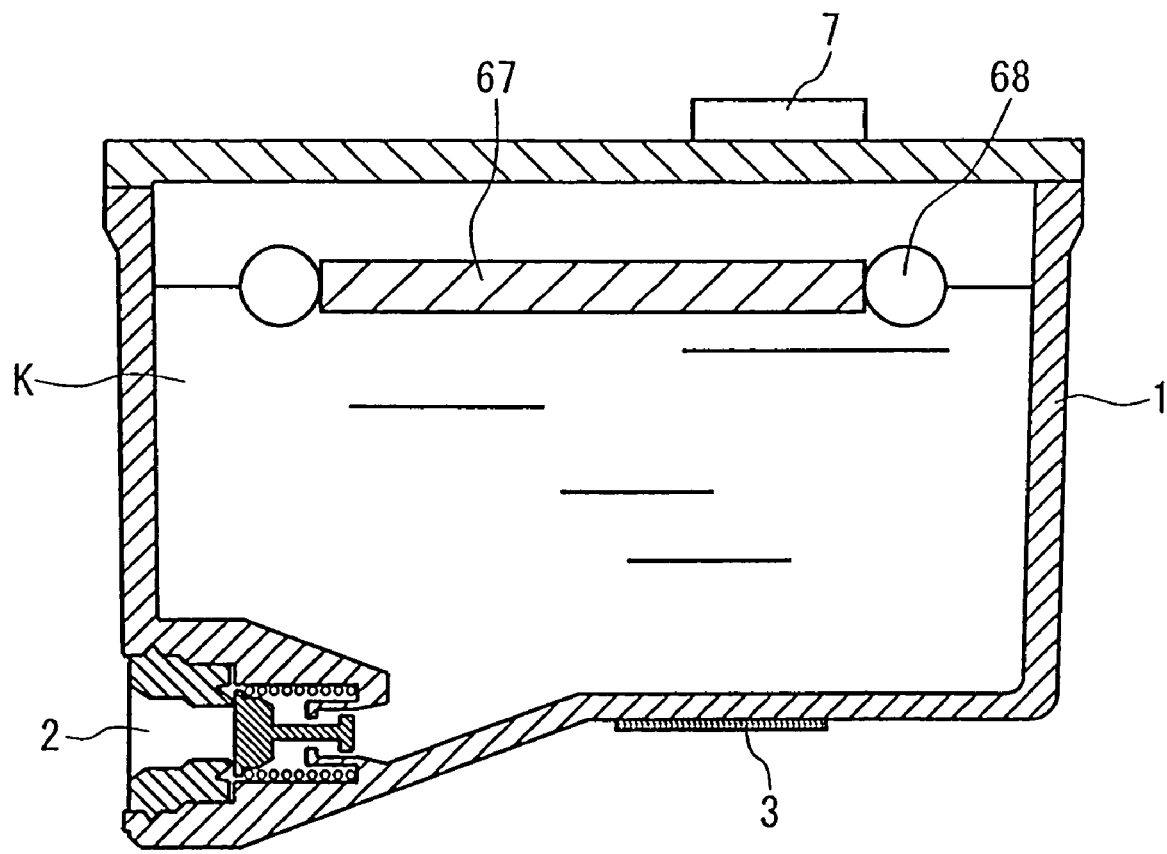
FIG. 11 shows an ink cartridge according to still another embodiment of the present invention.

FIG. 11 shows an ink cartridge according to still another embodiment of the present invention. In the ink cartridge shown in FIG. 11, a floating board 67 attached to a floater 68 covers the ink liquid surface in order to increase intensity of the reflected wave from the liquid surface. The floating board 67 is formed by material which has a high acoustic impedance therein and is ink-resistant, such as a ceramic board.

Figure 12A:
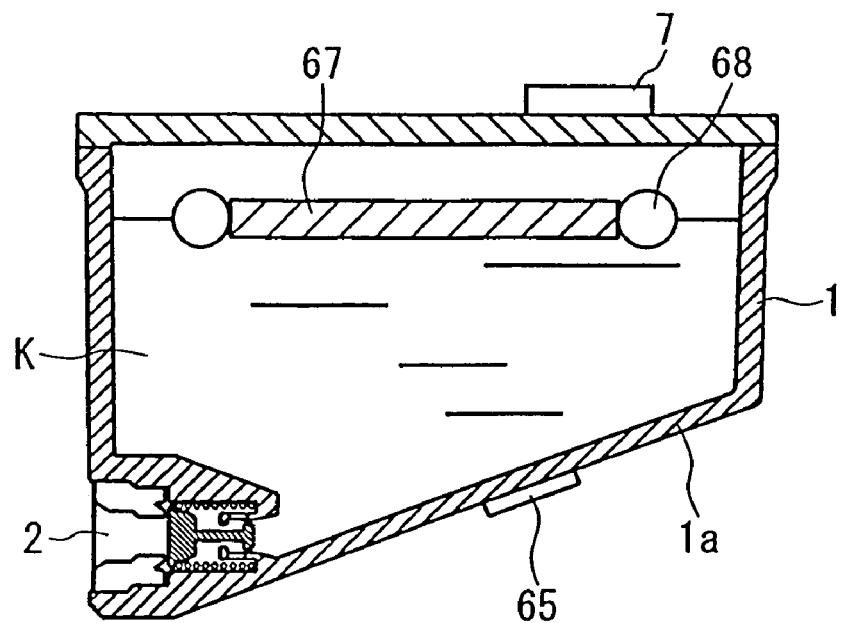
FIG. 12A and FIG. 12B shows another embodiments of the ink cartridge shown in FIG. 11.
Figure 12B:
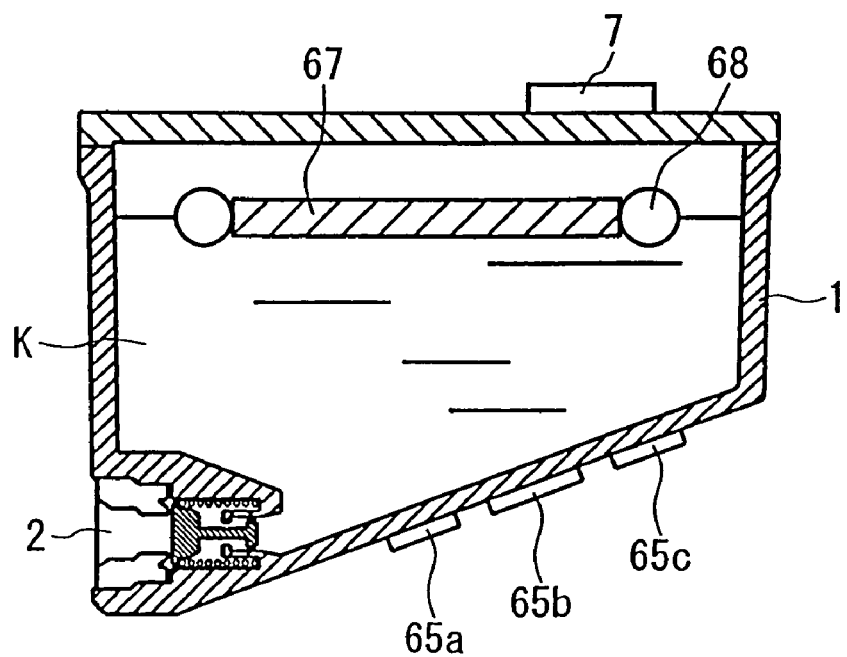

FIG. 12A and FIG. 12B shows another embodiments of the ink cartridge shown in FIG. 11. In the ink cartridge shown in FIGS. 12A and 12b, similar to one shown in FIG. 11, a floating board 67 attached to a floater 68 covers the ink liquid surface in order to increase intensity of the reflected wave from the liquid surface. Referring to FIG. 12A, the elastic wave generating means 65 is fixed on the bottom face 1a formed aslope in the vertical direction. When the ink remaining amount becomes scarce and thus the elastic wave generating means 65 is exposed from the liquid surface, the arrival time of the reflected wave of the elastic waves generated by the elastic wave generating means 65 at the elastic wave generating means 65 changes, thus whether or not the ink is present in the mounting position levels of the elastic wave generating means 65 can be detected. Since the elastic wave generating means 65 is mounted in the bottom face 1a formed aslope in the vertical direction, a small amount of ink still remains even after the elastic wave generating means 65 detects and judges that ink is empty. Thus, the ink remaining amount at an ink-near-end point can be detected.

Referring to FIG. 12B, plural elastic wave generating means 65a, 65b and 65c on the bottom face 1a formed aslope in the vertical direction spaced at an interval are provided in the container 1. According to the present embodiment shown in FIG. 12B, the arrival time (traveled time) of the reflected waves of the elastic waves at the respective elastic wave generating means 65a, 65b and 65c in the respective mounting positions of the elastic wave generating means 65a, 65b and 65c differs depending on whether or not the ink is present in the respective positions of the plural elastic wave generating means 65a, 65b and 65c. Thus, whether or not the ink is present in the respective mounted position levels of the elastic wave generating means 65a, 65b and 65c can be detected by scanning each elastic generating means (65a, 65b and 65c) and by detecting the traveled time of the reflected wave of the elastic wave in the elastic wave generating means 65a, 65b and 65c. For example, suppose that the liquid level of ink is at a point between the elastic wave generating means 65b and 65c. Then, the elastic wave generating means 65c detects and judges that the ink is empty while the elastic wave generating means 65a and 65b detect and judge respectively that the ink is present. By overall evaluating these results, it becomes known that the liquid level of ink lies in a level between the elastic wave generating means 65b and 65c.

Figure 13A:
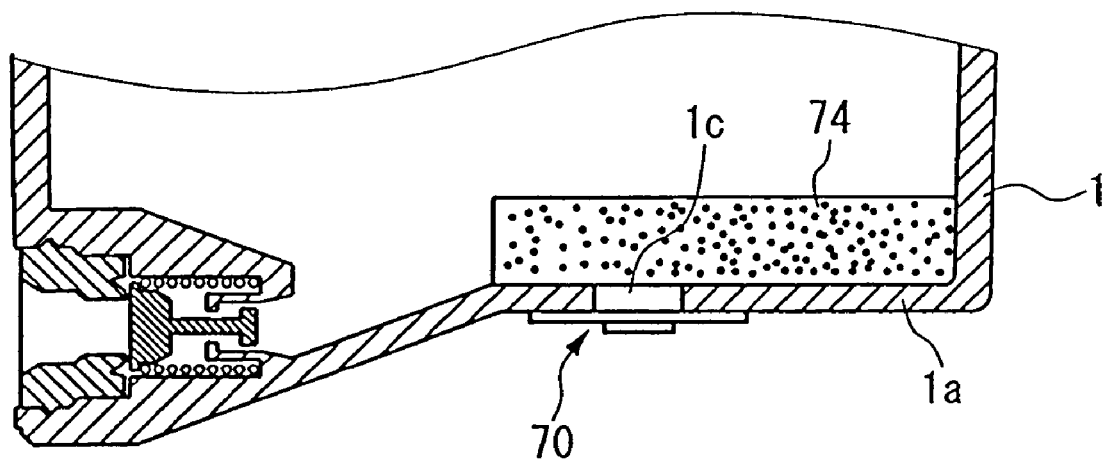
FIG. 13A and FIG. 13B show ink cartridges according to still another embodiment of the present invention.
Figure 13B:
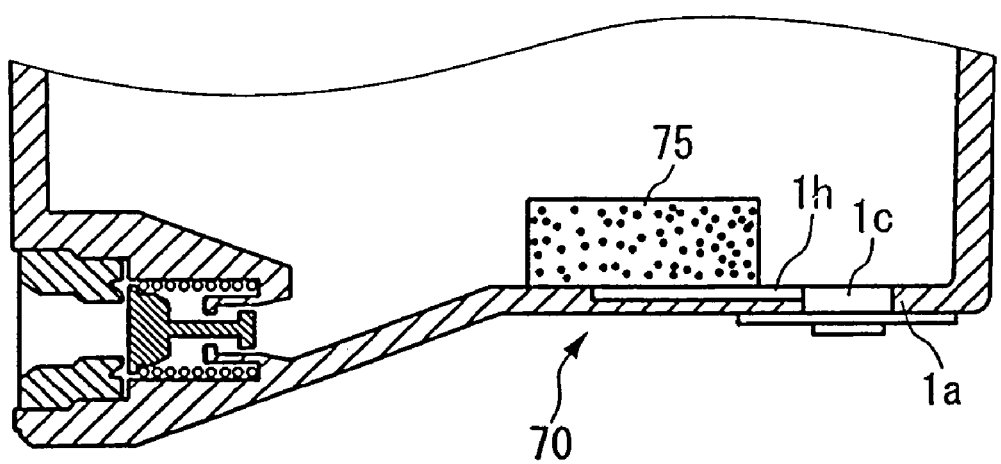

FIG. 13A and FIG. 13B show ink cartridges according to still another embodiment of the present invention. In the ink cartridge shown in FIG. 13A, an ink absorbing member 74 is arranged in such a manner that at least part of the ink absorbing member 74 is disposed counter to a through hole 1c provided inside the container 1. An elastic wave generating means 70 is fixed to the bottom face 1a of the container 1 such that the elastic wave generating means 70 is positioned counter to the through hole 1c. In the ink cartridge shown in FIG. 13B, an ink absorbing member 75 is arranged in such a manner that the ink absorbing member 75 is disposed counter to a groove 1h formed so as to communicate with the through hole 1c.

According to the present embodiment shown in FIGS. 13A and 13B, when the ink has been consumed and then the ink absorbing members 74 and 75 are exposed from the ink, the ink in the ink absorbing members 74 and 75 flows out by its dead weight, so that the ink is supplied to the recording head 31. When the ink is used up, the ink absorbing members 74 and 75 absorb the ink remaining in the through hole 1c, so that the ink is completely discharged from a concave part of the through hole 1c. Thereby, the state of the reflected wave of the elastic wave generated by the elastic wave generating means 70 changes at the time of the ink-end state, thus the ink-end state can be further reliably detected.

Figure 14A:
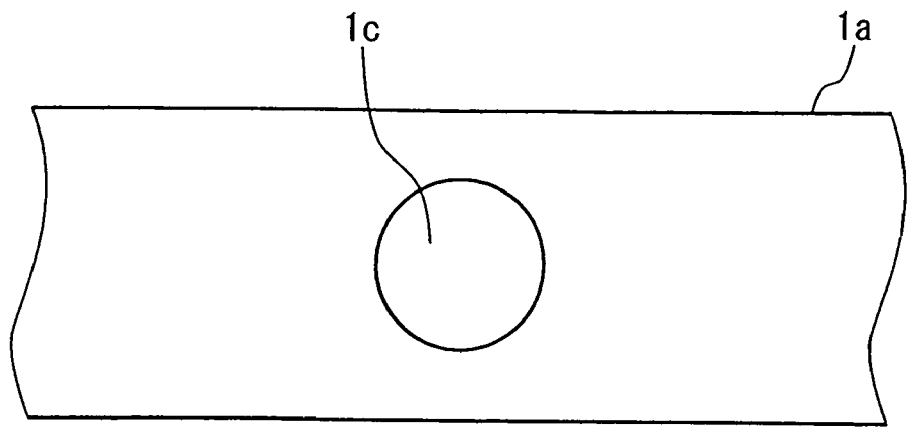
FIGS. 14A, 14B and 14C show plan views of the through hole 1c according to another embodiment.
Figure 14B:
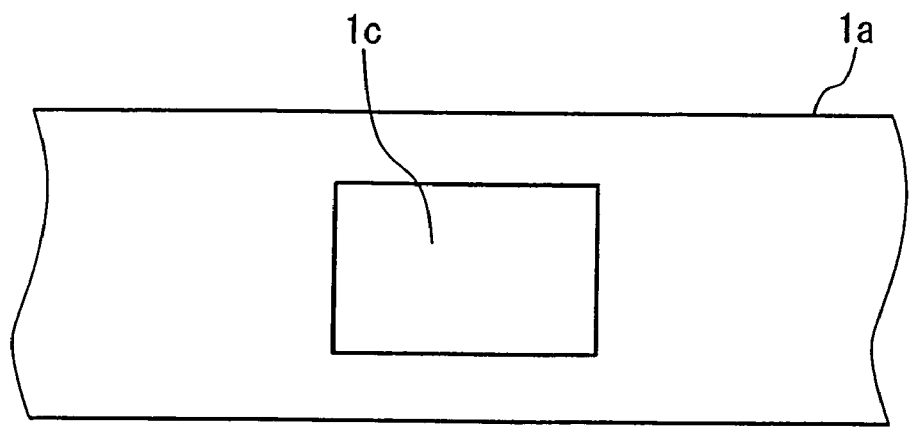
Figure 14C:
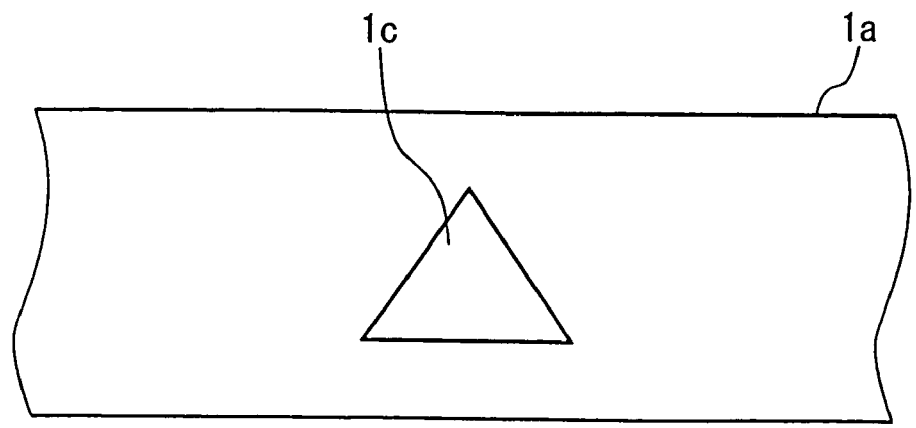

FIGS. 14A, 14B and 14C show plan views of the through hole 1c according to another embodiment. As shown respectively in FIGS. 14A, 14B and 14C, the plane shape of the through hole 1c may be of arbitrary shapes as long as the elastic wave generating means is capable of being mounted thereto.

Figure 15A:
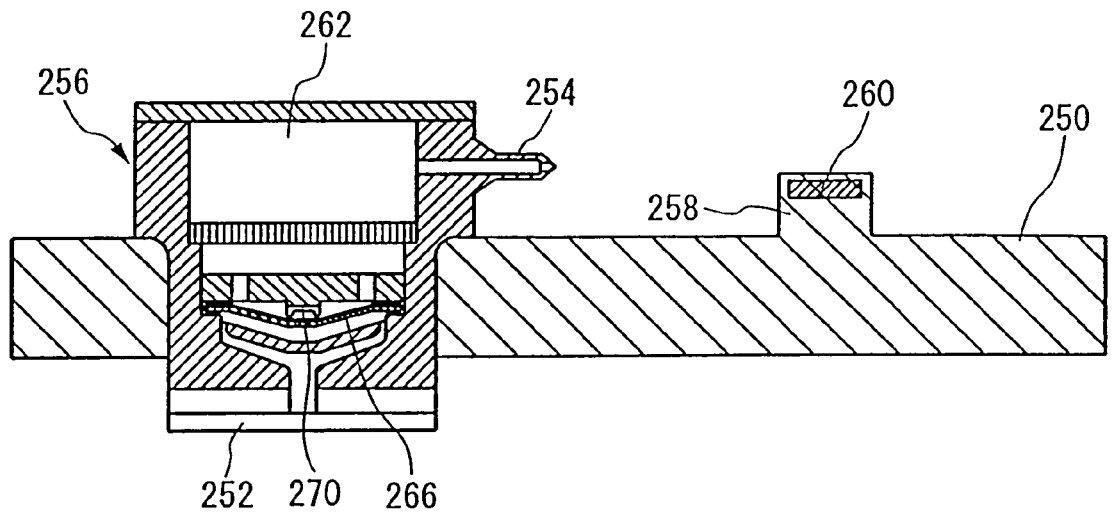
FIGS. 15A and 15B show cross-sections of the ink-jet recording apparatus according to still another embodiment of the present invention.
Figure 15B:
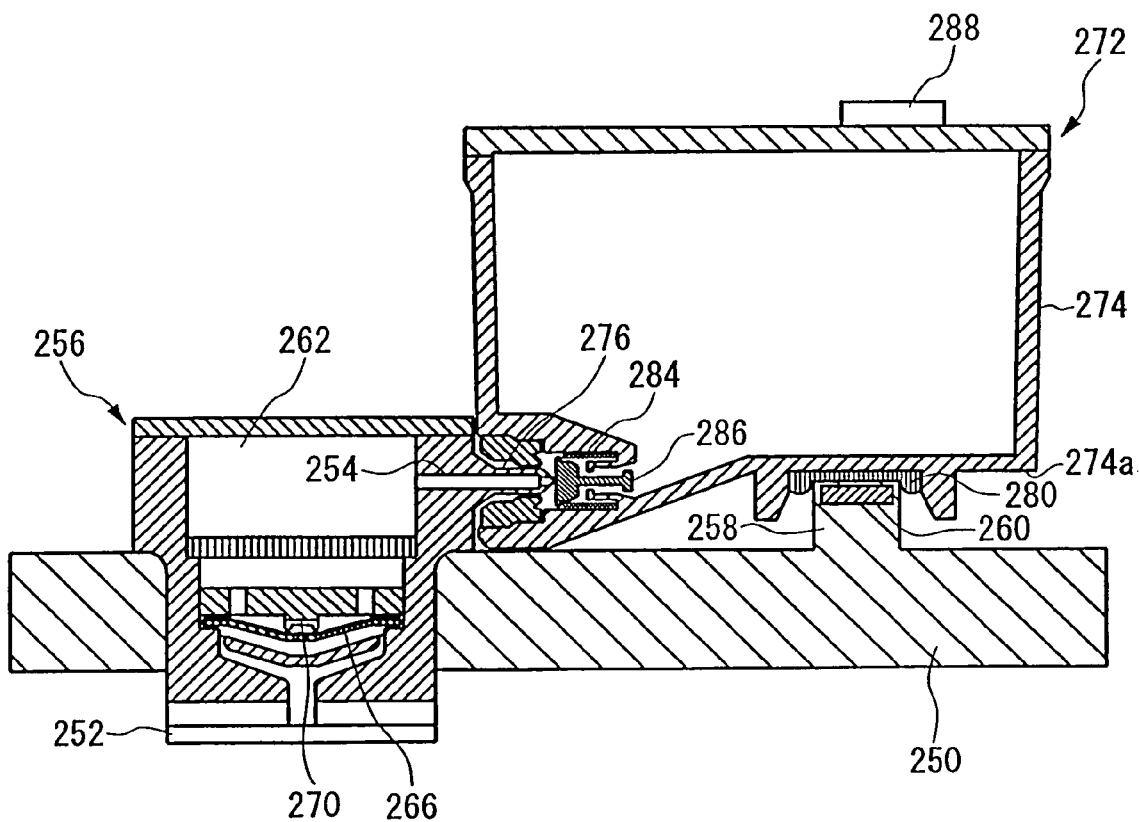

FIGS. 15A and 15B show cross sections of the ink-jet recording apparatus according to still another embodiment of the present invention. FIG. 15A shows a cross section of the ink-jet recording apparatus alone. FIG. 15B is a cross section of the ink-jet recording apparatus to which the ink cartridge 272 is mounted. A carriage 250 capable of reciprocating in the direction of the width of the ink-jet recording paper includes a recording head 252 in a lower face thereof. The carriage 250 includes a sub-tank unit 256 in an upper face of the recording head 252. The sub-tank unit 256 has a similar structure to that shown in FIG. 6. The sub-tank unit 256 has an ink supply needle 254 facing an ink cartridge 272 mounting side. In the carriage 250, there is provided a convex part 258 in a manner such that the convex part 258 is disposed counter to a bottom portion of the ink cartridge 272 and in an area where the ink cartridge 272 is to be mounted thereabove. The convex part 258 includes an elastic wave generating means 260 such as the piezoelectric vibrator.

Figure 16A:
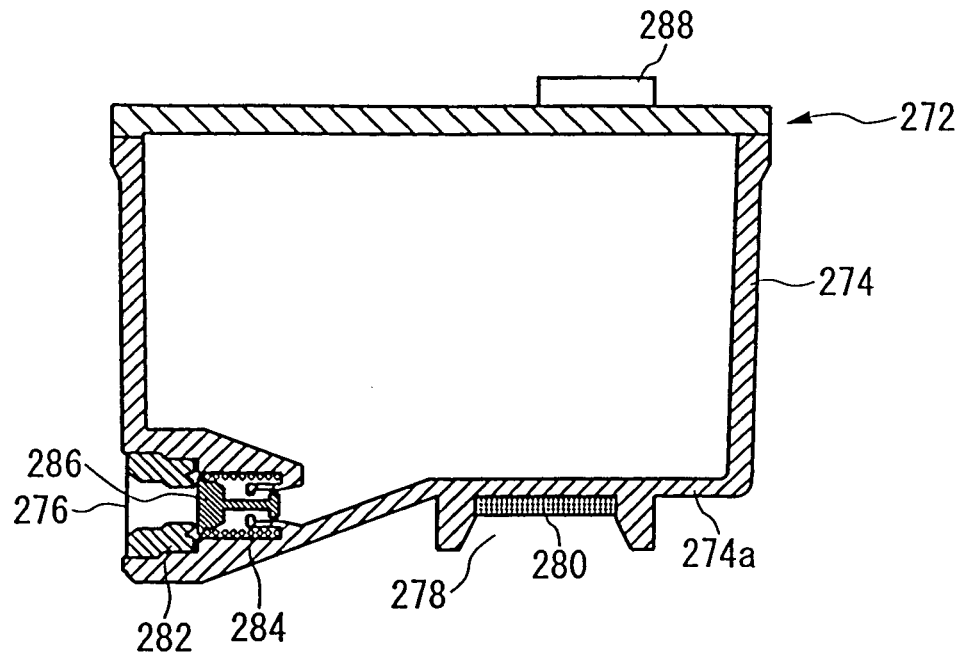
FIGS. 16A and 16B show an embodiment of the ink cartridge suitable for the recording apparatus shown in FIGS. 15A and 15B.
Figure 16B:
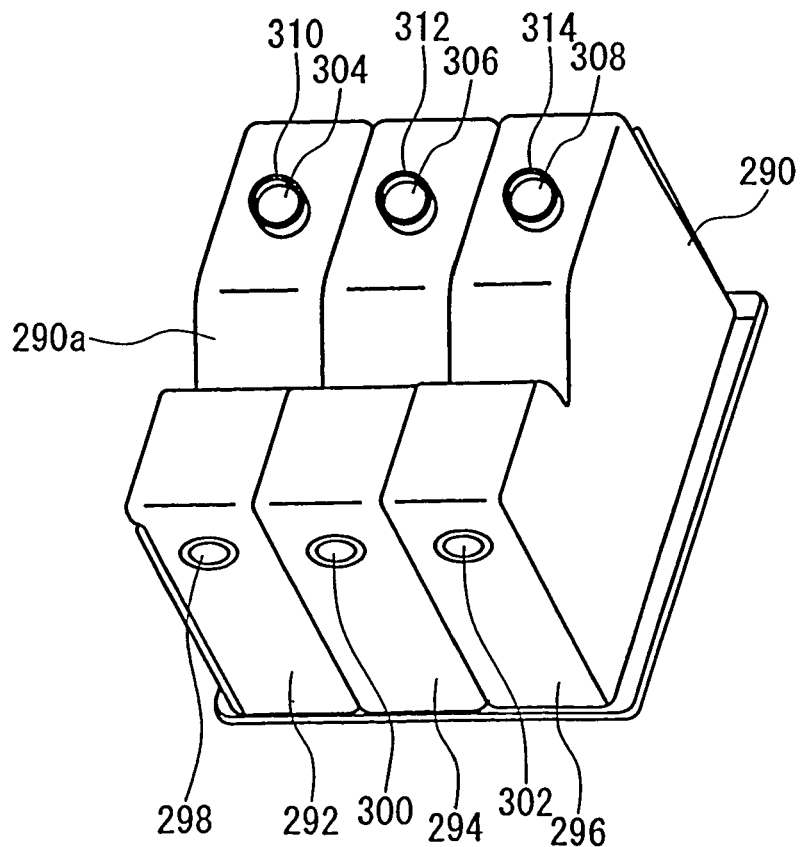

FIGS. 16A and 16B show an embodiment of the ink cartridge suitable for the recording apparatus shown in FIGS. 15A and 15B. FIG. 16A shows an embodiment of the ink cartridge for use with a single color, for instance., the black color. The ink cartridge 272 according to the present embodiment, comprises a container which houses ink and an ink supply port 276 which comes in contact with an ink supply needle 254 of the recording apparatus in a sealed manner. In the container 274, there is provided the concave part 278, positioned in a bottom face 274a, which is to be engaged with the convex part 258. The c 280 concave part 278 houses ultrasound transferring material such as gelated material.

The ink supply port 276 includes a packing ring 282, a valve body 286 and a spring 284. The packing ring 282 is engaged with the ink supply needle 254 in a fluid-tight manner. The valve body 286 is constantly and elastically contacted against the packing ring 282 by way of the spring 284. When the ink supply needle 254 is inserted to the ink supply port 276, the valve body 286 is pressed by the ink supply needle 254 so as to open an ink passage. On an upper wall of the container 274, there is mounted a semiconductor memory means 288 which stores data on ink inside the ink cartridge and so on.

FIG. 16B shows an embodiment of the ink cartridge which houses plural types of ink. A container 290 is divided by division walls into plural areas, that are, three ink chambers 292, 294 and 296. The ink chambers 292, 294 and 296 have ink supply ports 298, 300 and 302, respectively. In the area counter to respective ink chambers 292, 294 and 296 in the bottom face 290a of the container 290, the gelated material 304 and 306 to propagate the elastic waves generated by the elastic wave generating means 260 is housed in a cylindrical shaped concave parts 310, 312 and 314.

Referring to FIG. 15B, when the ink supply port 276 of the ink cartridge 272 is inserted through the ink supply needle 254 of the sub-tank unit 256, the valve body 286 recedes against the spring 284, so that an ink passage is formed and the ink inside the ink cartridge 272 flows into the ink chamber 262. At a stage where the ink chamber 262 is filled with ink, a negative pressure is applied to a nozzle opening of the recording head 252 so as to fill the recording head with ink. Thereafter, the recording operation is performed. When the ink is consumed in the recording head 252 by the recording operation, a pressure in the downstream of a flexible valve 266 decreases. Then, the flexible valve 266 is positioned away from a valve body 270 so as to become opened. When the flexible valve 36 is opened, the ink in the ink chamber 262 flows into the recording head 252 through the ink passage 35. Accompanied by the ink which has flowed into the recording head 252, the ink in the ink cartridge 272 flows into the sub-tank unit 256.

While the recording apparatus is operating, a drive signal is supplied to the elastic wave generating means 260 at a detection timing which is set in advance, for example, at a certain period of time. The elastic wave generated by the elastic wave generating means 260 is radiated from the convex part 258 and is transferred to the ink inside the ink cartridge 272 by propagating through the gelated material 280 in the bottom face 274a of the ink cartridge 272. Though the elastic wave generating means 260 is provided in the carriage 250 in FIGS. 15A and 15B, the elastic wave generating means 260 may be provided inside the sub-tank unit 256.

Since the elastic wave generated by the elastic wave generating means 260 propagates through the ink liquid, the traveling time of the reflected wave occurring on the ink liquid surface to arrive at the elastic wave generating means 260 varies depending on density of the ink liquid and the liquid level. Thus, if the composition of ink is fixed, the traveling time of the reflected wave which occurred in the ink liquid surface varies depending on the ink amount. Therefore, the ink amount can be detected by detecting the time duration during which the reflected wave arrives at the elastic wave generating means 260 from the ink liquid surface when the ink liquid surface is excited by the elastic wave generating means 260. Moreover, the elastic wave generated by the elastic wave generating mean 260 vibrates particles contained in the ink. Thus, in a case of using pigment-like ink which uses pigment as a coloring agent, the elastic wave contributes to prevent precipitation of the pigment or the like.

After the printing operation and maintenance operation or the like and when the ink of the ink cartridge approaches (decreases to) an ink-end state and the elastic wave generating means 260 can no longer receive the reflected wave even after the elastic wave generating means sends out the elastic wave, it is judged that the ink is in an ink-near-end state and thus this judgment can give indication to replace the cartridge anew. Moreover, when the ink cartridge 272 is not mounted properly to the carriage 250, the shape of the elastic wave from the elastic generating means 260 changes in an extreme manner. Utilizing this, warning can be given to a user in the event that the extreme change in the elastic wave is detected, so as to prompt the user to check on the ink cartridge 272.

The traveling time of the reflected wave of the elastic wave generated by the elastic wave generating means 260 is affected by the density of ink housed in the container 274. Since the density of ink may differ by the type of ink used, data on the types of ink are stored in a semiconductor memory means 288, so that a detection sequence can be set based on the data and thus the ink remaining amount can be further precisely detected.

Figure 17:
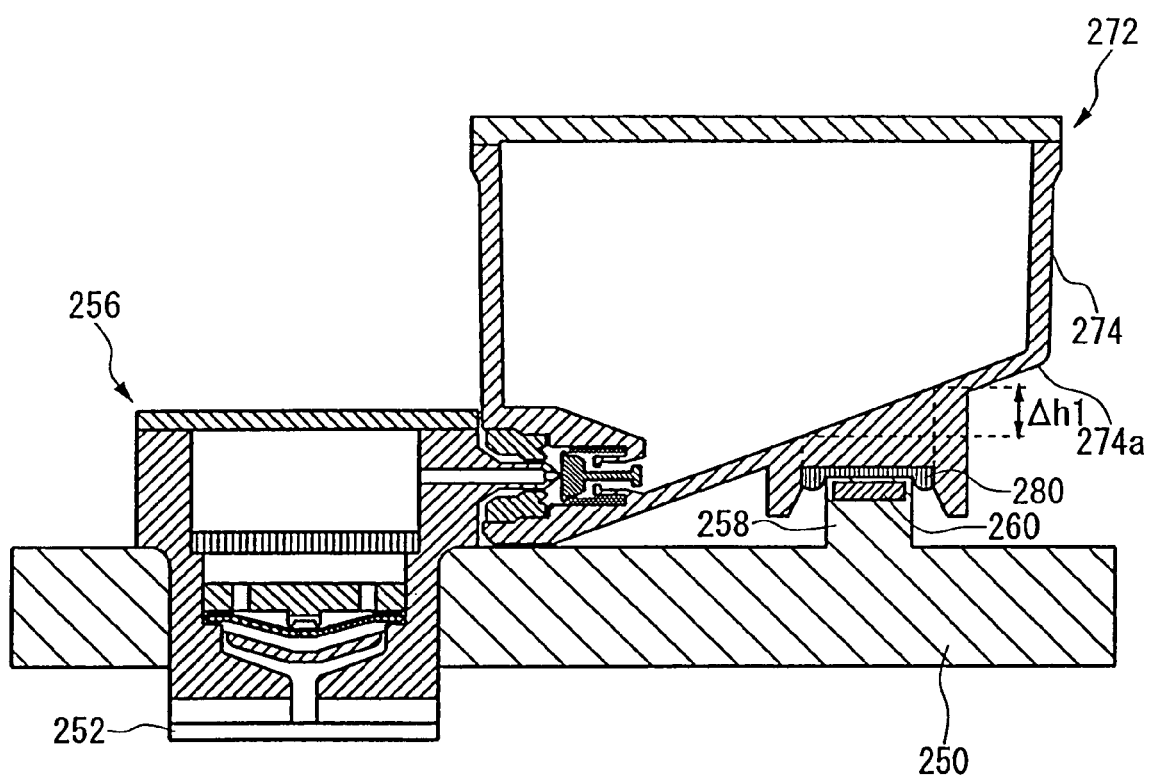
FIG. 17 shows an ink cartridge 272 according to still another embodiment of the present invention.

FIG. 17 shows an ink cartridge 272, according to still another embodiment of the present invention. In the ink cartridge 272 shown in FIG. 17, the bottom face 274a is formed a slope in the vertical direction.

In the ink cartridge 272 shown in FIG. 17, when the ink remaining amount is becoming low and part of a radiating area of the elastic wave generating means 260 is exposed from the liquid surface, the traveled time of the reflected wave of the elastic waves generated by the elastic wave generating means 260 continuously changes corresponding to the change Δh1 of the liquid surface. The Δh1 denotes change of the height of the bottom face 274a in both ends of the gelated material 280. Thus, the process from the ink-near-end state to the ink-end state of ink remaining amount can be accurately detected by detecting the degree of change in the traveled time of the reflected wave of the elastic wave generating means 260.

Figure 18:
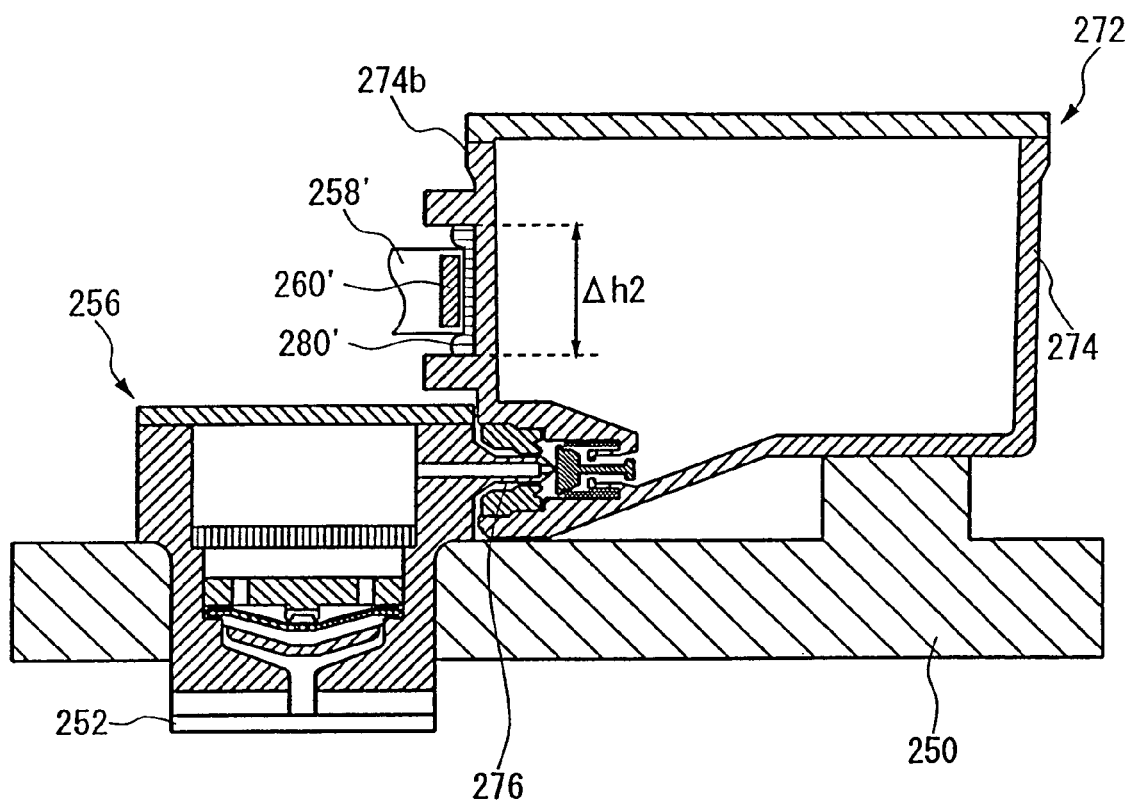
FIG. 18 shows an ink cartridge 272 and an ink-jet recording apparatus according to still another embodiment of the present invention.

FIG. 18 shows an ink cartridge 272 and an ink-jet recording apparatus according to still another embodiment of the present invention. The ink-jet recording apparatus shown in FIG. 18 includes a convex part 258' in a side face 274b in an ink supply port 276 side of the ink cartridge 272. The convex part 258' includes an elastic wave generating means 260'. Gelated material 280' is provided in the side face 274b of the ink cartridge 272 so as to engage with the convex part 258'. According to the ink cartridge 272 shown in FIG. 18, when the ink remaining amount is becoming low and part of a radiating area of the elastic wave generating means 260' is exposed from the liquid surface, the traveled time of the reflected wave of the elastic waves generated by the elastic wave generating means 260' and the acoustic impedance continuously change corresponding to the change Δh2 of the liquid surface. The Δh2 denotes difference in the height of both ends of the gelated material 280'. Thus, the process from the ink-near-end state to the ink-end state of ink remaining amount can be accurately detected by detecting the degree of change in the traveled time of the reflected wave of the elastic wave generating means 260 or change in the acoustic impedance.

In the above embodiments, description has been made by exemplifying the ink cartridge of a type where the ink is directly stored in the liquid container 274. As still another embodiment of the ink cartridge, the above-described elastic wave generating means 260 may be applied to an ink cartridge of another type where the container 274 is loaded with a porous elastic member and the porous elastic member is impregnated with the ink. In the above embodiments, the elastic wave is transmitted and received by the same elastic wave generating means 260 and 260' when the ink remaining amount is detected based on the reflected wave at the liquid surface. The present invention is not limited thereby and for example, as still another embodiment the elastic wave generating means 260 may be provided separately as one for use in transmitting the elastic wave and other for receiving the elastic wave, so as to detect the ink remaining amount.

Figure 19:
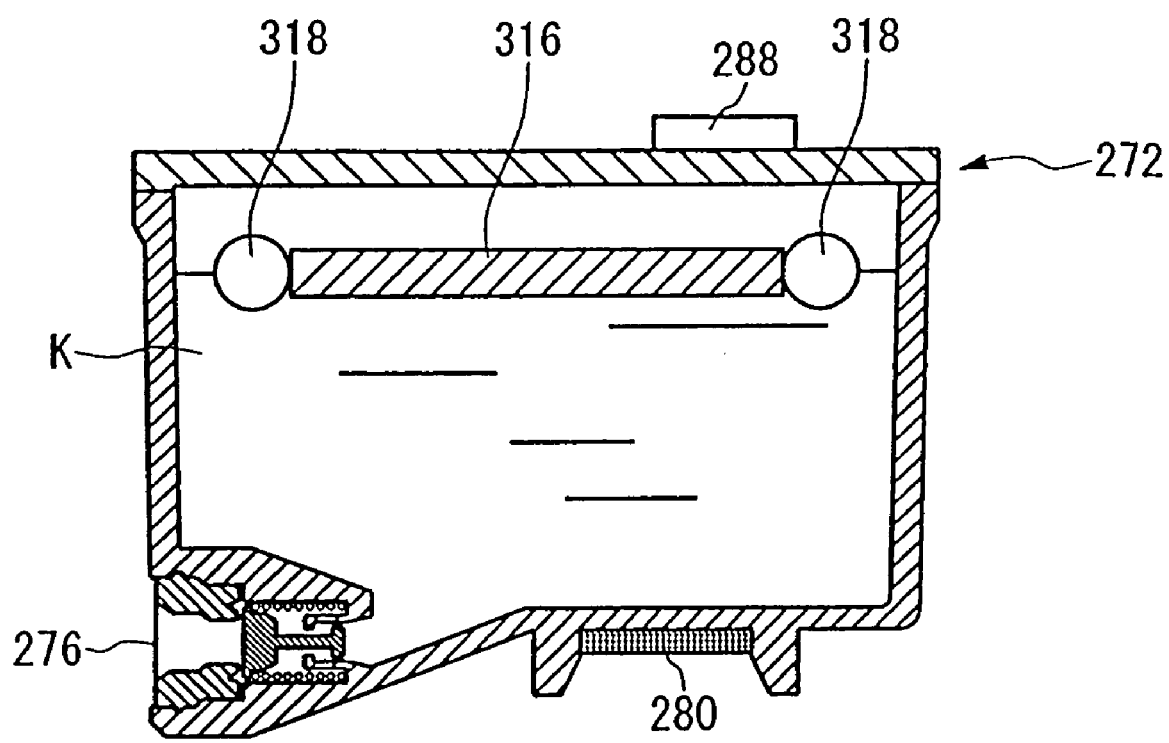
FIG. 19 shows still another embodiment of the ink cartridge 272 shown in FIG. 16.

FIG. 19 shows still another embodiment of the ink cartridge 272 shown in FIG. 16. A floating board 316 attached to a floater 318 covers the ink liquid in order to increase intensity of the reflected wave from the ink liquid surface. The floating board 316 is preferably formed of material which has-high acoustic impedance and is ink-resistant such as ceramic or the like.

Figure 21:
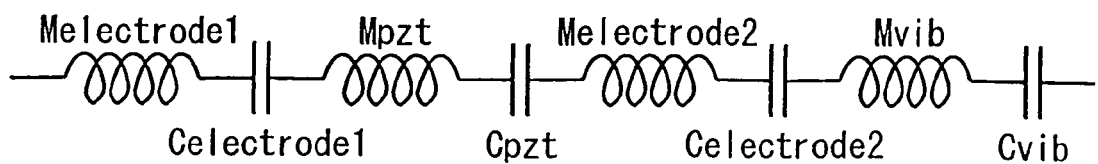
FIGS. 21A, 21B, 21C, 21D, 21E and 21F show periphery and equivalent circuits of the actuator 106.
Figure 21:
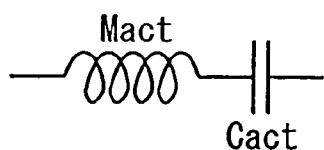
Figure 21:
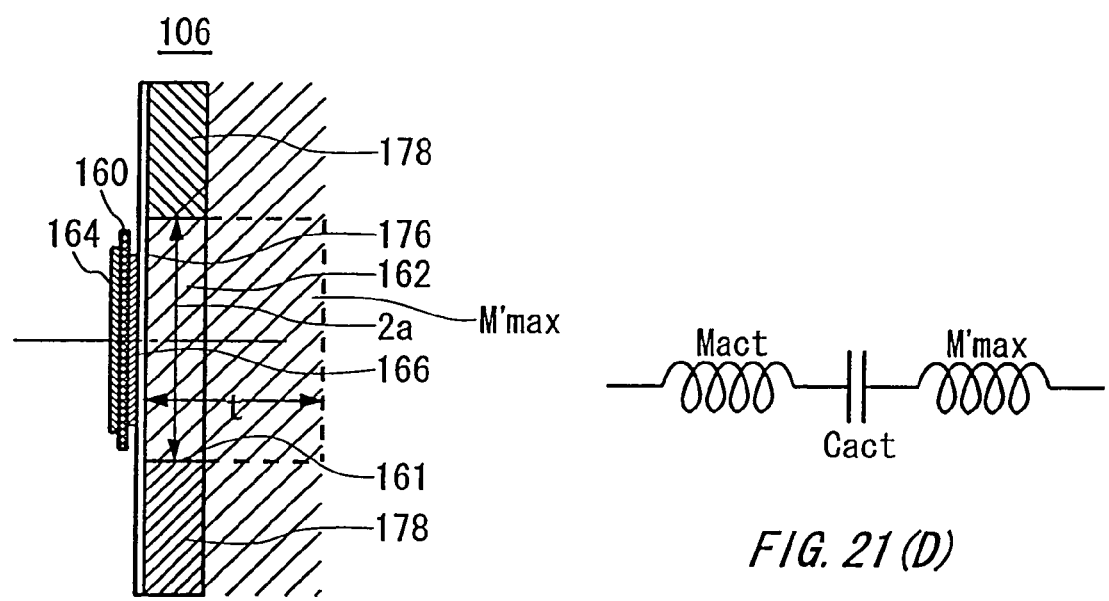
Figure 21:
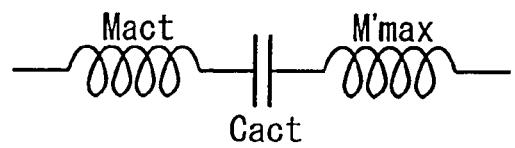
Figure 21:
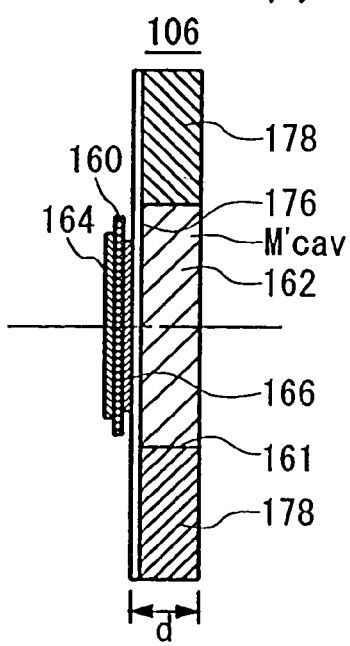
Figure 21:
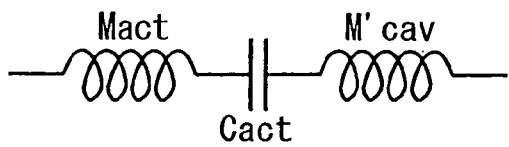

FIG. 20 and FIG. 21 shows a detail and equivalent circuit of an actuator 106, which is an embodiment of the piezoelectric device of the present invention. The actuator explained herein is used at least for the method which detects the liquid consumption status in the liquid container by detecting a change in acoustic impedance. Especially, the actuator is used for the method which detects the liquid consumption status in the liquid container by detecting at least the change in acoustic impedance by detecting the resonant frequency from residual vibration. FIG. 20(A) is an enlarged plan view of the actuator 106. FIG. 20(B) shows a B—B cross-section of the actuator 106. FIG. 20(C) shows a C—C cross-section of the actuator 106. FIG. 21(A) and FIG. 21(B) shows an equivalent circuit of the actuator 106. Each of FIG. 21(C) and FIG. 21(D) shows the actuator 106 and around the actuator 106, and the equivalent circuit of the actuator 106 when an ink is filled in the ink cartridge. FIG. 21(E) and FIG. 21(F) shows the actuator 106 and around the actuator 106, and the equivalent circuit of the actuator 106 when there is no ink in the ink cartridge.

The actuator 106 includes abase plate 178, a vibrating plate 176, a piezoelectric layer 160, an upper electrode 164 and a lower electrode 166, an upper electrode terminal 168, a lower electrode terminal 170, and a supplementary electrode 172. The base plate 178 has a circular shape opening 161 on approximately its center. The vibrating plate 176 is provided on one of the face, which is called as "right side" in following, of the base plate 178 such as to cover the opening 161. The piezoelectric layer 160 is disposed on right side of the surface of the vibrating plate 176. The upper electrode 164 and the lower electrode 166 sandwich the piezoelectric layer 160 from both sides. The upper electrode terminal 168 connects to the upper electrode 164 electrically. The lower electrode terminal 170 connects to the lower electrode 166 electrically. The supplementary electrode 172 is disposed between the upper electrode 164 and the upper electrode terminal 168 and connects both of the upper electrode 164 and the upper electrode terminal 168. Each of the piezoelectric layer 160, upper electrode 164, and the lower electrode 166 has a circular portion as its main portion. Each of the circular portion of the piezoelectric layer 160, the upper electrode 164, and the lower electrode 166 form a piezoelectric element.

The vibrating plate 176 is formed on the right side of the surface of the base plate 178 to cover the opening 161. The cavity 162 is formed by the portion of the vibrating plate 176, which faces the opening 161, and the opening 161 of the on the surface of the base plate 178. The face of the base plate 178 which is opposite side of the piezoelectric element, called as "back side" in following, is faced with the liquid container side. The cavity 162 is constructed such that the cavity 162 contacts with liquid. The vibrating plate 176 is mounted on the base plate 178 such that the liquid does not leak to the right side of the surface of the base plate 178 even if the liquid enters inside the cavity 162.

The lower electrode 166 is located on the right side of the vibrating plate 176, that is, opposite side against the liquid container. The lower electrode 166 is provided on the vibrating plate 176 such that the center of the circular portion of the lower electrode 166, which is a main portion of the lower electrode 166, and the center of the opening 161 substantially matches. The area of the circular portion of the lower electrode 166 is set to be smaller than the area of the opening 161. The piezoelectric layer 160 is formed on the right side of the surface of the lower electrode 166 such that the center of the circular portion and the center of the opening 161 substantially match. The area of the circular portion of the piezoelectric layer 160 is set to be smaller than the area of the opening 161 and larger than the area of the circular portion of the lower electrode 166.

The upper electrode 164 is formed on the right side of the surface of the piezoelectric layer 160 such that the center of the circular portion, which is a piezoelectric layer 160, and the center of the opening 161 substantially match. The area of the circular portion of the upper electrode 164 is set to be smaller than the area of the circular portion of the opening 161 and the piezoelectric layer 160 and larger than the area of the circular portion of the lower electrode 166.

Therefore, the main portion of the piezoelectric layer 160 has a structure to be sandwiched by the main portion of the upper electrode 164 and the main portion of the lower electrode each from right side face and back side face, and thus the main portion of the piezoelectric layer 160 can effectively drive and deform the piezoelectric layer 160. The circular portion, which is a main portion of each of the piezoelectric layer 160, the upper electrode 164, and the lower electrode 166, forms the piezoelectric element in the actuator 106. As explained above, the electric element contacts with the vibrating plate. Within the circular portion of the upper electrode 164, circular portion of the piezoelectric layer 160, the circular portion of the lower electrode, and the opening 161, the opening 161 has the largest area. By this structure, the vibrating region which actually vibrates within the vibrating plate is determined by the opening 161. Furthermore, each of the circular portion of the upper electrode 164 and the circular portion of the piezoelectric layer 160 and the circular portion of the lower electrode has smaller area than the area of the opening 161, The vibrating plate becomes easily vibrate. Within the circular portion of the lower electrode 166 and the circular portion of the upper electrode 164 which connects to the piezoelectric layer 160 electrically, the circular portion of the lower electrode 166 is smaller than the circular portion of the upper electrode 164. Therefore, the circular portion of the lower electrode 166 determines the portion which generates the piezoelectric effect within the piezoelectric layer 160.

The center of the circular portion of the piezoelectric layer 160, the upper electrode 164, and the lower electrode 166, which form the piezoelectric element, substantially match to the center of the opening 161. Moreover, the center of the circular shape opening 161, which determines the vibrating section of the vibrating plate 176, is provided on the approximately center of the actuator 106. Therefore, the center of the vibrating section of the actuator 106 matches to the center of the actuator 106. Because the main portion of the piezoelectric element and the vibrating section of the vibrating plate 176 have a circular shape, the vibrating section of the actuator 106 is symmetrical about a center of the actuator 106.

Because the vibrating section is symmetrical about a center of the actuator 106, the excitation of the unnecessary vibration occurred owing to the asymmetric structure can be prevented. Therefore, the accuracy of detecting the resonant frequency increases. Furthermore, because the vibrating section is symmetric about the center of the actuator 106, the actuator 106 is easy to manufacture, and thus the unevenness of the shape for each of the piezoelectric element can be decreased. Therefore, the unevenness of the resonant frequency for each of the piezoelectric element 174 decreases. Furthermore, because the vibrating section has an isotropic shape, the vibrating section is difficult to be influenced by the unevenness of the fixing during the bonding process. That is, the vibrating section is bonded to the liquid container uniformly. Therefore, the actuator 106 is easy to assemble to the liquid container.

Furthermore, because the vibrating section of the vibrating plate 176 has a circular shape, the lower resonant mode, for example, the primary resonant mode dominates on the resonant mode of the residual vibration of the piezoelectric layer 160, and thus the single peak appears on the resonant mode. Therefore, the peak and the noise can be distinguished clearly so that the resonant frequency can be clearly detected. Furthermore, the accuracy of the detection of the resonant frequency can be further increased by enlarge the area of the vibrating section of the circular shape vibrating plate 176 because the difference of the amplitude of the counter electromotive force and the difference of the amplitude of the resonant frequency occurred by whether the liquid exists inside the liquid container increase.

The displacement generated by the vibration of the vibrating plate 176 is larger than the displacement generated by the vibration of the base plate 178. The actuator 106 has a two layers structure that is constituted by the base plate 178 having a small compliance which means it is difficult to be displaced by the vibration, and the vibrating plate 176 having a large compliance which means it is easy to be displaced by the vibration. By this two layers structure, the actuator 106 can be reliably fixed to the liquid container by the base plate 178 and at the same time the displacement of the vibrating plate 176 by the vibration can be increased. Therefore, the difference of the amplitude of the counter electromotive force and the difference of the amplitude of the resonant frequency depended on whether the liquid exists inside the liquid container increases, and thus the accuracy of the detection of the resonant frequency increases. Furthermore, because the compliance of the vibrating plate 176 is large, the attenuation of the vibration decreases so that the accuracy of the detection of the resonant frequency increases. The node of the vibration of the actuator 106 locates on the periphery of the cavity 162, that is, around the margin of the opening 161.

The upper electrode terminal 168 is formed on the right side of the surface of the vibrating plate 176 to be electrically connected to the upper electrode 164 through the supplementary electrode 172. The lower electrode terminal 170 is formed on the right side of the surface of the vibrating plate 176 to be electrically connected to the lower electrode 166. Because the upper electrode 164 is formed on the right side of the piezoelectric layer 160, there is a difference in depth that is equal to the sum of the thickness of the piezoelectric layer 160 and the thickness of the lower electrode 166 between the upper electrode 164 and the upper electrode terminal 168. It is difficult to fill this difference in depth only by the upper electrode 164, and even it is possible to fill the difference in depth by the upper electrode 164, the connection between the upper electrode 164 and the upper electrode terminal 168 becomes weak so that the upper electrode 164 will be cut off. Therefore, this embodiment uses the supplementary electrode 172 as a supporting member to connects the upper electrode 164 and the upper electrode terminal 168. By this supplementary electrode 172, both of the piezoelectric layer 160 and the upper electrode 164 are supported by the supplementary electrode 172, and thus the upper electrode 164 can have desired mechanical strength, and also the upper electrode 164 and the upper electrode terminal 168 can be firmly connected.

The piezoelectric element and the vibrating section which faces to the piezoelectric element within the vibrating plate 176 constitute the vibrating section which actually vibrates in the actuator 106. Moreover, it is preferable to form the actuator 106 in one body by firing together the member included in the actuator 106. By forming the actuator 106 as one body, the actuator 106 becomes easy to be handled. Further, the vibration characteristic increases by increasing the strength of the base plate 178. That is, by increasing the strength of the base plate 178, only the vibrating section of the actuator 106 vibrates, and the portion other than the vibrating section of the actuator 106 does not vibrates. Furthermore, the prevention of the vibration of the portion other than the vibrating section of the actuator 106 can be achieved by increasing the strength of the base plate 178 and at the same time forming the actuator 106 as thinner and smaller as possible and forming the vibrating plate 176 as thinner as possible.

It is preferable to use lead zirconate titanate (PZT), lead lanthanum zirconate titanate (PLZT), or piezoelectric membrane without using lead as a material for the piezoelectric layer 160. It is preferable to use zirconia or aluminum as a material of the base plate 178. Furthermore, it is preferable to use same material as base plate 178 for a material of vibrating plate 176. The metal such as gold, silver, copper, platinum, aluminum, and nickel having a electrical conductivity can be used for the material of the upper electrode 164, the lower electrode 166, the upper electrode terminal 168, and the lower electrode terminal 170.

The actuator 106 constructed as explained above can be applied to the container which contains liquid. For example, the actuator 106 can be mounted on an ink cartridge used for the ink jet recording apparatus, an ink tank, or a container which contains washing liquid to wash the recording head.

The actuator 106 shown in the FIG. 20 and FIG. 21 is mounted on the predetermined position on the liquid container so that the cavity 162 can contact with the liquid contained inside the liquid container. When the liquid container is filled with liquid sufficiently, the inside and outside of the cavity 162 is filled with liquid. On the other hand, if the liquid inside liquid container consumed and the liquid level decreased under the mounting position of the actuator, there are conditions that liquid does not exit inside the cavity 162 or that liquid is remained only in the cavity 162 and air exits on outside the cavity 162. The actuator 106 detects at least the difference in the acoustic impedance occurred by this change in condition. By this detection of the difference in acoustic impedance, the actuator 106 can detects the whether the liquid is sufficiently filled in the liquid container or liquid is consumed more than predetermined level. Furthermore, the actuator 106 can detects the type of the liquid inside the liquid container.

The principle of the detection of the liquid level by the actuator will be explained.

To detect the acoustic impedance of a medium, an impedance characteristic or an admittance characteristic is measured. To measure the impedance characteristic or the admittance characteristic, for example, transmission circuit can be used. The transmission circuit applies a constant voltage on the medium and measure a current flow through the medium with changing a frequency. The transmission circuit provides a constant current to the medium and measures a voltage applied on the medium with changing a frequency. The change in current value and the voltage value measured at the transmission circuit shows the change in acoustic impedance. Furthermore, the change in a frequency fm, which is a frequency when the current value or the voltage value becomes maximum or minimum, also shows the change in acoustic impedance.

Other than method shown above, the actuator can detects the change in the acoustic impedance of the liquid using the change only in the resonant frequency. The piezoelectric element, for example, can be used in a case of using the method of detecting the resonant frequency by measuring the counter electromotive force generated by the residual vibration, which is remained in the vibrating section after the vibration of the vibrating section of the actuator, as a method of using the change in the acoustic impedance of the liquid. The piezoelectric element is element which generates the counter electromotive force by residual vibration remained in the vibrating section of the actuator. The magnitude of the counter electromotive force changes with the amplitude of the vibrating section of the actuator. Therefore, the larger the amplitude of the vibrating section of the actuator, the easier to detect the resonant frequency. Moreover, depends on the frequency of the residual vibration at the vibrating section of the actuator, the period, on which the magnitude of the counter electromotive force changes, changes. Therefore, the frequency of the vibrating section of the actuator corresponds to the frequency of the counter electromotive force. Here, the resonant frequency means the frequency when the vibrating section of the actuator and the medium, which contacts to the vibrating section, are in a resonant condition.

To obtain the resonant frequency fs, the waveform obtained by measuring the counter electromotive force when the vibrating section and the medium are in resonant condition is Fourier transformed. Because the vibration of the actuator is not a displacement for only one direction, but the vibration involves the deformation such as deflection and extension, the vibration has various kinds of frequency including the resonant frequency fs. Therefore, the resonant frequency fs is judged by Fourier transforming the waveform of the counter electromotive force when the piezoelectric element and the medium are in the resonant condition and then specifying the most dominating frequency components.

The frequency fm is a frequency when the admittance of the medium is maximum or the impedance is minimum. The frequency fm is different from the resonant frequency fs with little value because of the dielectric loss and the mechanical loss. However, the frequency fm is generally used as substitution for resonant frequency because it needs time for deriving the resonant frequency fs from the frequency fm which is actually measured. By inputting output of the actuator 106 to the transmission circuit, the actuator 106 can at least detect the acoustic impedance.

It is proved by the experiment that there is almost no differences with the resonant frequency obtained by the method, which measures the frequency fm by measuring the impedance characteristic and admittance characteristic of the medium, and the method, which measures the resonant frequency fs by measuring the counter electromotive force generated by the residual vibration at the vibrating section of the actuator.

The vibrating region of the actuator 106 is a portion which constitutes the cavity 162 that is determined by the opening 161 within the vibrating plate 176. When liquid is sufficiently filled in the liquid container, liquid is filled in the cavity 162, and the vibrating region contacts with liquid inside the liquid container. When liquid does not exists in the liquid container sufficiently, the vibrating region contacts with the liquid which is remained in the cavity inside the liquid container, or the vibrating region does not contacts with the liquid but contacts with the gas or vacuum.

The cavity 162 is provided on the actuator 106 of the present invention, and it can be designed that the liquid inside the liquid container remains in the vibrating region of the actuator 106 by the cavity 162. The reason will be explained as follows.

Depends on the mounting position and mounting angle of the actuator 106 on the liquid container, there is a case in which the liquid attaches to the vibrating region of the actuator even the liquid level in the liquid container is lower than the mounting position of the actuator. When the actuator detects the existence of the liquid only from the existence of the liquid on the vibrating region, the liquid attached to the vibrating region of the actuator prevents the accurate detection of the existence of the liquid. For example, If the liquid level is lower than the mounting position of the actuator, and the drop of the liquid attaches to the vibrating region by the waving of the liquid caused by the shaking of the liquid container caused by the movement of the carriage, the actuator 106 will misjudges that there is enough liquid in the liquid container. In this way, the malfunction can be prevented by using the actuator having cavity.

Furthermore, as shown in FIG. 21(E), the case when the liquid does not exit in the liquid container and the liquid of the liquid container remains in the cavity 162 of the actuator 106 is set as the threshold value of the existence of the liquid. That is, if the liquid does not exist around the cavity 162, and the amount of the liquid in the cavity is smaller than this threshold value, it is judged that there is no ink in the liquid container. If the liquid exist around the cavity 162, and the amount of the liquid is larger than this threshold value, it is judged that there is ink in the liquid container. For example, when the actuator 106 is mounted on the side wall of the liquid container, it is judged that there is no ink in the liquid container when the liquid level inside the liquid container is lower than the mounting position of the actuator 106, and it is judged that there is ink inside the liquid container when the liquid level inside the liquid container is higher than the mounting position of the actuator 106. By setting the threshold value in this way, the actuator 106 can judge that there is no ink in the liquid container even if the ink in the cavity is dried and disappeared. Furthermore, the actuator 106 can judge that there is no ink in the liquid container even if the ink attaches to the cavity again by shaking of the carriage after the ink in the cavity disappears because the amount of the ink attaches to the cavity again does not exceed the threshold value.

The operation and the principle of detecting the liquid condition of the liquid container from the resonant frequency of the medium and the vibrating section of the actuator 106 obtained by measuring the counter electromotive force will be explained reference to FIG. 20 and FIG. 21. A voltage is applied on each of the upper electrode 164 and the lower electrode 166 through the upper electrode terminal 168 and the lower electrode terminal 170. The electric field is generated on the portion of the piezoelectric layer 160 where the piezoelectric layer 160 is sandwiched by the upper electrode 164 and the lower electrode 166. By this electric field, the piezoelectric layer 160 deforms. By the deformation of the piezoelectric layer 160, the vibrating region within the vibrating plate 176 deflects and vibrates. For some period after the deformation of the piezoelectric layer 160, the vibration with deflection remains in the vibrating section of the actuator 106.

The residual vibration is a free oscillation of the vibrating section of the actuator 106 and the medium. Therefore, the resonant condition between the vibrating section and the medium can be easily obtained by applying the voltage of a pulse wave or a rectangular wave on the piezoelectric layer 160. Because the residual vibration vibrates the vibrating section of the actuator 106, the residual vibration also deforms the piezoelectric layer 160. Therefore, the piezoelectric layer 160 generates the counter electromotive force. This counter electromotive force is detected through the upper electrode 164, the lower electrode 166, the upper electrode terminal 168, and the lower electrode terminal 170. Because the resonant frequency can be specified by this detected counter electromotive force, the liquid consumption status in the liquid container can be detected.

Generally, the resonant frequency fs can be expressed as following.

$$fs=1/(2*\pi*(M*Cact)^{1/2}) \quad (1)$$

where M denotes the sum of an inertance of the vibrating section Mact and an additional inertance M'; Cact denotes a compliance of the vibrating section.

FIG. 20(C) shows a cross section of the actuator 106 when the ink does not exist in the cavity in the present embodiment. FIG. 21(A) and FIG. 21(B) shows the equivalent circuit of the vibrating section of the actuator 106 and the cavity 162 when the ink does not exist in the cavity.

The Mact is obtained by dividing the product of the thickness of the vibrating section and the density of the vibrating section by the area of the vibrating section. Furthermore, as shown in the FIG. 21(A), the Mact can be expressed as following in detail.

$$Mact=Mpzt+Melectrode1+Melectrode2+Mvib \quad (2)$$

Here, Mpzt is obtained by dividing the product of the thickness of the piezoelectric layer 160 in the vibrating section and the density of the piezoelectric layer 160 by the area of the piezoelectric layer 160. Melectrode1 is obtained by dividing the product of the thickness of the upper electrode 164 in the vibrating section and the density of the upper electrode 164 by the area of the upper electrode 164. Melectrode2 is obtained by dividing the product of the thickness of the lower electrode 166 in the vibrating section and the density of the lower electrode 166 by the area of the lower electrode 166. Mvib is obtained by dividing the product of the thickness of the vibrating plate 176 in the vibrating section and the density of the vibrating plate 176 by the area of the vibrating region of the vibrating plate 176. However each of the size of the area of the vibrating region of the piezoelectric layer 160, the upper electrode 164, the lower electrode 166, and vibrating plate 176 have a relationship as shown above, the difference among each of the area of the vibrating region is prefer to be microscopic to enable the calculation of the Mact from the thickness, density, and area as whole of the vibrating section. Moreover, it is preferable that the portion other than the circular portion which is a main portion of each of the piezoelectric layer 160, the upper electrode 164, and the lower electrode 166 is microscopic so that it can be ignored compared to the main portion. Therefore, Mact is sum of the inertance of the each of the vibrating region of the upper electrode 164, the lower electrode 166, the piezoelectric layer 160, and the vibrating plate 176 in the actuator 106. Moreover, the compliance Cact is a compliance of the portion formed by the each of the vibrating region of the upper electrode 164, the lower electrode 166, the piezoelectric layer 160, and the vibrating plate 176.

FIG. 21(A), FIG. 21(B), FIG. 21(D), and FIG. 21(F) show the equivalent circuit of the vibrating section of the actuator 106 and the cavity 162. In these equivalent circuits, Cact shows a compliance of the vibrating section of the actuator 106. Each of the Cpzt, Celectrode1, Celectrode2, and Cvib shows the compliance of the vibrating section of the piezoelectric layer 160, the upper electrode 164, the lower electrode 166, and the vibrating plate 176. Cact can be shown as following equation.

$$1/Cact = (1/Cpzt) + (1/Celectrode1) + (1/Celectrode2) + (1/Cvib) \quad (3)$$

From the equation (2) and (3), FIG. 21(A) can be expressed as FIG. 21(B).

The compliance Cact shows the volume which can accept the medium by the deformation generated by the application of the pressure on the unit area of the vibrating section. In other words, the compliance Cact shows the easiness to be deformed.

FIG. 21(C) shows the cross section of the actuator 106 when the liquid is sufficiently filled in the liquid container, and the periphery of the vibrating region of the actuator 106 is filled with the liquid. The M'max shown in FIG. 21(C) shows the maximum value of the additional inertance when the liquid is sufficiently filled in the liquid container, and the periphery of the vibrating region of the actuator 106 is filled with the liquid. The M'max can be expressed as $$M'\text{max} = (\pi^* \rho/(2^*k^3))^*(2^*(2^*k^*a)^3/(3^*\pi))/(\pi^*a^2)^2 \quad (4)$$

where a denotes the radius of the vibrating section; ρ denotes the density of the medium; and k denotes the wave number. The equation (4) applies when the vibrating region of the actuator 106 is circular shape having the radius of "a". The additional inertance M' shows the quantity that the mass of the vibrating section is increased virtually by the effect of the medium which exists around the vibrating section.

As shown in equation (4), the M'max can changes significantly by the radius of the vibrating section "a" and the density of the medium ρ.

The wave number k can be expressed by following equation.

$$k = 2^*\pi^*fact/c \quad (5)$$

where fact denotes the resonant frequency of the vibrating section when the liquid does not contact with the vibrating section; and c denotes the speed of the sound propagate through the medium.

FIG. 21(D) shows an equivalent circuit of the vibrating section of the actuator 106 and the cavity 162 as in the case of FIG. 21(C) when the liquid is sufficiently filled in the liquid container, and the periphery of the vibrating region of the actuator 106 is filled with the liquid.

FIG. 21(E) shows the cross section of the actuator 106 when the liquid in the liquid container is consumed, and there is no liquid around the vibrating region of the actuator 106, and the liquid remains in the cavity 162 of the actuator 106. The equation (4) shows the maximum inertance M'max determined by such as the ink density ρ when the liquid container is filled with the liquid. On the other hand, if the liquid in the liquid container is consumed and liquid existed around the vibrating section of the actuator 106 becomes gas or vacuum with the liquid remaining in the cavity 162, the M' can be expressed as following equation.

$$M' = \rho^*t/S \quad (6)$$

where t denotes the thickness of the medium related to the vibration; S denotes the area of the vibrating region of the actuator 106. If this vibrating region is circular shape having a radius of "a", the S can be shown as $S = \pi^*a^2$. Therefore, the additional inertance M' follows the equation (4) when the liquid is sufficiently filled in the liquid container, and the periphery of the vibrating region of the actuator 106 is filled with the liquid. The additional inertance M' follows the equation (6) when the liquid in the liquid container is consumed, and there is no liquid exits around the vibrating region of the actuator 106, and the liquid is remained in the cavity 162.

Here, as shown in FIG. 21(E), let the additional inertance M', when the liquid in the liquid container is consumed, and there is no liquid exits around the vibrating region of the actuator 106, and the liquid is remained in the cavity 162, as M'cav to distinguish with the additional inertance M'max, which is the additional inertance when the periphery of the vibrating region of the actuator 106 is filled with the liquid.

FIG. 21(F) shows an equivalent circuit of the vibrating section of the actuator 106 and the cavity 162 in the case of FIG. 21(E) when the liquid in the liquid container is consumed, and there is no liquid around the vibrating region of the actuator 106, and the liquid remains in the cavity 162 of the actuator 106.

Here, the parameters related to the status of the medium are density of the medium ρ and the thickness of the medium t in equation (6). When the liquid is sufficiently filled in the liquid container, the liquid contacts with the vibrating section of the actuator 106. When the liquid is insufficiently filled in the liquid container, the liquid is remained in the cavity, or the gas or vacuum contacts with the vibrating section of the actuator 106. If let the additional inertance during the process of the shifting from the M'max of FIG. 21(C) to the M'var of FIG. 21(E) when the liquid around the actuator 106 is consumed, because the thickness of the medium t changes according to the containing status of the liquid in the liquid container, the additional inertance M'var changes, and resonant frequency also changes. Therefore, the existence of the liquid in the liquid container can be detected by specify the resonant frequency. Here, if let t=d, as shown in FIG. 21(E) and using the equation (6) to express the m'cav, the equation (7) can be obtained by substituting the thickness of the cavity "d" into the "t" in the equation (6).

$$M'cav = \rho^*d/S \quad (7)$$

Moreover, if the medium are different types of liquid with each other, the additional inertance M' changes and resonant frequency fs also changes because the density ρ is different according to the difference of the composition. Therefore, the types of the liquid can be detected by specifying the resonant frequency fs. Moreover, when only one of the ink or air contacts with the vibrating section of the actuator 106, and the ink and air is not existing together, the difference in M' can be detected by calculating the equation (4).

Figure 22A:
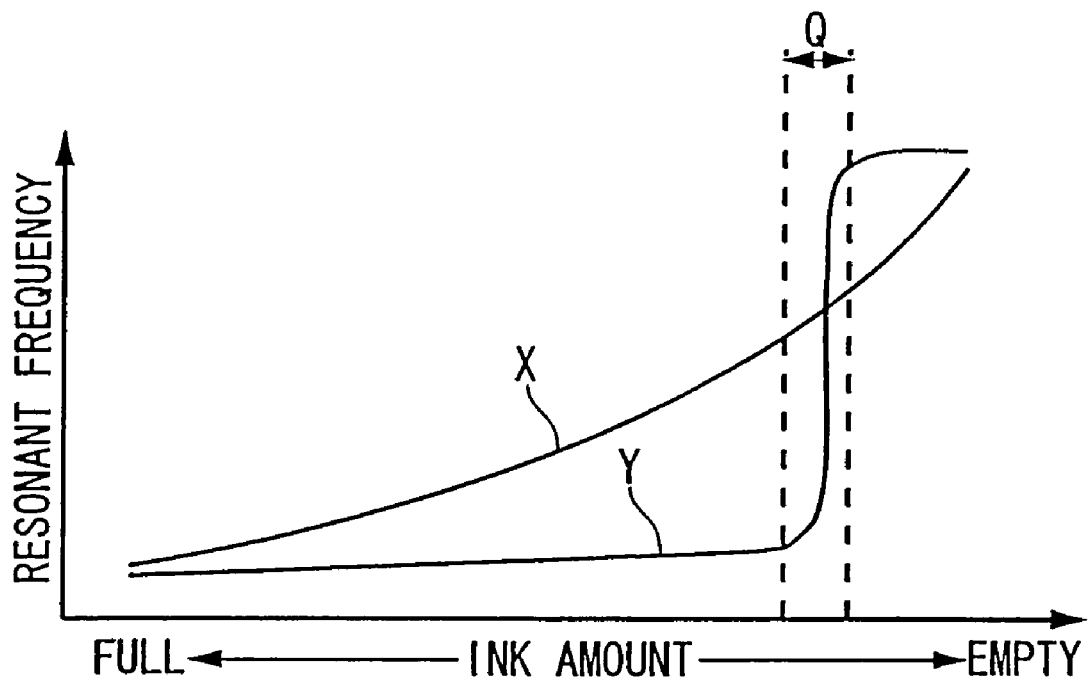
FIGS. 22A and 22B show relationship between the ink density and ink resonant frequency detected by the actuator 106.

FIG. 22(A) is a graph which shows the relationship between the ink quantity inside the ink tank and the resonant frequency fs of the ink and the vibrating section. Here, the case for the ink will be explained as an example of the liquid. The vertical axis shows the resonant frequency fs, and the horizontal axis shows the ink quantity. When the ink composition is constant, the resonant frequency increases according to the decreasing of the ink quantity.

When ink is sufficiently filled in the ink container, and ink is filled around the vibrating region of the actuator 106, the maximum additional inertance M'max becomes the value shown in the equation (4). When the ink is consumed, and there is no ink around the vibrating region of the actuator 106, and the ink remains in the cavity 162, the additional inertance M'var is calculated by the equation (6) based on the thickness of the medium t. Because the "t" used in the equation (6) is the thickness of the medium related to the vibration, the process during which the ink is consumed gradually can be detected by forming the "d" (refer to FIG. 20(B)) of the cavity 162 of the actuator 106 as small as possible, that is, forming the thickness of the base plate 178 as sufficiently thinner as possible (refer to FIG. 21(C)). Here, let the t-ink as the thickness of the ink involved with the vibration, and t-ink-max as the t-ink when the additional inertance is M'max. For example, the actuator 106 is mounted on the bottom of the ink cartridge horizontally to the surface of the ink. If ink is consumed, and the ink level becomes lower than the height t-ink-max from the actuator 106, the M'var gradually changes according to the equation (6), and the resonant frequency fs gradually changes according to the equation (1). Therefore, until the ink level is within the range of "t", the actuator 106 can gradually detect the ink consumption status.

Furthermore, by enlarge or lengthen the vibrating section of the actuator 106 and arrange the actuator 106 along a lengthwise direction, the "S" in the equation (6) changes according to the change of ink level with ink consumption. Therefore, the actuator 106 can detect the process while the ink is gradually consumed. For example, the actuator 106 is mounted on the side wall of the ink cartridge perpendicularly to the ink surface. When the ink is consumed and the ink level reaches to the vibrating region of the actuator 106, because the additional inertance M' decreases with the decreasing of the ink level, the resonant frequency fs gradually increases according to the equation (1). Therefore, unless the ink level is within the range of the radius 2a of the cavity 162 (refer to FIG. 21(C)), the actuator 106 can gradually detect the ink consumption status.

The curve X in FIG. 22(A) shows the relationship between the ink quantity contained inside of the ink tank and the resonant frequency fs of the ink and the vibrating section when the vibrating region of the actuator 106 is formed sufficiently large or long. It can be understand that the resonant frequency fs of the ink and vibrating section gradually changes with the decrease of the ink quantity inside the ink tank.

In detail, the case when the actuator 106 can detect the process of the gradual consumption of the ink is the case when the liquid and gas having different density with each other are existed together and also involved with vibration. According to the gradual consumption of the ink, the liquid decreases with increasing of the gas in the medium involved with the vibration around the vibrating region of the actuator 106. For example, the case when the actuator 106 is mounted on the ink cartridge horizontally to the ink surface, and t-ink is smaller than the t-ink-max, the medium involved with the vibration of the actuator 106 includes both of the ink and the gas. Therefore, the following equation (8) can be obtained if let the area of the vibrating region of the actuator 106 as S and express the status when the additional inertance is below M'max in the equation (4) by additional mass of the ink and the gas.

$$M'=M'\text{air}+M'\text{ink}=\rho\text{air}*t\text{-air}/S+\rho\text{ink}*t\text{-ink}/S \qquad (8)$$

where M'max is an inertance of an air; M'ink is an inertance of an ink; ρair is a density of an air; ρink is a density of an ink; t-air is the thickness of the air involved with the vibration; and t-ink is the thickness of the ink involved with the vibration. In case when the actuator 106 is mounted on the ink cartridge approximately horizontally to the ink surface, the t-air increases and the t-ink decreases with the increase of the gas and the decrease of the ink within the medium involved with the vibration around the vibrating region of the actuator 106. The additional inertance M' gradually decreases, and the resonant frequency gradually increases by above changes of the t-air and the t-ink. Therefore, the ink quantity remained inside the ink tank or the ink consumption quantity can be detected. The equation (7) depends only on the density of the liquid because of the assumption that the density of the air is small compare to the density of the liquid so that the density of the air can be ignored.

When the actuator 106 is provided on the ink cartridge substantially perpendicular to the ink surface, the status can be expressed as the equivalent circuit, not shown in the figure, on which the region, where the medium involved with the vibration of the actuator 106 is ink only, and the region, where the medium involved with the vibration of the actuator 106 is gas, can be expressed as parallel circuit. If let the area of the region where the medium involved with the vibration of the actuator 106 is ink only as Sink, and let the area of the region where the medium involved with the vibration of the actuator 106 is gas only as Sair, the following equation (9) can be obtained.

$$1/M'=1/M'\text{air}+1/M'\text{ink}=S\text{air}/(\rho\text{air}*t\text{-air})+S\text{ink}/(\rho\text{ink}*t\text{-ink}) \qquad (9)$$

The equation (9) can be applied when the ink is not held in the cavity of the actuator 106. The case when the ink is held in the cavity can be calculated using the equation (7), (8), and (9).

In the case when the thickness of the base plate 178 is thick, that is, the depth of the cavity 162 is deep and d is comparatively close to the thickness of the medium t-ink-max, or in the case when using actuator having a very small vibrating region compared to height of the liquid container, the actuator does not detect the process of the gradual decrease of the ink but actually detects whether the ink level is higher or lower than the mounting position of the actuator. In other words, the actuator detects the existence of the ink at the vibrating region of the actuator. For example, the curve Y in FIG. 22(A) shows the relationship between the ink quantity in the ink tank and the resonant frequency fs of the vibrating section when the vibrating section is small circular shape. The curve Y shows that the resonant frequency fs of the ink and the vibrating section changes extremely during the range of change of ink quantity Q, which corresponds to the status before and after the ink level in the ink tank passes the mounting position of the actuator. By this changes of the resonant frequency fs, it can be detected whether the ink quantity remained in the ink tank is more than the predetermined quantity.

The method of using the actuator 106 for detecting the existence of the liquid is more accurate than the method which calculates the quantity of ink consumption by the software because the actuator 106 detects the existence of the ink by directly contacting with the liquid. Furthermore, the method using an electrode to detects the existence of the ink by conductivity is influenced by the mounting position to the liquid container and the ink type, but the method using the actuator 106 to detects the existence of the liquid does not influenced by the mounting position to the liquid container and the ink type. Moreover, because both of the oscillation and detection of the existence of the liquid can be done by the single actuator 106, the number of the sensor mounted on the liquid container can be reduced compare to the method using separate sensor for oscillation and the detection of the existence of the liquid. Therefore, the liquid container can be manufactured at a low price. Furthermore, the sound generated by the actuator 106 during the operation of the actuator 106 can be reduced by setting the vibrating frequency of the piezoelectric layer 160 out of the audio frequency.

Figure 22B:
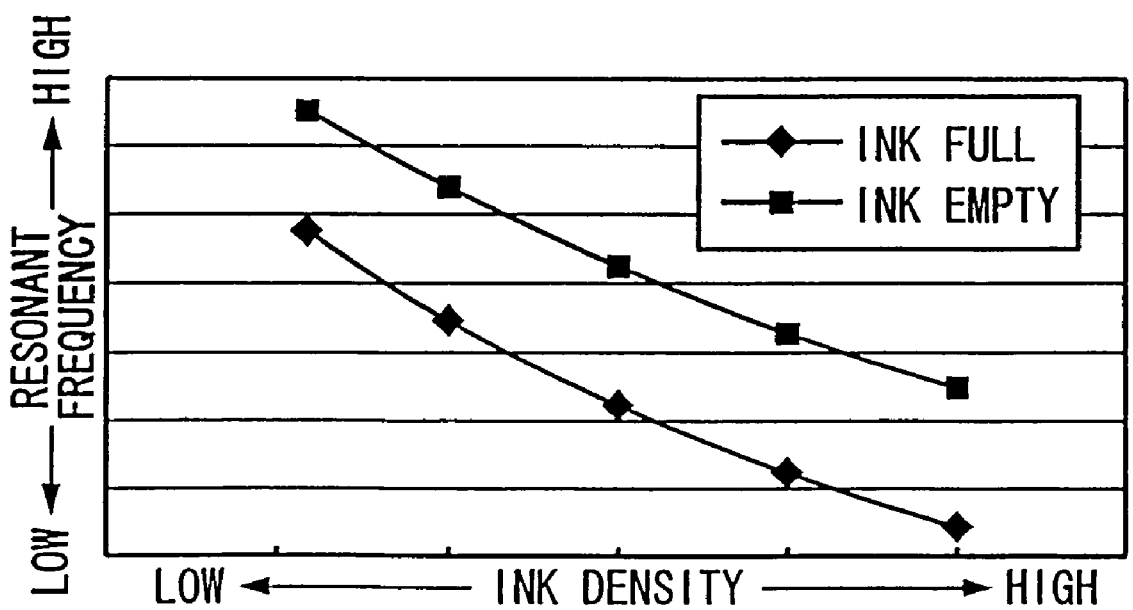

FIG. 22(B) shows the relationship between the density of the ink and the resonant frequency fs of the ink and the vibrating section of the curve Y shown in FIG. 22(A). Ink is used as an example of liquid. As shown in FIG. 22(B), when ink density increases, the resonant frequency fs decreases because the additional inertance increases. In other words, the resonant frequency fs are different with the types of the ink. Therefore, By measuring the resonant frequency fs, it can be confirmed whether the ink of a different density has been mixed together during the re-filling of the ink to the ink tank.

Therefore, the actuator 106 can distinguish the ink tank which contains the different type of the ink.

The condition when the actuator 106 can accurately detects the status of the liquid will be explained in detail in following. The case is assumed that the size and the shape of the cavity is designed so that the liquid can be remained in the cavity 162 of the actuator 106 even when the liquid inside the liquid container is empty. The actuator 106 can detect the status of the liquid even when the liquid is not filled in the cavity 162 if the actuator 106 can detect the status of the liquid when the liquid is filled in the cavity 162.

The resonant frequency fs is a function of the inertance M. The inertance M is a sum of the inertance of the vibrating section Mact and the additional inertance M'. Here, the additional inertance M' has the relationship with the status of the liquid. The additional inertance M' is a quantity of a virtual increase of a mass of the vibrating section by the effect of the medium existed around the vibrating section. In other words, the additional inertance M' is the amount of increase of the mass of the vibrating section which is increased by the vibration of the vibrating section that virtually absorbs the medium.

Therefore, when the M'cav is larger than the M'max in the equation (4), all the medium which is virtually absorbed is the liquid remained in the cavity 162. Therefore, the status when the M'cav is larger than the M'max is same with the status that the liquid container is fill with liquid. The resonant frequency fs does not change because the M' does not change in this case. Therefore, the actuator 106 cannot detect the status of the liquid in the liquid container.

On the other hand, if the M'cav is smaller than the M'max in the equation (4), the medium which is virtually absorbed is the liquid remained in the cavity 162 and the gas or vacuum in the liquid container. In this case, because the M' changes, which is different with the case when the liquid is filled in the liquid container, the resonant frequency fs changes. Therefore, the actuator 106 can detect the status of the liquid in the liquid container.

The condition whether the actuator 106 can accurately detect the status of the liquid is that the M'cav is smaller than the M'max when the liquid is remained in the cavity 162 of the actuator 106, and the liquid container is empty. The condition M'max>M'cav, on which the actuator 106 can accurately detect the status of the liquid, does not depend on the shape of the cavity 162.

Here, the M'cav is the mass of the liquid of the volume which is substantially equal to the volume of the cavity 162. Therefore, the condition, which can detect the status of the liquid accurately, can be expressed as the condition of the volume of the cavity 162 from the inequality M'max>M'cav. For example, if let the radius of the opening 161 of the circular shaped cavity 162 as "a" and the thickness of the cavity 162 as "d", then the following inequality can be obtained.

$$M'\text{max} > \rho * d / \pi a^2 \qquad (10)$$

By expanding the inequality (10), the following condition can be obtained.

$$a/d > 3 * \pi / 8 \qquad (11)$$

The inequality (10) and (11) are valid only when the shape of the cavity 162 is circular. By using the equation when the M'max is not circular and substituting the area $\pi a^2$ with its area, the relationship between the dimension of the cavity such as a width and a length of the cavity and the depth can be derived.

Therefore, if the actuator 106 has the cavity 162 which has the radius of the opening 161 "a" and the depth of the cavity "d" that satisfy the condition shown in inequality (11), the actuator 106 can detect the liquid status without malfunction even when the liquid container is empty and the liquid is remained in the cavity 162.

Because the additional inertance influences the acoustic impedance characteristic, it can be said that the method of measuring the counter electromotive force generated in actuator 106 by residual vibration measures at least the change of the acoustic impedance.

Furthermore, according to the present embodiment, the actuator 106 generates the vibration, and the actuator 106 itself measures the counter electromotive force in actuator 106 which is generated by the residual vibration remained after the vibration of the actuator 106. However, it is not necessary for the vibrating section of the actuator 106 to provide the vibration to the liquid by the vibration of the actuator 106 itself which is generated by the driving voltage. Even the vibrating section itself does not oscillates, the piezoelectric layer 160 deflects and deforms by vibrates together with the liquid, which contacts with the vibrating section with some range. This residual vibration generates the counter electromotive force voltage in the piezoelectric layer 160 and transfer this counter electromotive force voltage to the upper electrode 164 and the lower electrode 166. The status of the liquid can be detected using this phenomenon. For example, in case of the ink jet recording apparatus, the status of the ink tank or the ink contained inside the ink tank can be detected using the vibration around the vibrating section of the actuator which is generated by the vibration generated by the reciprocating motion of the carriage to scanning the print head during the printing operation.

Figure 23A:
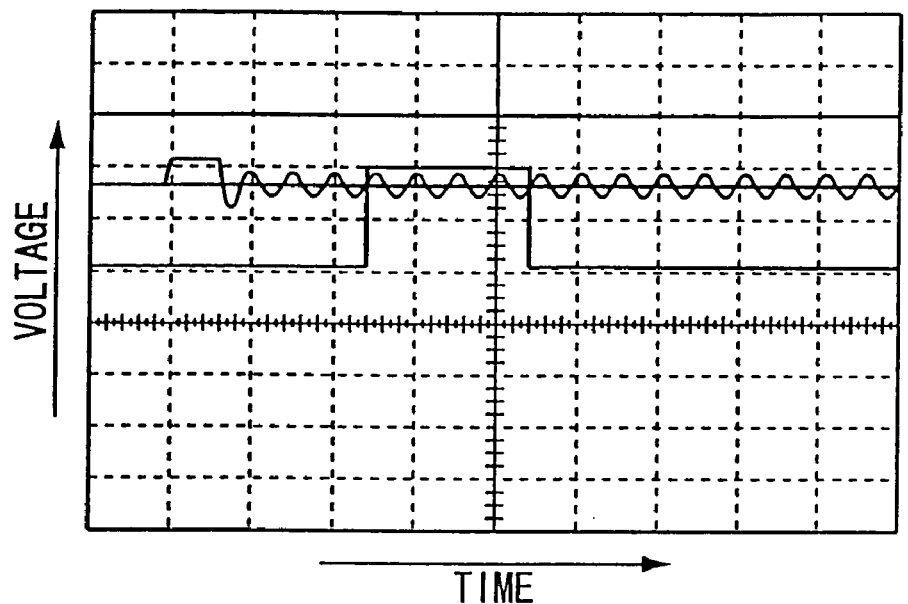
FIGS. 23A and 23B show waveforms of the counter electromotive force of the actuator 106.
Figure 23B:
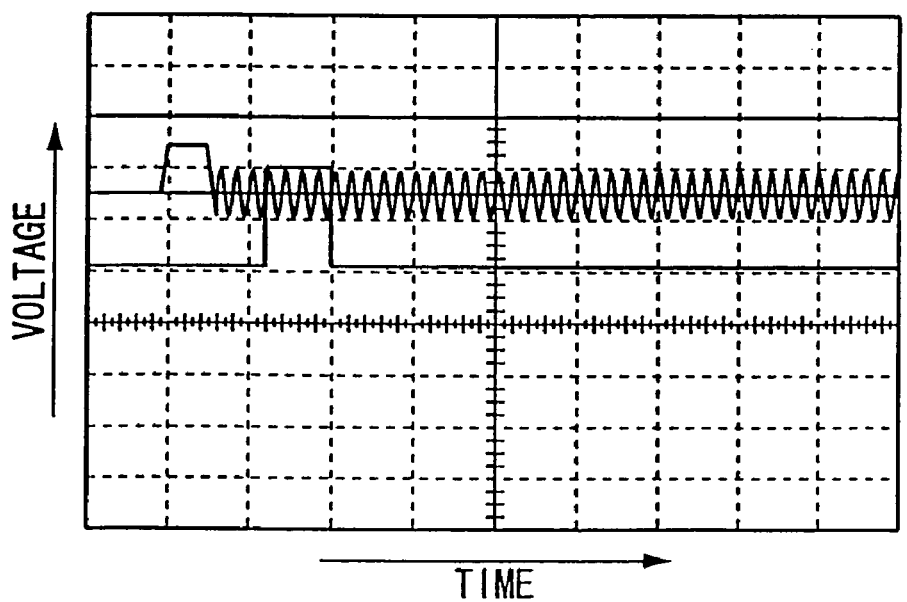

FIG. 23(A) and FIG. 23(B) shows a waveform of the residual vibration of the actuator 106 and the measuring method of the residual vibration. The change of the ink level at the level of the mounting position of the actuator 106 in the ink cartridge can be detected by the change in the frequency or the amplitude of the residual vibration remained after the oscillation of the actuator 106. In FIG. 23(A) and FIG. 23(B), the vertical axis shows the voltage of the counter electromotive force generated by the residual vibration of the actuator 106, and the horizontal axis shows the time. By the residual vibration of the actuator 106, the waveform of the analog signal of the voltage generates as shown in FIG. 23(A) and FIG. 23(B). Then, the analog signal is converted to a digital numerical value corresponding to the frequency of the signal.

In the example sown in FIG. 23(A) and FIG. 23(B), the existence of the ink is detected by measuring the time during the generation of the four numbers of pulses from the fourth pulse to the eighth pulse of the analog signal.

In detail, after the actuator 106 oscillates, the number of the times when the analog signal get across the predetermined reference voltage form the low voltage side to the high voltage side. The digital signal is set to be high while the analog signal becomes fourth counts to the eighth counts, and the time during fourth counts to the eighth counts is measured by predetermined clock pulse.

FIG. 23(A) shows the waveform when the ink level is above the level of the mounting position of the actuator 106. FIG. 23(B) shows the waveform when the ink level is below the level of the mounting position of the actuator 106. Comparing the FIG. 23(A) and FIG. 23(B), the time of the FIG. 23(A) during the fourth counts to the eighth counts is longer than the time of the FIG. 23(B). In other words, depends on the existence of the ink, the time from the fourth counts to the eighth counts is different. By using this difference of the time, the consumption status of the ink can be detected. The reason to count the analog signal from the fourth counts is to start the measurement of the time after the vibration of the actuator 106 becomes stable. It is only one of the example of starting the measurement from fourth counts, but measurement can be started from the desired counts.

The signals from the fourth counts to the eighth counts are detected, and the time from the fourth counts to the eighth counts is measured by the predetermined clock pulse. By this measurement, the resonant frequency can be obtained. The clock pulse is prefer to be a pulse having a same clock with the clock for controlling such as the semiconductor memory device which is mounted on the ink cartridge. It does not necessary to measure the time until the eighth counts, but the time until the desired counts can be measured. In FIG. 23, the time from the fourth counts to the eighth counts is measured, however, the time during the different interval of the counts also can be detected according to the circuit configuration which detects the frequency.

For example, when the ink quality is stable and the fluctuation of the amplitude of the peak is small, the resonant frequency can be detected by detecting the time from the fourth counts to the sixth counts to increase the speed of detection. Moreover, when the ink quality is unstable and the fluctuation of the amplitude of the pulse is large, the time from the fourth counts to the twelfth counts can be detected to detect the residual vibration accurately.

Furthermore, as other embodiments, the wave number of the voltage waveform of the counter electromotive force during the predetermined period can be counted. More specifically, after the actuator 106 oscillates, the digital signal is set to be high during the predetermined period, and the number of the times when the analog signal is get across the predetermined reference voltage from the low voltage side to the high voltage side is counted. By measuring the count number, the existence of the ink can be detected.

Furthermore, it can be known by comparing FIG. 23(A) with FIG. 23(B), the amplitude of the waveform of the counter electromotive force is different when the ink is filled in the ink cartridge and when the ink is not existed in the ink cartridge. Therefore, the ink consumption status in the ink cartridge can be detected by measuring the amplitude of the waveform of the counter electromotive force without calculating the resonant frequency. More specifically, for example, a reference voltage is set between the peak point of the waveform of the counter electromotive force of the FIG. 23(A) and the peak point of the waveform of the counter electromotive force of the FIG. 23(B). Then, after the actuator 106 oscillates, set the digital signal to be high at the predetermined time. Then, if the waveform of the counter electromotive force get across the reference voltage, it can be judged that there is no ink in the ink cartridge. If the waveform of the counter electromotive force does not get across the reference voltage, it can be judged that there is ink in the ink cartridge.

Figure 24:
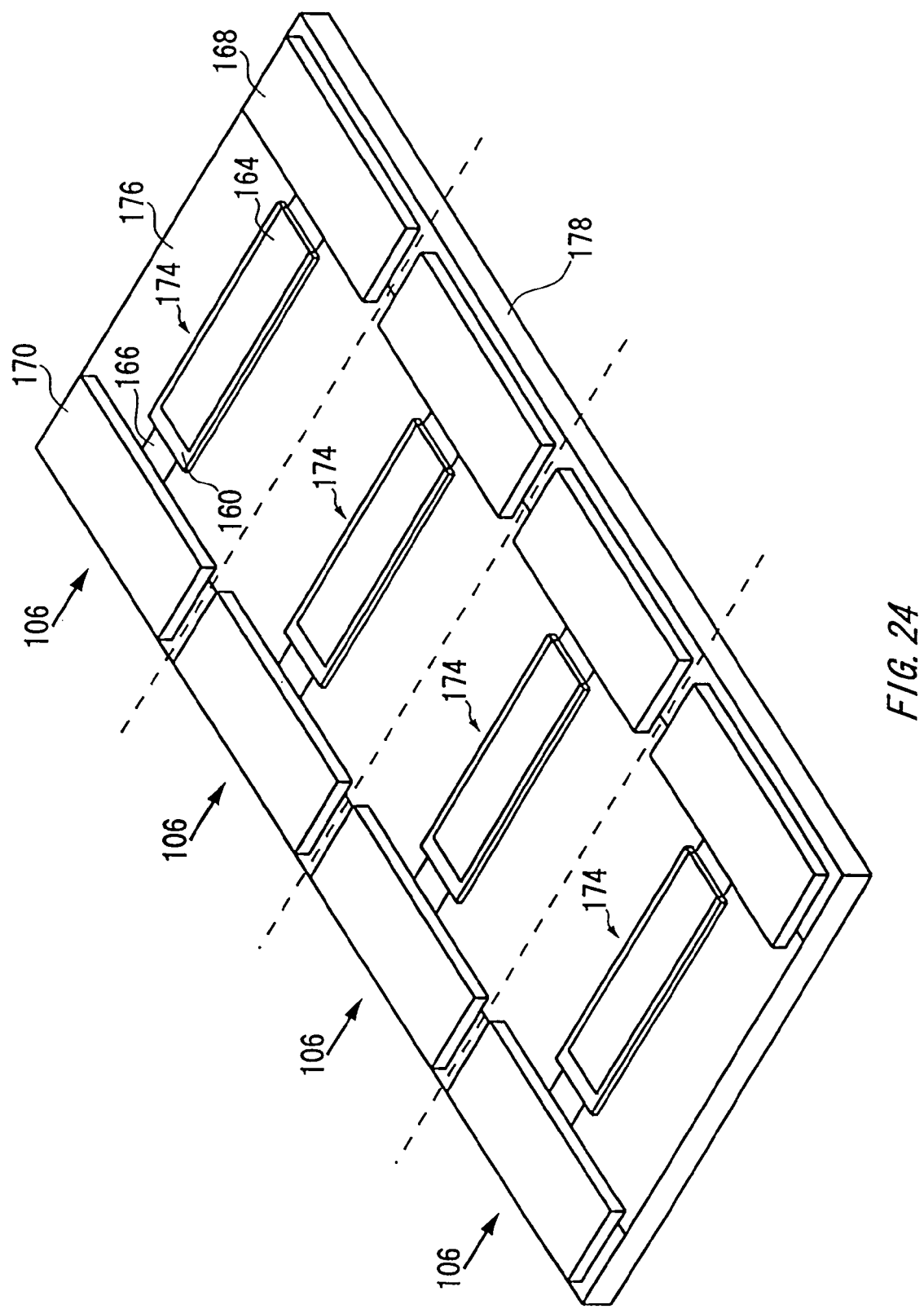
FIG. 24 shows another embodiment of the actuator 106.
Figure 25:
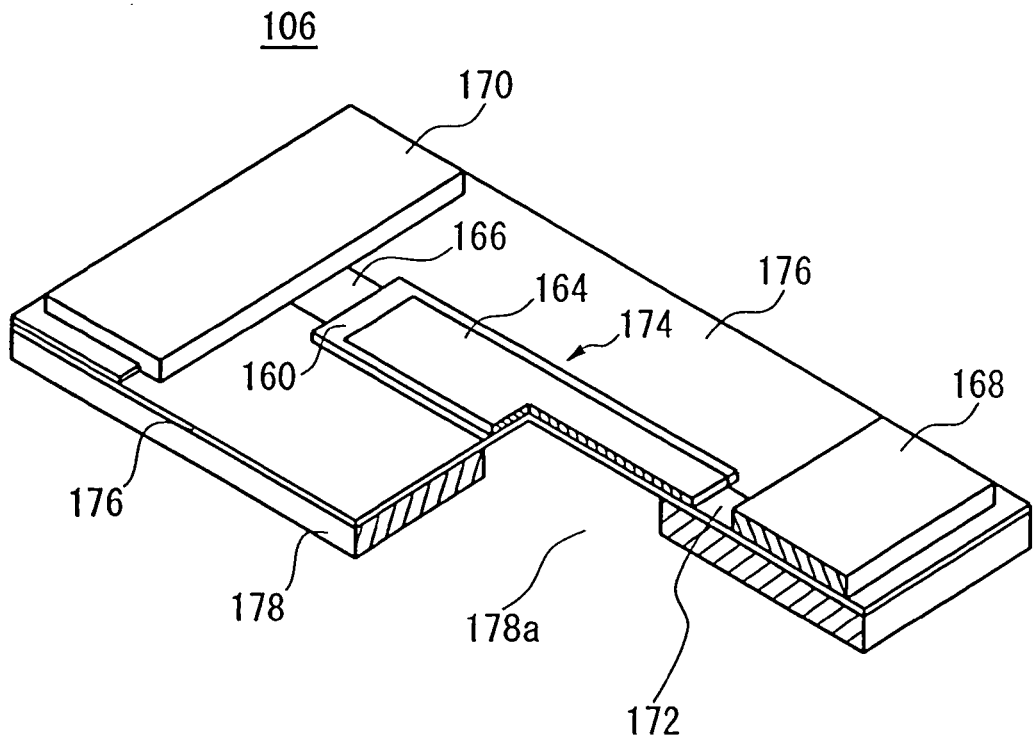
FIG. 25 shows a cross section of a part of the actuator 106 shown in FIG. 24.

FIG. 24 shows the manufacturing method of the actuator 106. A plurality of the actuators 106, four numbers in the case of the FIG. 24, are formed as one body. The actuator 106 shown in FIG. 25 is manufactured by cutting the plurality of actuator 106, which is formed in one body as shown in FIG. 24, at each of the actuator 106. If the each of the piezoelectric elements of the each of the plurality of the actuator 106, which is formed in one body as shown in FIG. 24, are circular shape, the actuator 106 shown in FIG. 20 can be manufactured by cutting the actuator 106, which is formed as one body, at each of actuator 106. By forming a plurality of the actuator 106 in one body, a plurality of actuator 106 can be manufactured effectively at the same time, and also the handling during the transportation becomes easy.

The actuator 106 has a thin plate or a vibrating plate 176, a base plate 178, an elastic wave generating device or piezoelectric element 174, a terminal forming member or an upper electrode terminal 168, and a terminal forming member or a lower electrode terminal 170. The piezoelectric element 174 includes a piezoelectric vibrating plate or a piezoelectric layer 160, an upper electrode 164, and a lower electrode 166. The vibrating plate 176 is formed on the top surface of the base plate 178, and the lower electrode 166 is formed on the top surface of the vibrating plate 176. The piezoelectric layer 160 is formed on the top surface of the lower electrode 166, and the upper electrode 164 is formed on the top surface of the piezoelectric layer 160. Therefore, the main-portion of the piezoelectric layer 160 is formed by sandwiching the main portion of the piezoelectric layer 160 by the main portion of the upper electrode 164 and the main portion of the lower electrode 166 from top side and from bottom side.

A plurality of the piezoelectric element 174, four numbers in the case of FIG. 24, is formed on the vibrating plate 176. The lower electrode 166 is formed on the top surface of the vibrating plate 176. The piezoelectric layer 160 is formed on the top surface of the lower electrode 166, and the upper electrode 164 is formed on the top surface of the piezoelectric layer 160. The upper electrode terminal 168 and the lower electrode terminal 170 are formed on the end portion of the upper electrode 164 and the lower electrode 166. The four numbers of the actuator 106 are used separately by cutting each of the actuator 106 separately.

Figure 26:
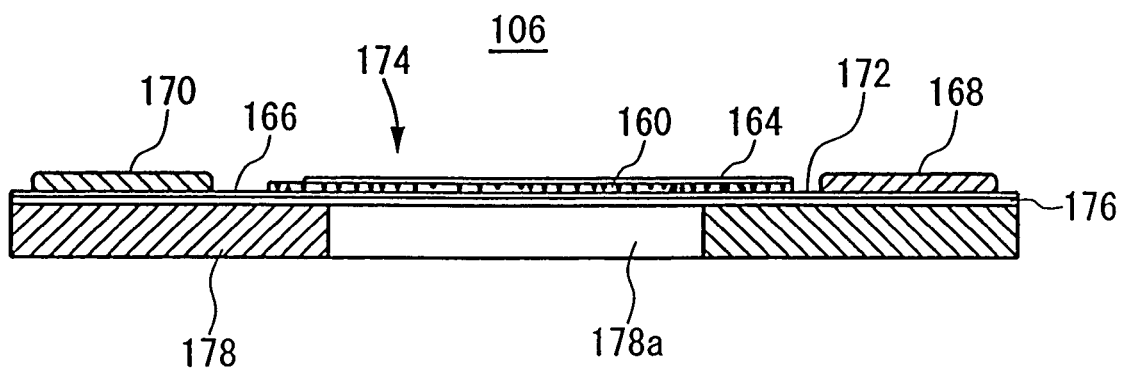
FIG. 26 shows a cross section of the entire actuator 106 shown in FIG. 24.

FIG. 25 shows a cross-section of a part of the actuator 106 shown in FIG. 25. The through hole 178a is formed on the face of the base plate 178 which faces with the piezoelectric element 174. The through hole 178a is sealed by the vibrating plate 176. The vibrating plate 176 is formed by the material which has electric insulating characteristic such as aluminum and zirconium oxide and also possible to be deformed elastically. The piezoelectric element 174 is formed on the vibrating plate 176 to face with the through hole 178a. The lower electrode 166 is formed on the surface of the vibrating plate 176 so as to be extended to the one direction, left direction in FIG. 26, from the region of the through hole 178a. The upper electrode 164 is formed on the surface of the piezoelectric layer 160 so as to be extended to the opposite direction of the lower electrode 166, which is right direction in FIG. 26, from the region of the through hole 178a. Each of the upper electrode terminal 168 and the lower electrode terminal 170 is formed on the surface of the each of supplementary electrode 172 and the lower electrode 166, respectively. The lower electrode terminal 170 with the lower electrode 166 electrically, and the upper electrode terminal 168 contacts with the upper electrode 164 electrically through the supplementary electrode 172 to deliver a signal between the piezoelectric element and the outside of the actuator 106. The upper electrode terminal 168 and the lower electrode terminal 170 has a height higher than the height of the piezoelectric element which is the sum of the height of the electrodes and the piezoelectric layer.

Figure 27:
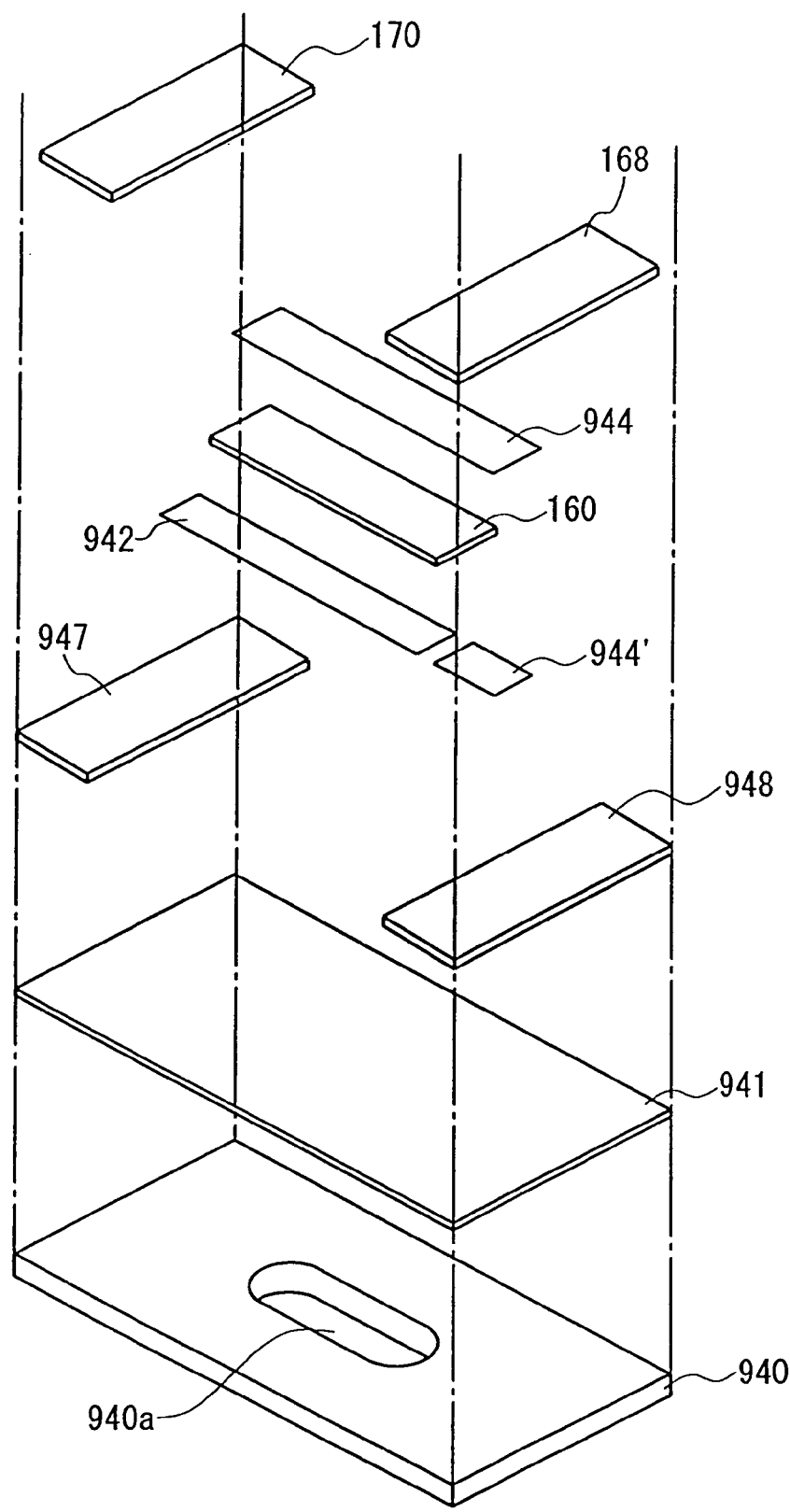
FIG. 27 shows a manufacturing method of the actuator 106 shown in FIG. 24.

FIG. 27 shows the manufacturing method of the actuator 106 shown in FIG. 24. First, a through hole 940a is formed on a green sheet 940 by perforating the green sheet 940 by a press or laser processing. The green sheet 940 becomes the base plate 178 after the burning process. The green sheet 940 is formed by the material such as ceramic material. Then, a green sheet 941 is laminated on the surface of the green sheet 940. The green sheet 941 becomes the vibrating plate 176 after the burning process. The green sheet 941 is formed by the material such as zirconium oxide. Then, a conductive layer 942, the piezoelectric layer 160, and a conductive layer 944 is formed on the surface of the green sheet 941 sequentially by the method such as printing. The conductive layer 942 becomes the lower electrode 166, and the conductive layer 944 becomes the upper electrode 164 after the burning process. Next, the green sheet 940, the green sheet 941, the conductive layer 942, the piezoelectric layer 160, and the conductive layer 944 are dried and burned. The spacer member 947 and 948 are provided on the green sheet 941 to raising the height of the upper electrode terminal 168 and the lower electrode terminal 170 to be higher than the piezoelectric element. The spacer member 947 and 948 is formed by printing the same material with the green sheet 940 and 941 or by laminating the green sheet on the green sheet 941. By this spacer member 947 and 948, the quantity of the material of the upper electrode terminal 168 and the lower electrode terminal 170, which is a noble metal, can be reduced. Moreover, because the thickness of the upper electrode terminal 168 and the lower electrode terminal 170 can be reduced, the upper electrode terminal 168 and the lower electrode terminal 170 can be accurately printed to be a stable height.

If a connection part 944', which is connected with the conductive layer 944, and the spacer member 947 and 948 are formed at the same time when the conductive layer 942 is formed, the upper electrode terminal 168 and the lower electrode terminal 170 can be easily formed and firmly fixed. Finally, the upper electrode terminal 168 and the lower electrode terminal 170 are formed on the end region of the conductive layer 942 and the conductive layer 944. During the forming of the upper electrode terminal 168 and the lower electrode terminal 170, the upper electrode terminal 168 and the lower electrode terminal 170 are formed to be connected with the piezoelectric layer 160 electrically.

FIG. 28 shows further other embodiment of the ink cartridge of the present invention. FIG. 28(A) is a cross sectional view of the bottom part of the ink cartridge of the present embodiment. The ink cartridge of the present embodiment has a through hole 1c on the bottom face 1a of the container 1, which contains ink. The bottom part of the through hole 1c is closed by the actuator 650 and forms an ink storing part.

FIG. 28(B) shows a detailed cross section of the actuator 650 and the through hole 1c shown in FIG. 28(A). FIG. 28(C) shows a plan view of the actuator 650 and the through hole 1c shown in FIG. 28(B). The actuator 650 has a vibrating plate 72 and a piezoelectric element 73 which is fixed to the vibrating plate 72. The actuator 650 is fixed to the bottom face of the container 1 such that the piezoelectric element 73 can face to the through hole 1c through the vibrating plate 72 and the base plate 72. The vibrating plate 72 can be elastically deformed and is ink resistant.

Amplitude and frequency of the counter electromotive force generated by the residual vibration of the piezoelectric element 73 and the vibrating plate 72 changes with the ink quantity in the container 1. The through hole 1c is formed on the position which is faced to actuator 650, and the minimum constant amount of ink is secured in the through hole 1c. Therefore, the status of the end of ink end can be reliably detected by previously measuring the characteristic of the vibration of the actuator 650, which is determined by the ink quantity secured in the through hole 1c.

FIG. 29 shows other embodiment of the through hole 1c. In each of FIGS. 29(A), (B), and (C), the left hand side of the figure shows the status that there is no ink K in the through hole 1c, and the right hand side of the figure shows the status that ink K is remained in the through hole 1c. In the embodiment of FIG. 28, the side face of the through hole 1c is formed as the vertical wall. In FIG. 29(A)., the side face 1d of the through hole 1c is slanted in vertical direction and opens with expanding to the outside. In FIG. 29(B), a stepped portion 1e and 1f are formed on the side face of the through hole 1c. The stepped portion 1f, which is provided above the stepped portion 1e, is wider than the stepped portion 1e. In FIG. 29(C), the through hole 1c has a groove 1g that extends to the direction in which ink is easily discharged, that is, the direction to a ink supply port 2.

Figure 29A:
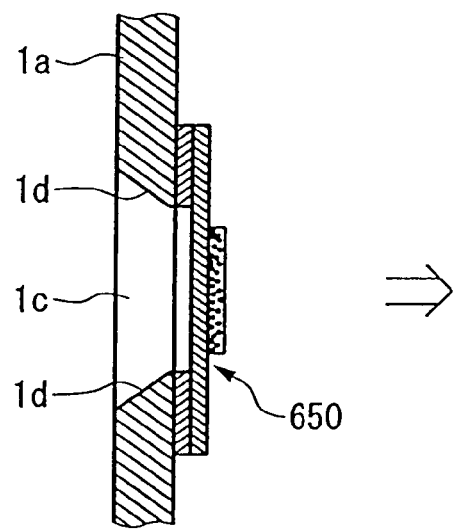
FIGS. 29A, 29B and 29C show another embodiment of the through hole 1c.
Figure 29A:
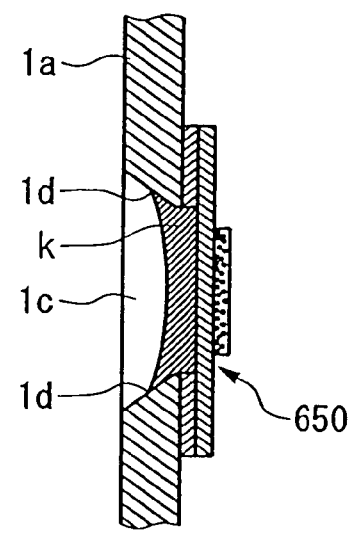
Figure 29B:
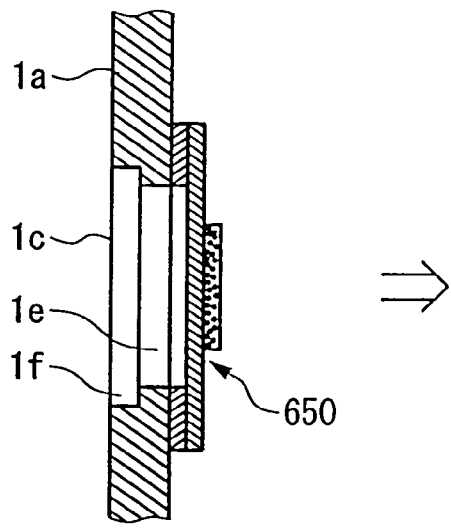
Figure 29B:
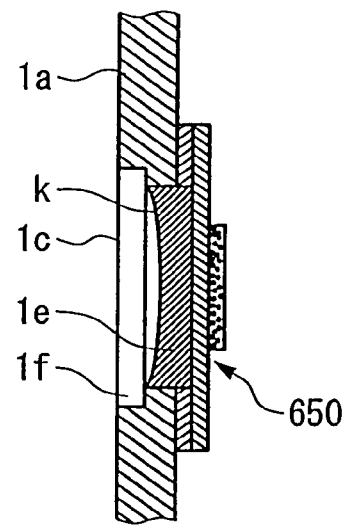
Figure 29C:
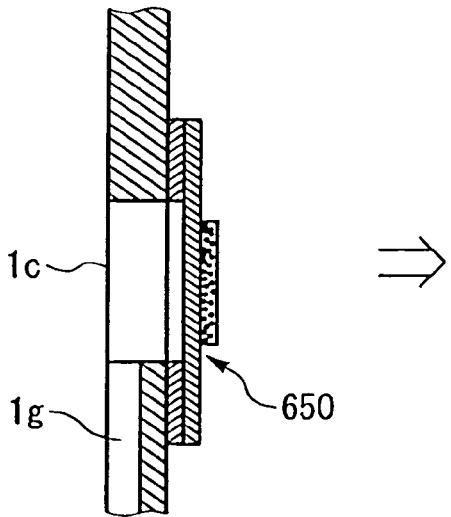
Figure 29C:
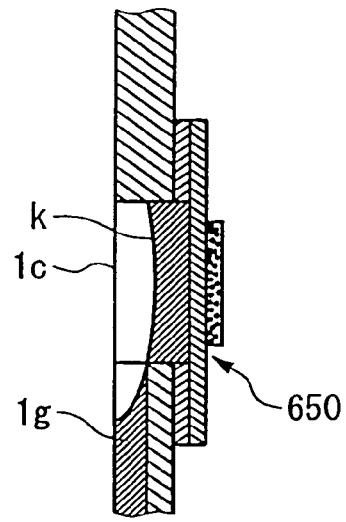

According to the shape of the through hole 1c shown in FIGS. 29(A) to (C), the quantity of ink K in the ink storing part can be reduced. Therefore, because the M'cav can be smaller than the M'max explained in FIG. 20 and FIG. 21, the vibration characteristic of the actuator 650 at the time of the ink end status can be greatly different with the vibration characteristic when enough quantity of ink K for printing is remained in the container 1, and thus the ink end status can be reliably detected.

Figure 30:
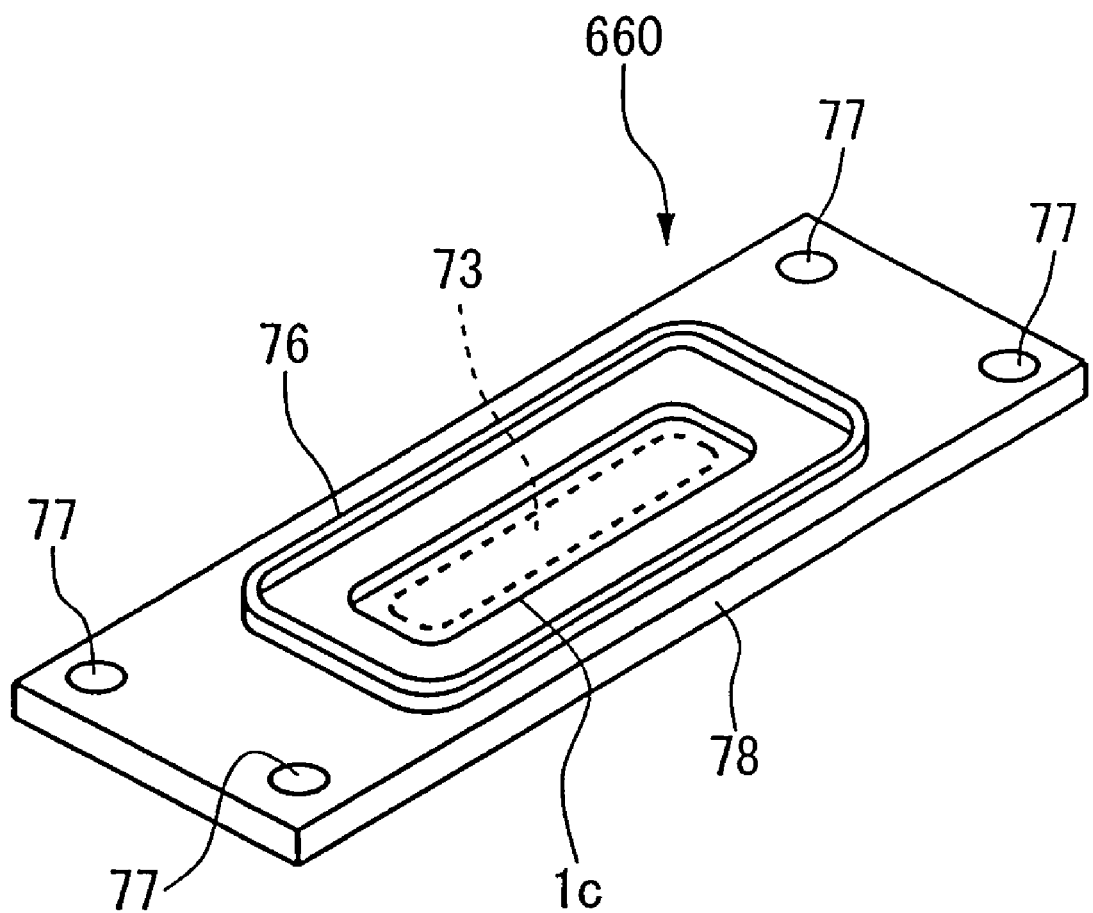
FIG. 30 shows an actuator 660 according to another embodiment.

FIG. 30 shows a slant view of the other embodiment of the actuator. The actuator 660 has packing 76 on the outside of the base plate, which constitutes the actuator 660, or the through hole 1c of a mounting plate 72. Caulking holes 77 are formed on the outskirts of the actuator 660. The actuator 660 is fixed to the container 1 through the caulking hole 77 with caulking.

FIGS. 31(A) and (B) is a slant view of the further other embodiment of the actuator. In this embodiment, the actuator 670 comprises a concave part forming base plate 80 and a piezoelectric element 82. The concave part 81 is formed on the one side of the face of the concave part forming base plate 80 by the technique such as etching, and piezoelectric element 82 is mounted on the other side of the face of the concave part forming base plate 80. The bottom portion of the concave part 81 operates as a vibrating region within the concave part forming base plate 80.

Therefore, the vibrating region of the actuator 670 is determined by the periphery of the concave part 81. Furthermore, the actuator 670 has the similar structure with the structure of the actuator 106 shown in FIG. 20, in which the base plate 178 and the vibrating plate 176 is formed as one body. Therefore, the manufacturing process during the manufacturing an ink cartridge can be reduced, and the cost for manufacturing an ink cartridge also can be reduced. The actuator 670 has a size which can be embedded into the through hole 1c provided on the container 1. By this embedding process, the concave part 81 can operates as the cavity. The actuator 106 shown in FIG. 20 can be formed to be embedded into through hole 1c as actuator 670 shown in FIG. 31.

Figure 32:
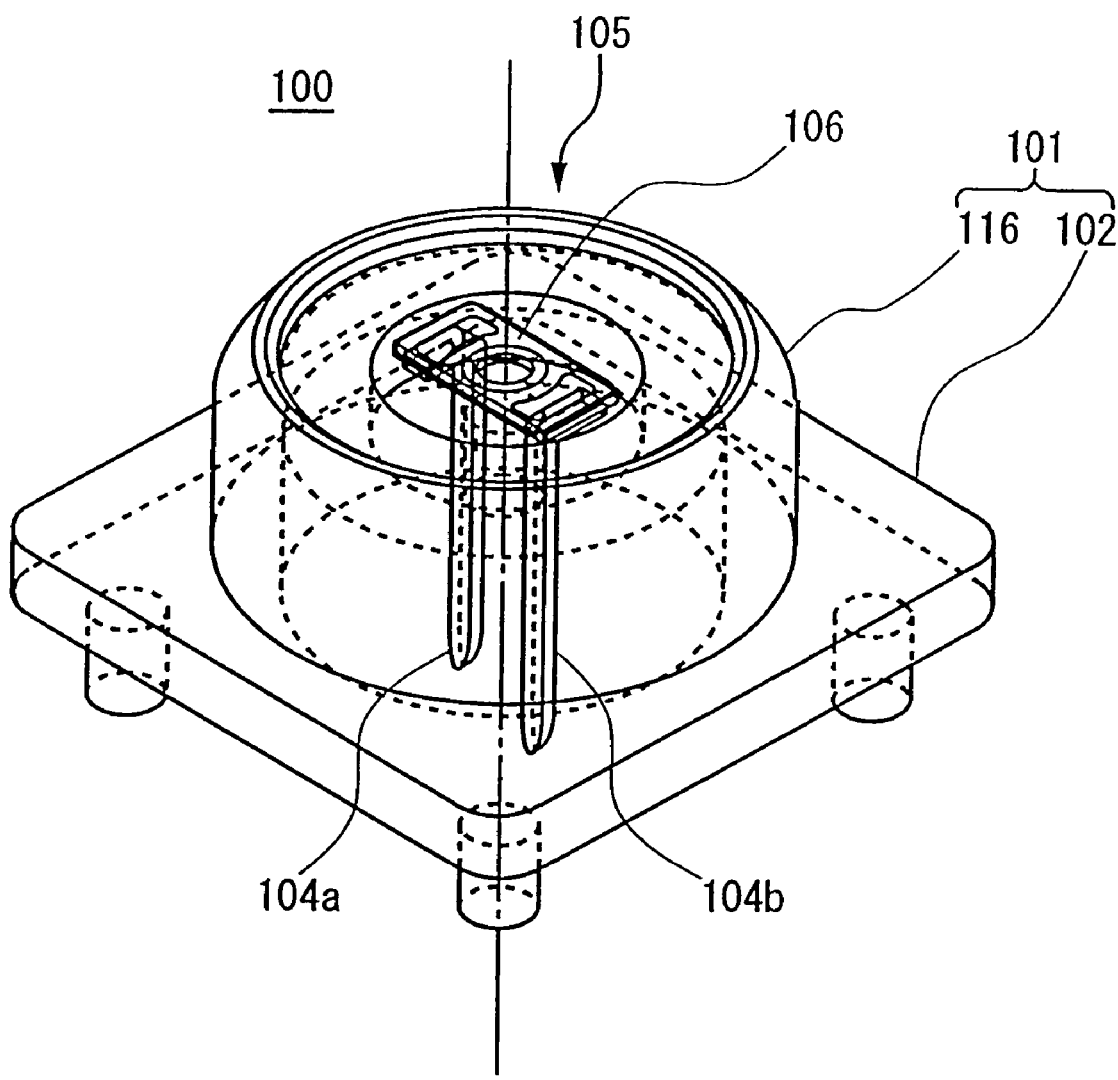
FIG. 32 is a perspective view showing a module 100.

FIG. 32 shows a slant view of the configuration that forms the actuator 106 in one body as a mounting module 100. The module 100 is mounted on the predetermined position of the container 1 of an ink cartridge. The module 100 is constituted to detect the ink consumption status in the container 1 by detecting at least the change of acoustic impedance of the ink liquid. The module 100 of the present embodiment has a liquid container mounting member 101 for mounting the actuator 106 to the container 1. The liquid container mounting member 101 has a structure which mounts a cylindrical part 116 that contains the actuator 106 which oscillates by the driving signal on a base mount 102, the plan of which is substantially rectangular. Because the module 100 is constructed so that the actuator 106 of the module 100 can not be contact from outside when the module 100 is mounted on the ink cartridge, the actuator 106 can be protected from outside contact. The top side of the edge of the cylindrical part 116 is chamfered so that the cylindrical part 116 can be easily fit into the hole which is formed in the ink cartridge.

Figure 33:
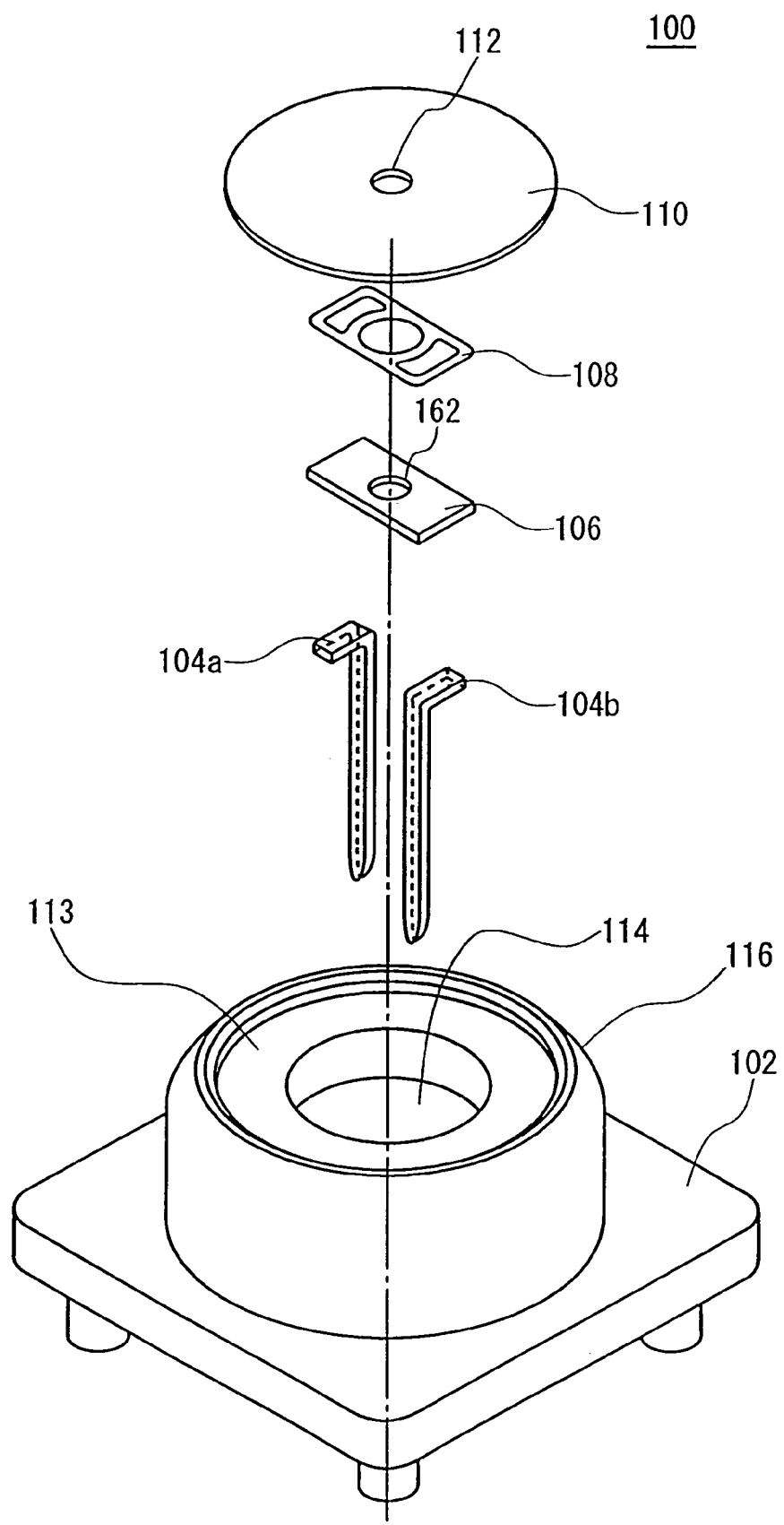
FIG. 33 is an exploded view showing the structure of the module 100 shown in FIG. 32.

FIG. 33 shows an exploded view of the module 100 shown in FIG. 32 to show the structure of the module 100. The module 100 includes a liquid container mounting member 101 made from a resin and a piezoelectric device mounting member 105 which has a plate 110 and a concave part 113. Furthermore, the module 100 has a lead wire 104a and 104b, actuator 106, and a film 108. Preferably, the plate 110 is made from a material which is difficult to be rust such as stainless or stainless alloy. The opening 114 is formed on the central part of the cylindrical part 116 and the base mount 102 which are included in the liquid container mounting member 101 so that the cylindrical part 116 and the base mount 102 can contain the lead wire 104a and 104b. The concave part 113 is formed on the central part of the cylindrical part 116 and the base mount 102 so that the cylindrical part 116 and the base mount 102 can contain the actuator 106, the film 108, and the plate 110. The actuator 106 is connected to the plate 110 through the film 108, and the plate 110 and the actuator 106 are fixed to the liquid container mounting member 101. Therefore, the lead wire 104a and 104b, the actuator 106, the film 108 and the plate 110 are mounted on the liquid container mounting member 101 as one body. Each of the lead wire 104a and 104b transfer a driving signal to piezoelectric layer by coupling with the upper electrode and the lower electrode 166 of the actuator 106, and also transfer the signal of resonant frequency detected by the actuator 106 to recording apparatus. The actuator 106 oscillates temporally based on the driving signal transferred from the lead wire 104a and 104b. The actuator 106 vibrates residually after the oscillation and generates a counter electromotive force by the residual vibration. By detecting the vibrating period of the waveform of the counter electromotive force, the resonant frequency corresponding to the consumption status of the liquid in the liquid container can be detected. The film 108 bonds the actuator 106 and the plate 110 to seal the actuator 106. The film 108 is preferably formed by such as polyolefin and bonded to the actuator 106 and the plate 110 by heat sealing. By bonding the actuator 106 and the plate 110 with the film 108 face with face, the unevenness of the bonding on location decreases, and thus the portion other than the vibrating plate does not vibrate. Therefore, the change of the resonant frequency before and after bonding the actuator 106 to plate 110 is small.

The plate 110 is circular shape, and the opening 114 of the base mount 102 is formed in cylindrical shape. The actuator 106 and the film 108 are formed in rectangular shape. The lead wire 104, the actuator 106, the film 108, and the plate 110 can be attached to and removed from the base mount 102. Each of the base mount 102, the lead wire 104, the actuator 106, the film 108, and the plate 110 is arranged symmetric with respect to the central axis of the module 100. Furthermore, each of the centers of the base mount 102, the actuator 106, the film 108, and the plate 110 is arranged substantially on the central axis of the module 100.

The opening 114 of the base mount 102 is formed such that the area of the opening 114 is larger than the area of the vibrating region of the actuator 106. The through hole 112 is formed on the center of the plate 110 where the vibrating section of the actuator 106 faces. As shown in FIG. 20 and FIG. 21, the cavity 162 is formed on the actuator 106, and both of the through hole 112 and the cavity 162 forms ink storing part. The thickness of the plate 110 is preferably smaller than diameter of the through hole 112 to reduce the influence of the residual ink. For example, the depth of the through hole 112 is preferably smaller than one third of the diameter of the through hole 112. The shape of the through hole 112 is substantially true circle and symmetric with respect to the central axis of the module 100. Furthermore, the area of the through hole 112 is larger than the area of opening of the cavity 162 of the actuator 106. The periphery of the shape of the cross-section of the through hole 112 can be tapered shape of stepped shape. The module 100 is mounted on the side, top, or bottom of the container 1 such that the through hole 112 faces to the inside of the container 1. When the ink is consumed, and the ink around the actuator 106 is exhausted, the resonant frequency of the actuator 106 greatly changes. The change of the ink level can thus be detected.

Figure 34:
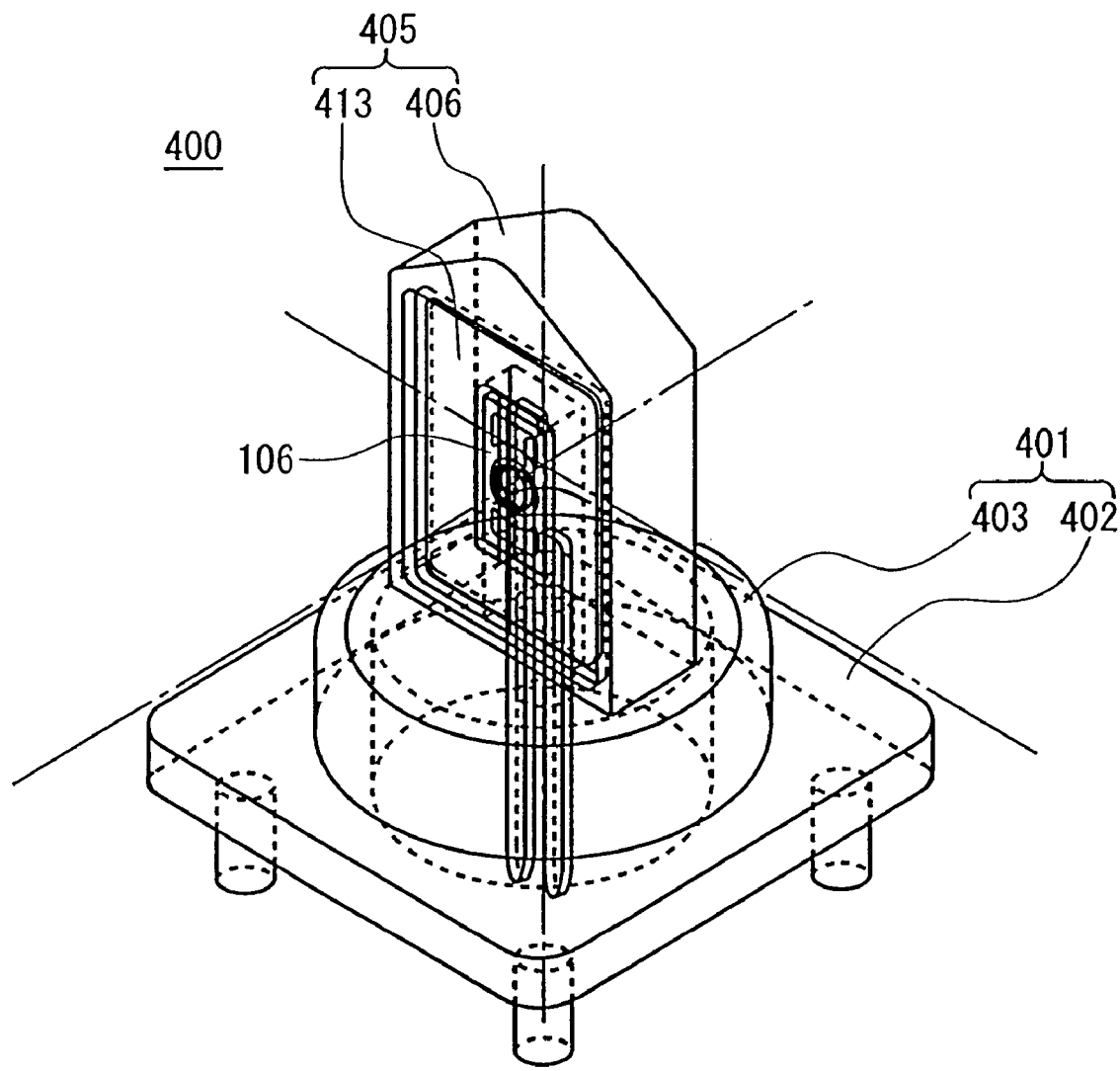
FIG. 34 shows another embodiment of the module 100.

FIG. 34 shows the slant view of the other embodiments of the module. The piezoelectric device mounting member 405 is formed on the liquid container mounting member 101 in the module 400 of the present embodiment. The cylindrical part 403, which has a cylindrical shape, is formed on the base mount 102, which has a square shaped plan, the edges of which are rounded, in the liquid container mounting member 401. Furthermore, the piezoelectric device mounting member 405 includes a board shaped element 405, which is set up on the cylindrical part 403, and a concave part 413. The actuator 106 is arranged on the concave part 413 provided on the side face of the board shaped element 406. The top end of the board shaped element 406 is chamfered in predetermined angle so that the board shaped element is easy to fit into hole formed on the ink cartridge when mounting the actuator 106 to ink cartridge.

Figure 35:
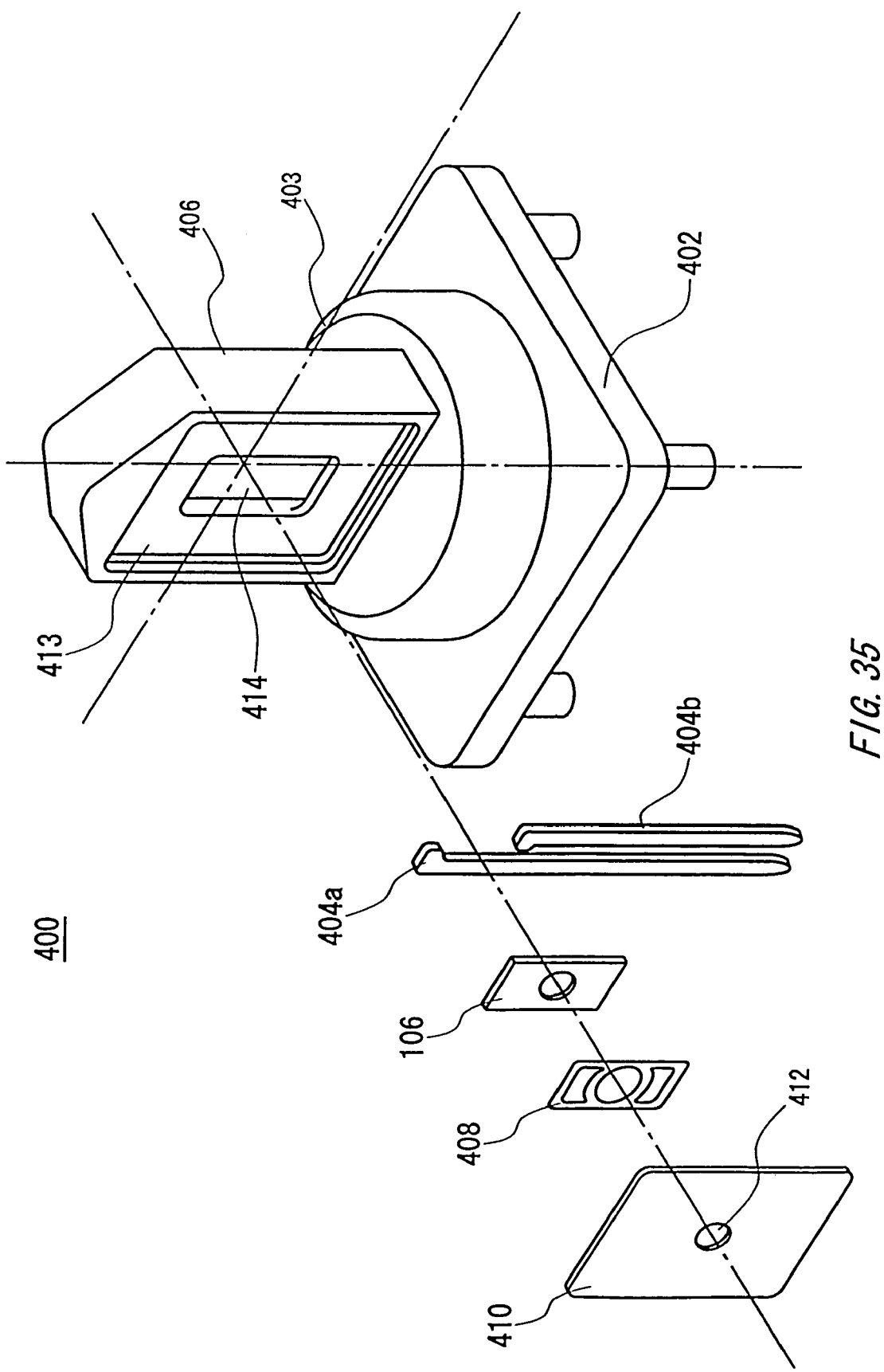
FIG. 35 is an exploded view showing the structure of the module 100 shown in FIG. 34.

FIG. 35 shows an exploded view of the module 400 shown in FIG. 34 to show the structure of the module 400. As the module 100 shown in FIG. 32, the module 400 includes a liquid container mounting member 401 and a piezoelectric device mounting member 405. The liquid container mounting member 401 has the base mount 402 and the cylindrical part 403, and the piezoelectric device mounting member 405 has the board shaped element 406 and the concave part 413. The actuator 106 is connected to the plate 410 and fixed to the concave part 413. The module 400 has a lead wire 404a and 404b, actuator 106, and a film 408.

According to the present embodiment, the plate 410 is rectangular shape, and the opening 414 provided on the board shaped element 406 is formed in rectangular shape. The lead wire 404a and 404b, the actuator 106, the film 408, and the plate 410 can be attached to and removed from the base mount 402. Each of the actuator 106, the film 408, and the plate 410 is arranged symmetric with respect to the central axis which is extended to perpendicular direction to the plan of opening 414 and also pass through the center of opening 414. Furthermore, each of the centers of the actuator 106, the film 408, and the plate 410 is arranged substantially on the central axis of the opening 414.

The through hole 412 provided on the center of the plate 410 is formed such that the area of the through hole 412 is larger than the area of the opening of the cavity 162 of the actuator 106. The cavity 162 of the actuator 106 and the through hole 412 together forms ink storing part. The thickness of the plate 410 is preferably smaller than diameter of the through hole 412. For example, the thickness of the plate 410 is smaller than one third of the diameter of the through hole 412. The shape of the through hole 412 is substantially true circle and symmetric with respect to the central axis of the module 400. The shape of the cross-section of the periphery of the through hole 112 can be tapered shape or stepped shape. The module 400 can be mounted on the bottom of the container 1 such that the through hole 412 is arranged inside of the container 1. Because the actuator 106 is arranged inside the container 1 such that the actuator 106 extends in the vertical direction, the setting of the timing of the ink end can be easily changed by changing the height of the mounting position of the actuator 106 in the container 1 by changing the height of the base mount 402.

Figure 36:
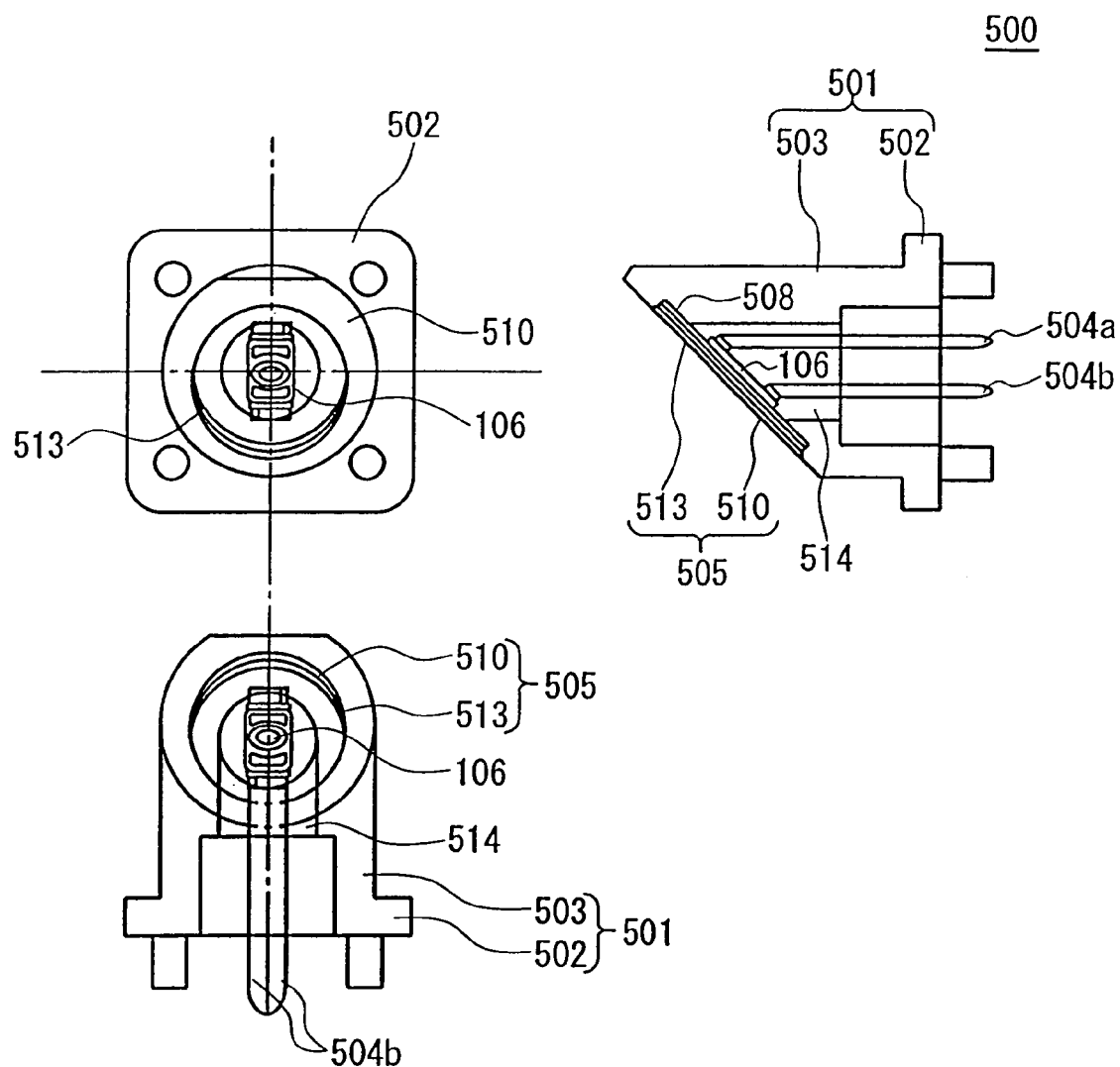
FIG. 36 shows still another embodiment of the module 100.

FIG. 36 shows the further other embodiment of the module. As the module 100 shown in FIG. 32, the module 500 of FIG. 36 includes a liquid container mounting member 501 which has a base mount 502 and a cylindrical part 503. Furthermore, the module 500 further has a lead wire 504a and 504b, actuator 106, a film 508, and a plate 510. The opening 514 is formed on the center of the base mount 502, which is included in the liquid container mounting member 501, so that the base mount 502 can contain the lead wire 504a and 504b. The concave part 513 is formed on the cylindrical part 503 so that the cylindrical part 503 can contain the actuator 106, the film 508, and the plate 510. The actuator 106 is fixed to the piezoelectric device mounting member 505 through the plate 510. Therefore, the lead wire 504a and 504b, the actuator 106, the film 508, and the plate 510 are mounted on the liquid container mounting member 501 as one body. The cylindrical part 503, the top face of which is slanted in vertical direction, is formed on the base mount which has a square shaped plan and the edges of which are rounded. The actuator 106 is arranged on the concave part 513 which is provided on the top surface of the cylindrical part 503 that is slanted in vertical direction.

The top end of the module 500 is slanted, and the actuator 106 is mounted on this slanted surface. Therefore, if the module 500 is mounted on the bottom or the side of the container 1, the actuator 106 slants in the vertical direction of the container 1. The slanting angle of the top end of the module 500 is substantially between 30 degree and 60 degree with considering the detecting performance.

The module 500 is mounted on the bottom or the side of the container 1 so that the actuator 106 can be arranged inside the container 1. When the module 500 is mounted on the side of the container 1, the actuator 106 is mounted on the container 1 such that the actuator 106 faces the upside, downside, or side of the container 1 with slanting. When the module 500 is mounted on the bottom of the container 1, the actuator 106 is preferable to be mounted on the container 1 such that the actuator 106 faces to the ink supply port side of the container 1 with slanting.

Figure 37:
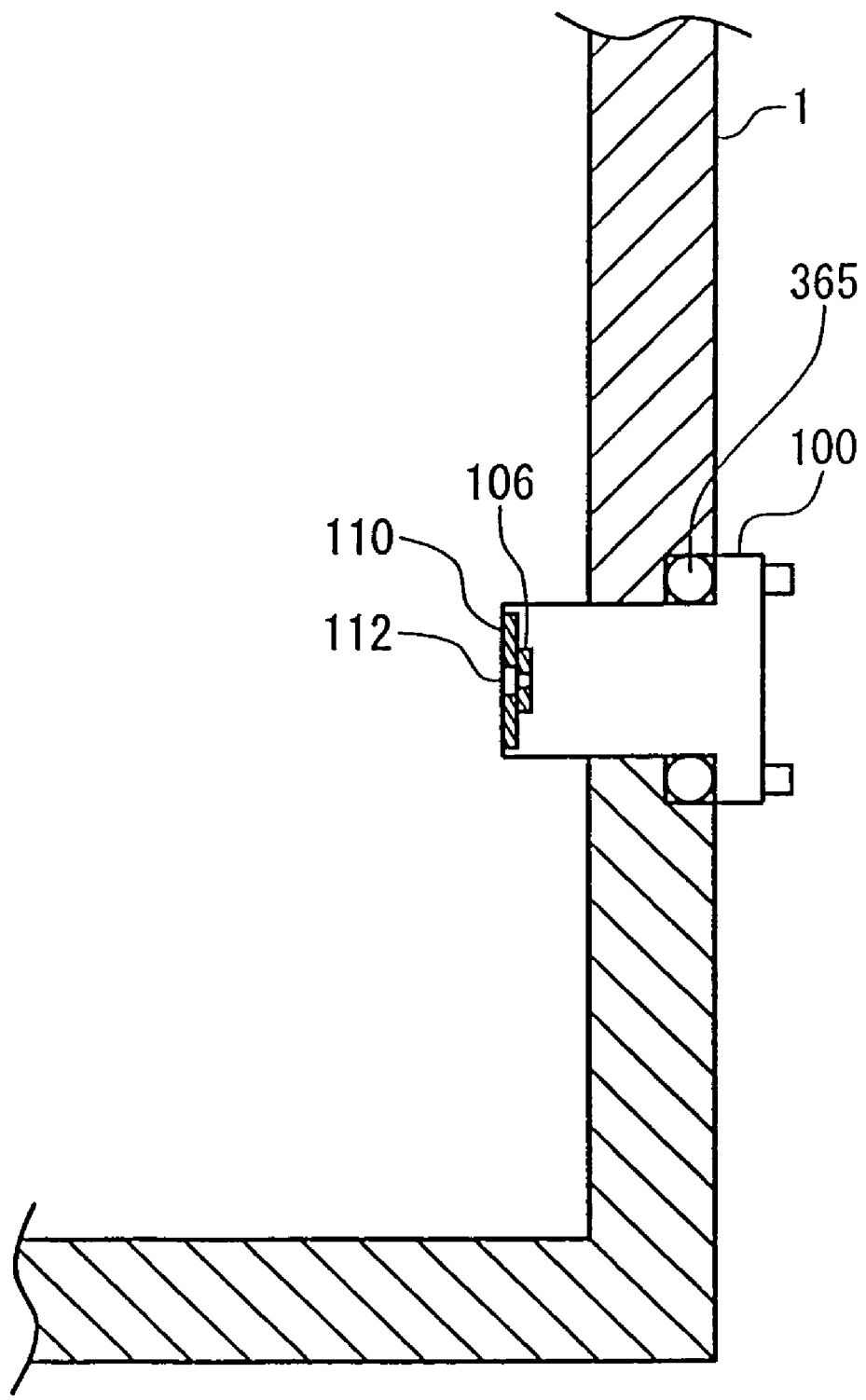
FIG. 37 shows an exemplary cross section of the module 100 shown in FIG. 32 where the module 100 is mounted to the ink container.
Figure 38:
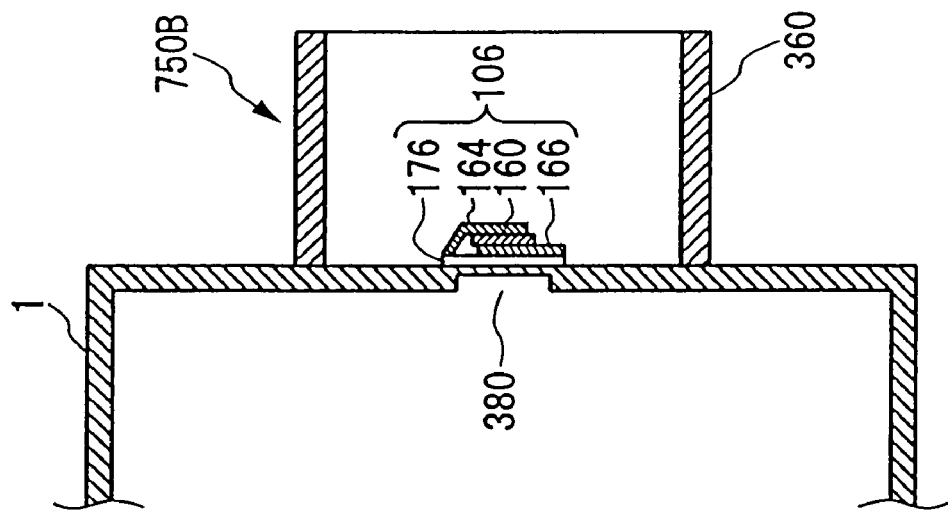
FIGS. 38A and 38B show still another embodiment of the module 100.
Figure 38:
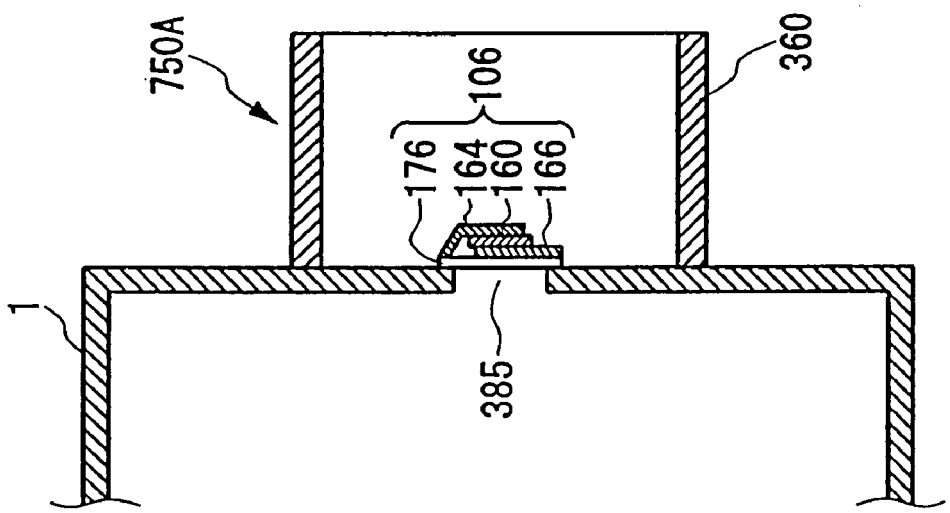

FIG. 37 shows a cross-sectional view around the bottom of the container 1 when the module 100 shown in FIG. 32 is mounted on the container 1. The module 100 is mounted on the container 1 so that the module 100 penetrates through the side wall of the container 1. The O-ring 365 is provided on the connection face of between the side wall of the container 1 and the module 100 to seal between the module 100 and the container 1. The module 100 is preferable to include the cylindrical part as explained in FIG. 32 so that the module 100 can be sealed by the o-ring. By inserting the top end of the module 100 inside the container 1, ink in the container 1 contacts with the actuator 106 through the through hole 112 of the plate 110. Because the resonant frequency of the residual vibration of the actuator 106 is different depends on whether the circumference of the vibrating section of the actuator 106 is liquid or gas, the ink consumption status can be detected using the module 100. Furthermore, not only the module 100 can be mounted on the container 1 and detect the existence of ink, but also the module 400 shown in FIG. 34, module 500 shown in FIG. 36, or the module 700A and 700B shown in FIG. 38, and a mold structure 600 can be mounted on the container 1 and detect the existence of the ink.

FIG. 38(A) shows further other embodiment of the module 100. The module 750A shown in FIG. 38(A) has the actuator 106 and a liquid container mounting member 360. The module 750A is mounted on the container 1 such that the front face of the module 750A becomes the same face with the inside surface of the side wall of the container 1. The actuator 106 includes the piezoelectric layer 160, the upper electrode 164, the lower electrode 166, and the vibrating plate 176. The lower electrode 166 is formed on the top face of the vibrating plate 176. The piezoelectric layer 160 is formed on the top face of the lower electrode 166, and the upper electrode 164 is formed on the top face of the piezoelectric layer 160. Therefore, the piezoelectric layer 160 is sandwiched by the upper electrode 164 and the lower electrode 166 from top and bottom. The piezoelectric layer 160, the upper electrode 164, and the lower electrode 166 form a piezoelectric element. The vibrating region of the piezoelectric element and the vibrating plate 176 constitute the vibrating section, on which the actuator 106 actuary vibrates. A through hole 385 is provided on the sidewall of the container 1. Therefore, ink contacts with the vibrating plate 176 through the through hole 385 of the container 1.

Next, the operation of the module 750A shown in FIG. 38(A) will be explained. The upper electrode 164 and the lower electrode 166 transmit a driving signal to the piezoelectric layer 160, and transmit the signal of the resonant frequency detected by the piezoelectric layer 160 to the recording apparatus. The piezoelectric layer 160 oscillates by the driving signal transmitted by the upper electrode 164 and the lower electrode 166 and residually vibrates. By this residual vibration, the piezoelectric layer 160 generates a counter electromotive force. The existence of ink can be detected by counting the period of vibration of the waveform of the counter electromotive force and detecting the resonant frequency at the time of counting. The module 750A is mounted on the container 1 such that the opposite face of the piezoelectric element side of the vibrating section of the actuator 106, that is, only the vibrating plate 176 in FIG. 38(A) contacts with ink inside the ink container 1. The module 750A shown in FIG. 38(A) does not need to embed an electrode such as the lead wire 104*a*, 104*b*, 404*a*, 404*b*, 504*a*, and 504*b* shown in FIG. 32 to FIG. 36 into the module 100. Therefore, the forming process becomes simple. Furthermore, the exchange of module 750A becomes possible so that the recycle of the module 750A becomes possible. Moreover, the liquid container mounting member 360 can protect the actuator 106 from the outside contact.

FIG. 38(B) shows further other embodiment of the module 100. The module 750B shown in FIG. 38(B) has the actuator 106 and a liquid container mounting member 360. The module 750B is mounted on the container 1 such that the front face of the module 750B becomes the same face with the inside surface of the side wall of the container 1. The actuator 106 includes the piezoelectric layer 160, the upper electrode 164, the lower electrode 166, and the vibrating plate 176. The lower electrode 166 is formed on the top face of the vibrating plate 176. The piezoelectric layer 160 is formed on the top face of the lower electrode 166, and the upper electrode 164 is formed on the top face of the piezoelectric layer 160. Therefore, the piezoelectric layer 160 is sandwiched by the upper electrode 164 and the lower electrode 166 from top and bottom. The piezoelectric layer 160, the upper electrode 164, and the lower electrode 166 form a piezoelectric element. The piezoelectric element is formed on the vibrating plate 176. The vibrating region of the piezoelectric element and the vibrating plate 176 constitute the vibrating section, on which the actuator 106 actuary vibrates. A thin wall part 380 is provided on the side wall of the container 1. The module 750B is mounted on the container 1 such that the opposite face of the piezoelectric element side of the vibrating section of the actuator 106, that is, only the vibrating plate 176 in FIG. 38(B) contacts with the thin wall part 380 of the ink container 1. Therefore, the vibrating section of the actuator 106 vibrates together with the thin wall part 380 residually.

Next, the operation of the module 750B shown in FIG. 38(B) will be explained. The upper electrode 164 and the lower electrode 166 transmit a driving signal to the piezoelectric layer 160, and transmit the signal of the resonant frequency detected by the piezoelectric layer 160 to the recording apparatus. The piezoelectric layer 160 oscillates by the driving signal transmitted by the upper electrode 164 and the lower electrode 166 and vibrates residually. Because the vibrating plate 176 contacts with the thin wall part 380 of the container 1, the vibrating section of the actuator 106 vibrates together with the thin wall part 380. Because the face of the thin wall part 380, which faces to the inside of the container 1, contacts with ink, when the actuator 106 vibrates residually together with the thin wall part 380, the resonant frequency and amplitude of this residual vibration changes with the residual quantity of ink. By this residual vibration, the piezoelectric layer 160 generates a counter electromotive force. The residual quantity of ink can be detected by counting the period of vibration of the waveform of the counter electromotive force and detecting the resonant frequency at the time of counting.

The module 750B shown in FIG. 38(B) does not need to embed an electrode such as the lead wire 104*a*, 104*b*, 404*a*, 404*b*, 504*a*, and 504*b* shown in FIG. 32 to FIG. 36 into the module 100. Therefore, the forming process becomes simple. Furthermore, the exchange of the module 750B becomes possible so that the recycle of the module 750B becomes possible. Moreover, the liquid container mounting member 360 can protect the actuator 106 from the outside contact.

Figure 39A:
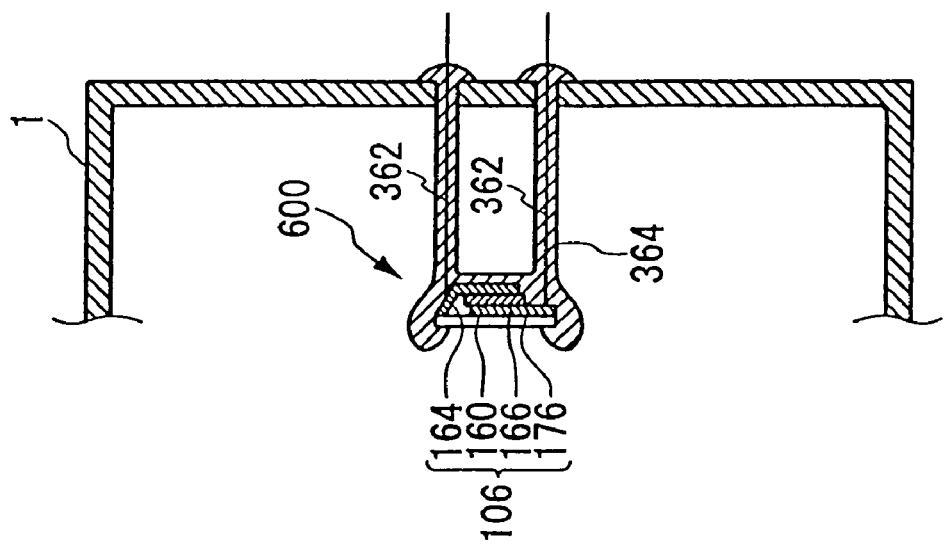
FIGS. 39A, 39B and 39C show still another embodiment of the module 100.
Figure 39B:
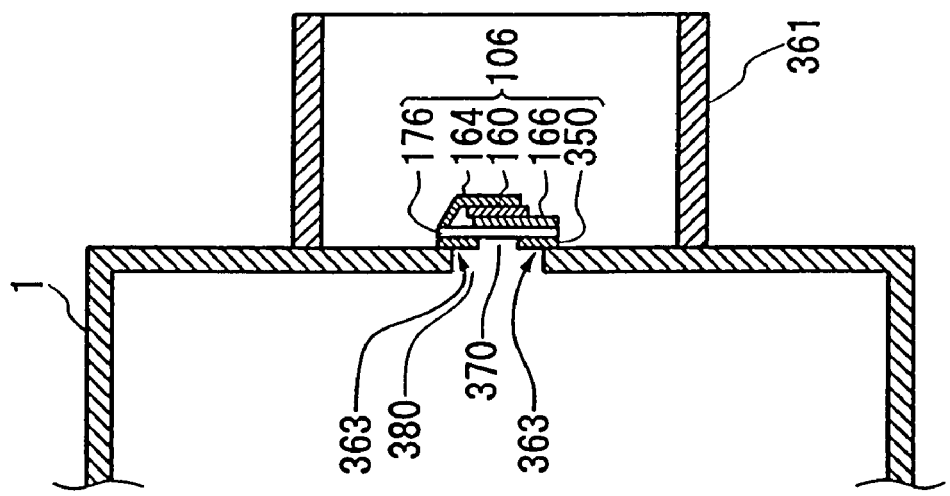

FIG. 39(A) shows the cross section of the ink container when mounting module 700B on the container 1. The present embodiment uses a module 700B as an example of amounting structure. The module 700B is mounted on the container 1 such that the liquid container mounting member 360 protrude into the inside of the A through hole 370 is formed in the mounting plate 350, and the through hole 370 faces to the vibrating section of the actuator 106. Furthermore, a hole 382 is formed on the bottom wall of the module 700B, and a piezoelectric device mounting member 363 is formed. The actuator 106 is arranged to close the one of the face of the hole 382. Therefore, ink contacts with the vibrating plate 176 through the hole 382 of the piezoelectric device mounting member 363 and the through hole 370 of the mounting plate 350. The hole 382 of the piezoelectric device mounting member 363 and the through hole 370 of the mounting plate 350 together forms an ink storing part. The piezoelectric device mounting member 363 and the actuator 106 are fixed by the mounting plate 350 and the film material. The sealing structure 372 is provided on the connection part of the liquid container mounting member 360 and the container 1. The sealing structure 372 can be formed by the plastic material such as synthetic resin or O-ring. In FIG. 39(A), the module 700B and the container 1 is separate body, however, the piezoelectric device mounting member can be constituted by a part of the container 1 as shown in FIG. 39(B).

The module 700B shown in FIG. 39 does not need to embed the lead wire into the module as shown in FIG. 32 to FIG. 36. Therefore, the forming process becomes simple. Also, the exchange of the module 700B becomes possible so that the recycling of the module 700B also becomes possible.

There is possibility that the actuator 106 malfunctions by the contact of the ink which is dropped from a top face or a side face of the container 1 with the actuator 106, the ink of which is attached to the top face or the side face of the container 1 when the ink cartridge is shaken. However, because the liquid container mounting member 360 of the module 700B protrudes into the inside of the container 1, the actuator 106 does not malfunction by the ink dropped from the top face or the side face of the container 1.

Furthermore, the module 700B is mounted on the container 1 so that only part of the vibrating plate 176 and the mounting plate 350 are contact with ink inside of the container 1 in the embodiment of FIG. 39(A). The embedding of the electrode of the lead wire 104*a*, 104*b*, 404*a*, 404*b*, 504*a*, and 504 shown in FIG. 32 to FIG. 36 into the module becomes unnecessary for the embodiment shown in FIG. 39(A). Therefore, the forming process becomes simple. Also, the exchange of the actuator 106 becomes possible so that the recycling of the actuator 106 also becomes possible.

FIG. 39(B) shows the cross section of the ink container when mounting actuator 106 on the container 1. A protecting member 361 is mounted on the container 1 separately with the actuator 106 in the ink cartridge of the embodiment shown in FIG. 39(B). Therefore, the protecting member 361 and the actuator 106 is not one body as a module, and the protecting member 361 thus can protect the actuator 106 not to be contact by the user. A hole 380 which is provide on the front face of the actuator 106 is arranged on the side wall of the container 1. The actuator 106 includes the piezoelectric layer 160, the upper electrode 164, the lower electrode 166, the vibrating plate 176, and the mounting plate 350. The vibrating plate 176 is formed on the mounting plate 350, and the lower electrode 166 is formed on the vibrating plate 176. The piezoelectric layer 160 is formed on the top face of the lower electrode 166, and the upper electrode 164 is formed on the top face of the piezoelectric layer 160. Therefore, the main portion of the piezoelectric layer 160 is formed by sandwiching the main portion of the piezoelectric layer 160 by the main portion of the upper electrode 164 and the lower electrode 166 from top and bottom. The circular portion, which is a main portion of each of the piezoelectric layer 160, the upper electrode 164, and the lower electrode 166, forms a piezoelectric element. The piezoelectric element is formed on the vibrating plate 176. The vibrating region of the piezoelectric element and the vibrating plate 176 constitutes the vibrating section, on which the actuator 106 actuary vibrates. A through hole 370 is provided on the mounting plate 350. Furthermore, a hole 380 is formed on the side wall of the container 1. Therefore, ink contacts with the vibrating plate 176 through the hole 380 of the container 1 and the through hole 370 of the mounting plate 350. The hole 380 of the container 1and the through hole 370 of the mounting plate 350 together forms ink storing part. Moreover, because the actuator 106 is protected by the protecting member 361, the actuator 106 can be protected form the outside contact. The base plate 178 shown in FIG. 20 can be used instead of the mounting plate 350 in the embodiment shown in FIGS. 39(A) and (B).

Figure 39C:
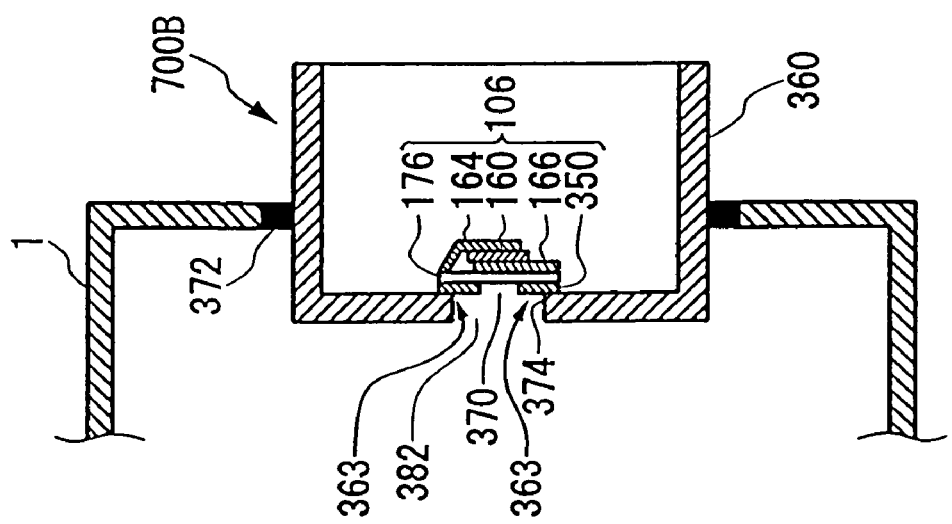

FIG. 39(C) shows an embodiment that comprises a mold structure 600 which includes the actuator 106. In the present embodiment, a mold structure 600 is used as one example of the mounting structure. The mold structure 600 has the actuator 106 and a mold member 364. The actuator 106 and the mold member 364 are formed in one body. The mold member 364 is formed by a plastic material such as silicon resin. The mold member 364 includes a lead wire 362 in its inside. The mold member 364 is formed so that the mold member 364 has two legs extended from the actuator 106. The end of the two legs of the mold member 364 are formed in a shape of hemisphere to liquid tightly fix the mold member 364 with container 1. The mold member 364 is mounted on the container 1 such that the actuator 106 protrudes into the inside of the container 1, and the vibrating section of the actuator 106 contacts with ink inside the container 1. The upper electrode 164, the piezoelectric layer 160, and the lower electrode 166 of the actuator 106 are protected from ink by the mold member 364.

Because the mold structure 600 shown in FIG. 39 does not need the sealing structure 372 between the mold member 364 and the container 1, the leaking of ink from the container 1 can be reduced. Moreover, because the mold structure 600 has a form that the mold structure 600 does not protrude from the outside of the container 1, the mold structure 600 can protect the actuator 106 from the outside contact. There is possibility that the actuator 106 malfunctions by the contact of the ink which is dropped from a top face or a side face of the container 1 with the actuator 106, the ink of which is attached to the top face or the side face of the container 1 when the ink cartridge is shaken. Because the mold member 364 of the mold structure 600 protrudes into the inside of the container 1, the actuator 106 does not malfunction by the ink dropped from the top face or the side face of the container 1.

Figure 40:
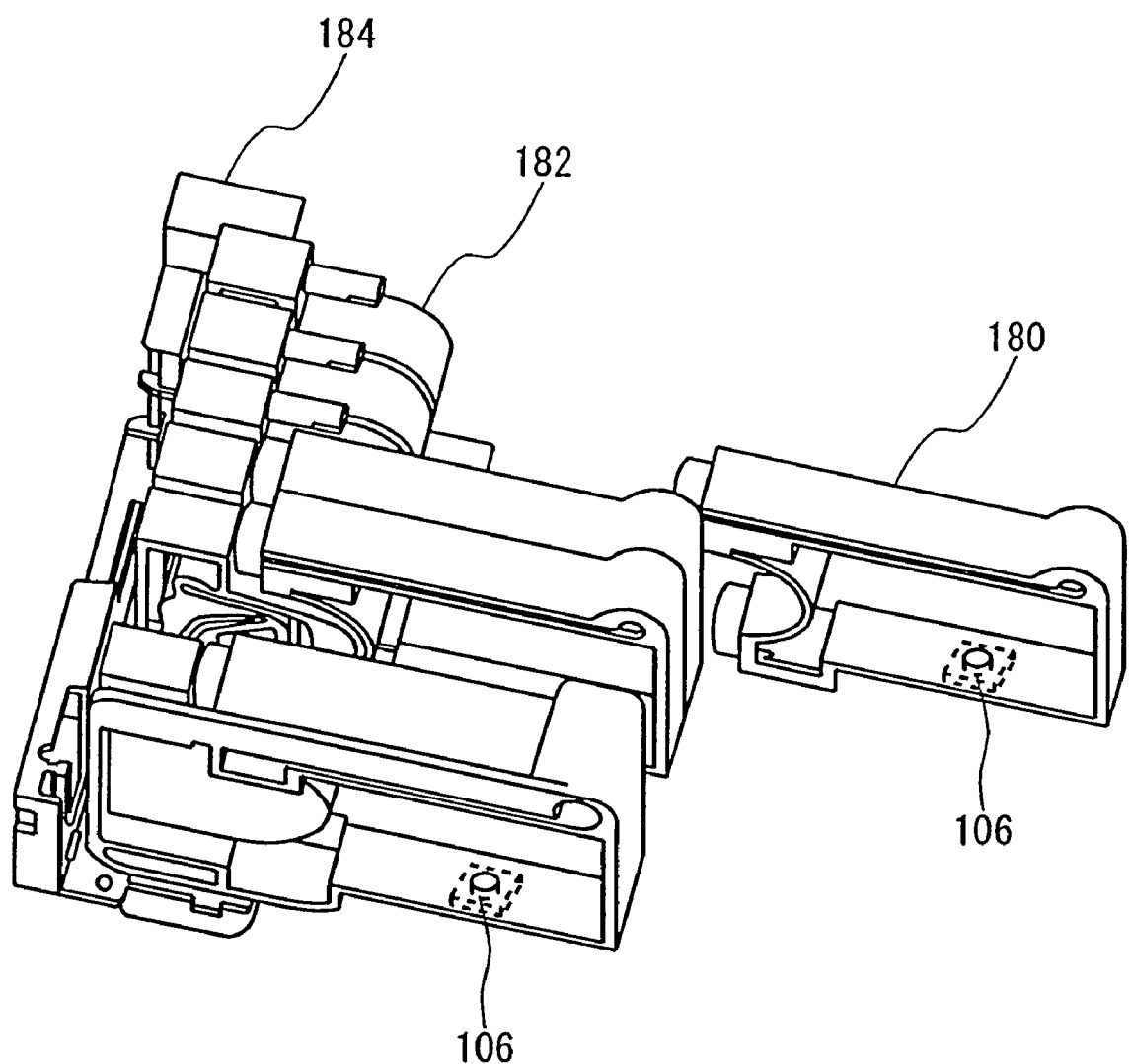
FIG. 40 shows an embodiment of the an ink cartridge using the actuator 106 shown in FIG. 20 and FIG. 2*l* and an ink-jet recording apparatus therefor.

FIG. 40 shows an embodiment of an ink cartridge and an ink jet recording apparatus which uses the actuator 106 shown in FIG. 20. A plurality of ink cartridges 180 is mounted on the ink jet recording apparatus which has a plurality of ink introducing members 182 and a holder 184 each corresponding to the each of ink cartridge 180, respectively. Each of the plurality of ink cartridges 180 contains different types of ink, for example, different color of ink. The actuator 106, which detects at least acoustic impedance, is mounted on the each of bottom of the plurality of ink cartridge 180. The residual quantity of ink in the ink cartridge 180 can be detected by mounting the actuator 106 on the ink cartridge 180.

Figure 41:
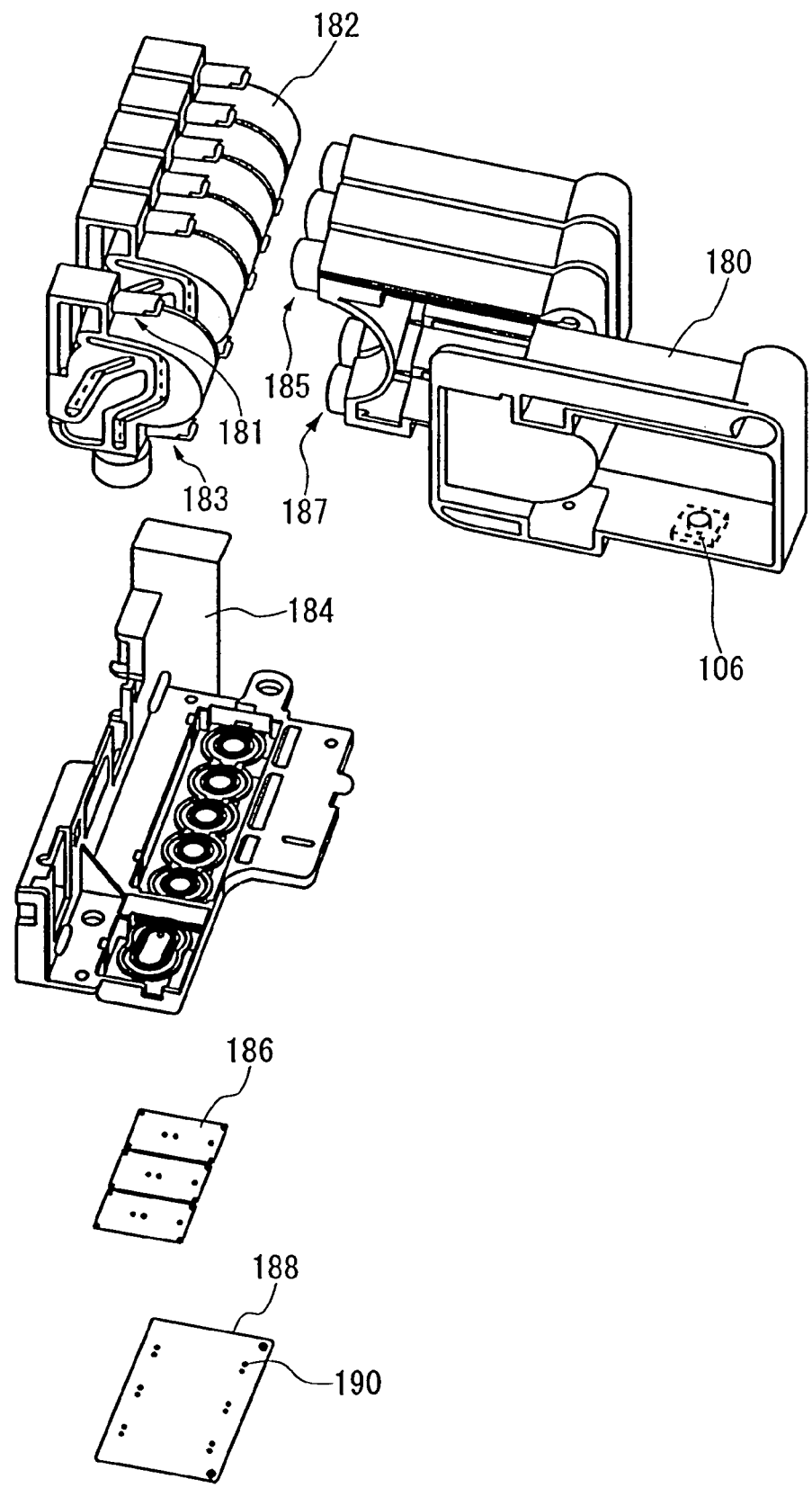
FIG. 41 shows a detail of the ink-jet recoding apparatus.

FIG. 41 shows a detail around the head member of the ink jet recording apparatus. The ink jet recording apparatus has an ink introducing member 182, a holder 184, a head plate 186, and a nozzle plate 188. A plurality of nozzle 190, which jet out ink, is formed on the nozzle plate 188. The ink introducing member 182 has an air supply hole 181 and an ink introducing inlet 183. The air supply hole 181 supplies air to the ink cartridge 180. The ink introducing inlet 183 introduces ink from the ink cartridge 180. The ink cartridge 180 has an air introducing inlet 185 and an ink supply port 187. The air introducing inlet 185 introduces air from the air supply hole 181 of the ink introducing member 182. The ink supply port 187 supplies ink to the ink introducing inlet 183 of the ink introducing member 182. By introducing air from the ink introducing member 182 to the ink cartridge 180, the ink cartridge 180 accelerates the supply of ink from the ink cartridge 180 to the ink introducing member 182. The holder 184 communicates ink supplied from the ink cartridge 180 through the ink introducing member 182 to the head plate 186.

Figure 42A:
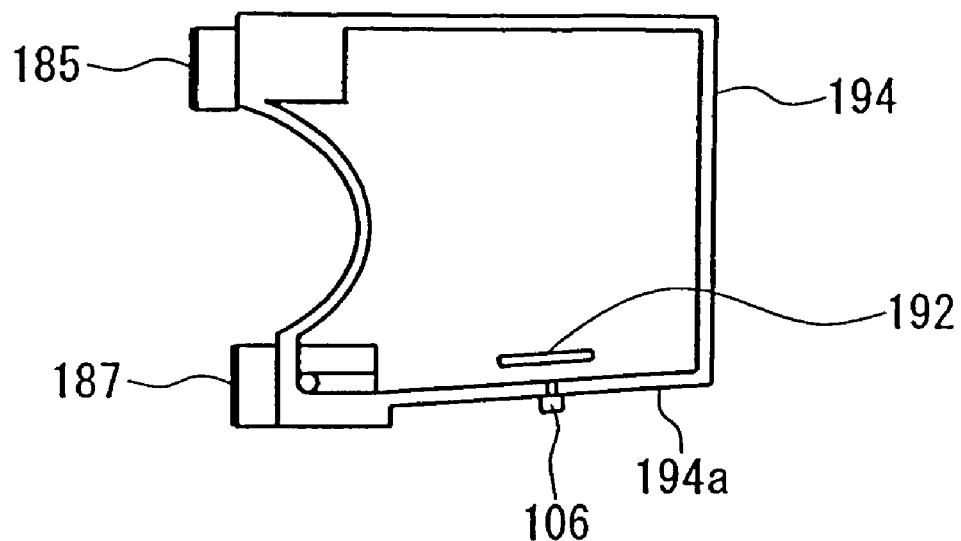
FIGS. 42A and 42B show another embodiments of the ink cartridge 180 shown in FIG. 40.
Figure 42B:
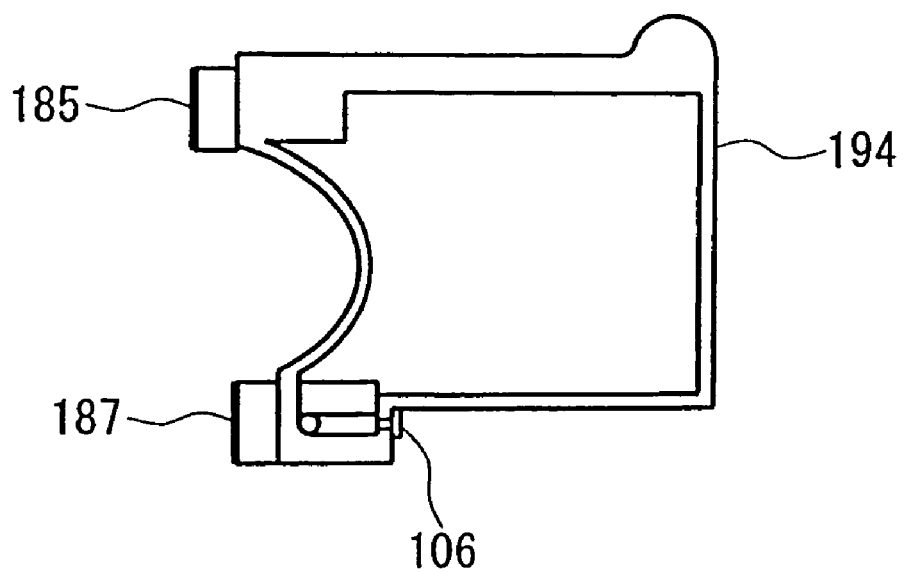

FIG. 42 shows other embodiment of the ink cartridge 180 shown in FIG. 41. The actuator 106 is mounted on the bottom face 194a, which is formed to be slanted in vertical direction, of the ink cartridge 180A shown in the FIG. 42(A). A wave preventing wall 192 is provided on the position where has the predetermined height from the bottom face of the inside the ink container 194 and also faces to the actuator 106 inside the ink container 194 of the ink cartridge 180. Because the actuator 106 is mounted on the ink container 194 slanted in vertical direction, the drainage of ink can be improved.

A gap, which is filled with ink, is formed between the actuator 106 and the wave preventing wall 192. The space between the wave preventing wall 192 and the actuator 106 has a space such that the space does not hold ink by capillary force. When the ink container 194 is rolled, ink wave is generated inside the ink container 194 by the rolling, and there is possibility that the actuator 106 malfunctions by detecting gas or an air bubble caused by the shock of the ink wave. By providing the wave preventing wall 192, ink wave around the actuator 106 can be prevented so that the malfunction of the actuator 106 can be prevented.

The actuator 106 of the ink cartridge 180B shown in FIG. 42 is mounted on the sidewall of the supply port of the ink container 194. The actuator 106 can be mounted on the side wall or bottom face of the ink container 194 if the actuator 106 is mounted nearby the ink supply port 187. The actuator 106 is preferably mounted on the center of the width direction of the ink container 194. Because ink is supplied to the outside through the ink supply port 187, ink and actuator 106 reliably contacts until the timing of the ink near end by providing the actuator 106 nearby the ink supply port 187. Therefore, the actuator 106 can reliably detect the timing of the ink near end.

Furthermore, by providing the actuator 106 nearby the ink supply port 187, the setting position of the actuator 106 to the connection point on the carriage on the ink container becomes reliable during the mounting of the ink container on the cartridge holder of the carriage. It is because the reliability of coupling between the ink supply port with the ink supply needle is most important during the coupling of the ink container and the carriage. If there is even a small gap, the tip of the ink supply needle will be hurt or a sealing structure such as O-ring will be damaged so that the ink will be leaked. To prevent this kind of problems, the ink jet printer usually has a special structure that can accurately positioning the ink container during the mounting of the ink container on the carriage. Therefore, the positioning of the actuator 106 becomes reliable by arranging the actuator nearby the ink supply port. Furthermore, the actuator 106 can be further reliably positioned by mounting the actuator 106 at the center of the width direction of the ink container 194. It is because the rolling is the smallest when the ink container rolls along an axis, the center of which is center line of the width direction, during the mounting of the ink container on the holder.

Figure 43A:
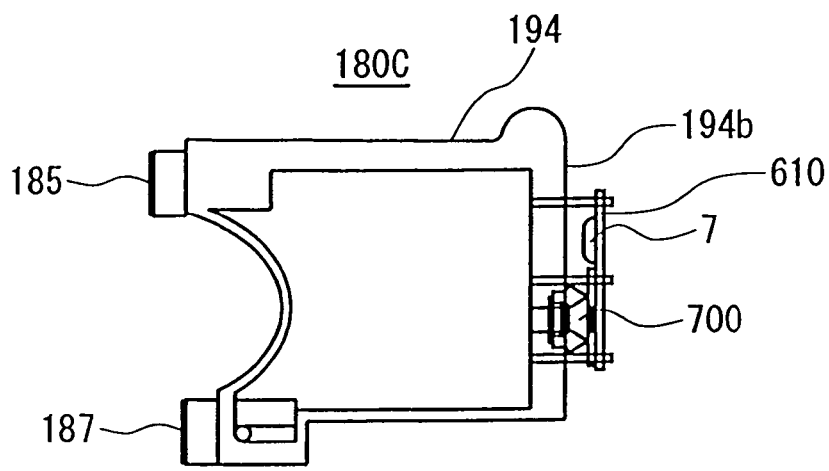
FIGS. 43A, 43B and 43C show still another embodiment of the ink cartridge 180.
Figures 43B, 43C:
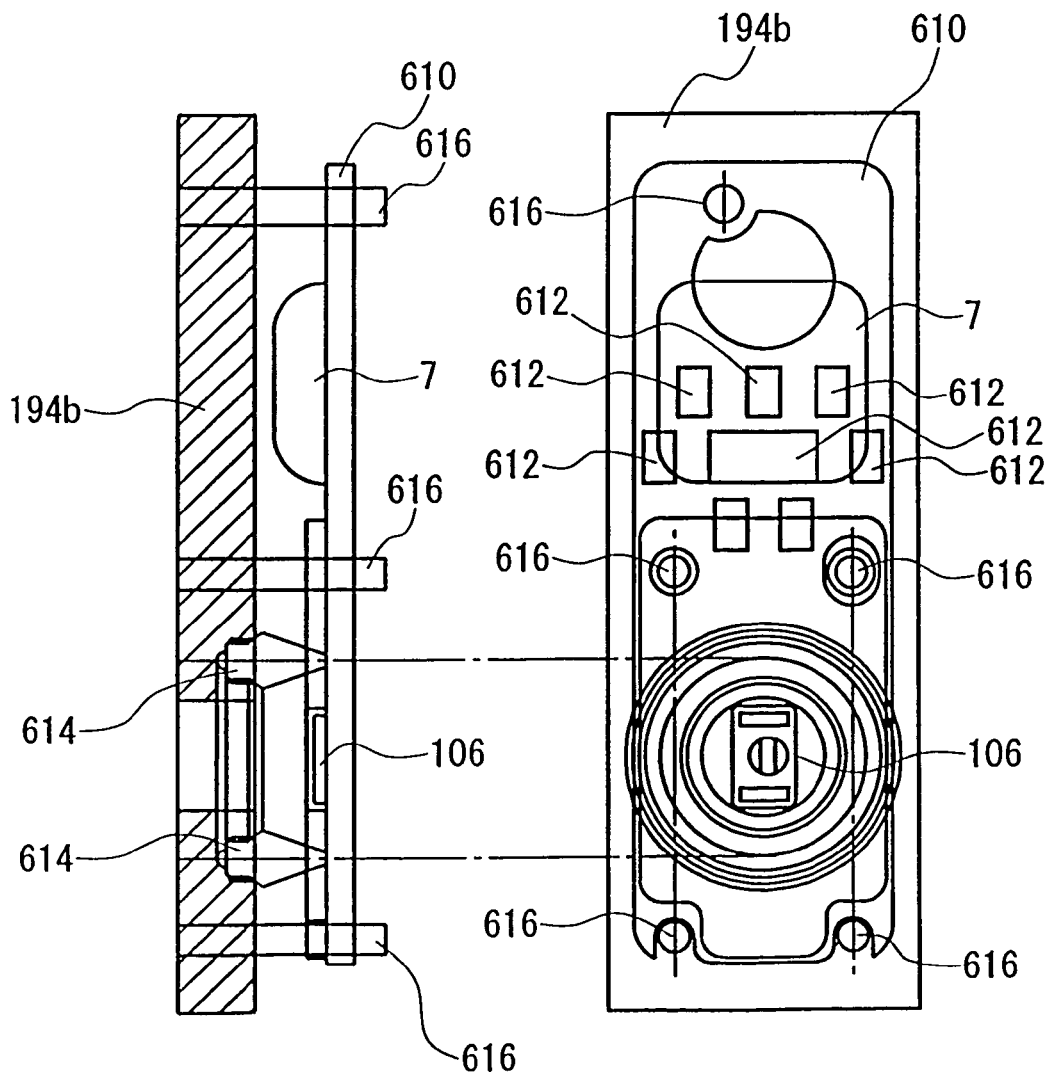

FIG. 43 shows further other embodiment of the ink cartridge 180. FIG. 43(A) shows a cross section of an ink cartridge 180C, and FIG. 43(B) shows a cross section which enlarges the side wall 194*b* of an ink cartridge 180C shown in FIG. 43(A). FIG. 43(C) shows perspective view from the front of the side wall 194*b* of the ink cartridge 180C. The semiconductor memory device 7 and the actuator 106 are formed on the same circuit board 610 in the ink cartridge 180C. As shown in FIG. 43(B) and (C), the semiconductor memory device 7 is formed on the upper side of the circuit board 610, and the actuator 106 is formed on the lower side of the semiconductor memory device 7 on the same circuit board 610. A different-type O-ring 614 is mounted on the side wall 194*b* such that the different-type O-ring 614 surrounds the actuator 106. A plurality of caulking part 616 is formed on the side wall 194*b* to couple the circuit board 610 with the ink container 194. By coupling the circuit board 610 with the ink container 194 using the caulking part 616 and pushing the different-type O-ring 614 to the circuit board 610, the vibrating region of the actuator 106 can contacts with ink, and at the same time, the inside of the ink cartridge is sealed from outside of the ink cartridge.

A terminals 612 are formed on the semiconductor memory device 7 and around the semiconductor memory device 7. The terminal 612 transfer the signal between the semiconductor memory device 7 and outside the ink jet recording apparatus. The semiconductor memory device 7 can be constituted by the semiconductor memory which can be rewritten such as EEPROM. Because the semiconductor memory device 7 and the actuator 106 are formed on the same circuit board 610, the mounting process can be finished at one time during mounting the semiconductor memory device 7 and the actuator 106 on the ink cartridge 180C. Moreover, the working process during the manufacturing of the ink cartridge 180C and the recycling of the ink cartridge 180C can be simplified. Furthermore, the manufacturing cost of the ink cartridge 180C can be reduced because the numbers of the parts can be reduced.

The actuator 106 detects the ink consumption status inside the ink container 194. The semiconductor memory device 7 stores the information of ink such as residual quantity of ink detected by the actuator 106. That is, the semiconductor memory device 7 stores the information related to the characteristic parameter such as the characteristic of ink and the ink cartridge used for the actuator 106 when detecting the ink consumption status. The semiconductor memory device 7 previously stores the resonant frequency of when ink inside the ink container 194 is full, that is, when ink is filled in the ink container 194 sufficiently, or when ink in the ink container 194 is end, that is, ink in the ink container 194 is consumed, as one of the characteristic parameter. The resonant frequency when the ink inside the ink container 194 is full status or end status can be stored when the ink container is mounted on the ink jet recording apparatus for the first time. Moreover, the resonant frequency when the ink inside the ink container 194 is full status or end status can be stored during the manufacturing of the ink container 194. Because the unevenness of the detection of the residual quantity of ink can be compensated by storing the resonant frequency when the ink inside the ink container 194 is full status or end status in the semiconductor memory device 7 previously and reading out the data of the resonant frequency at the ink jet recording apparatus side, it can be accurately detected that the residual quantity of ink is decreased to the reference value.

Figure 44:
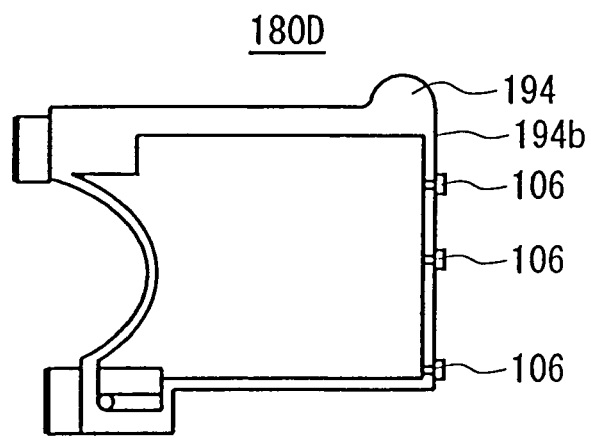
FIGS. 44A, 44B and 44C show still another embodiment of the ink cartridge 180.
Figure 44:
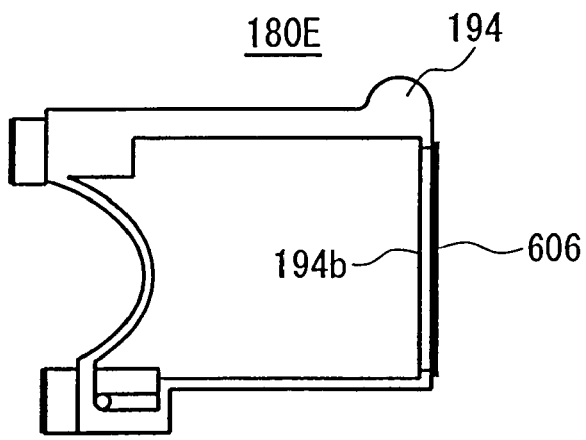
Figure 44:
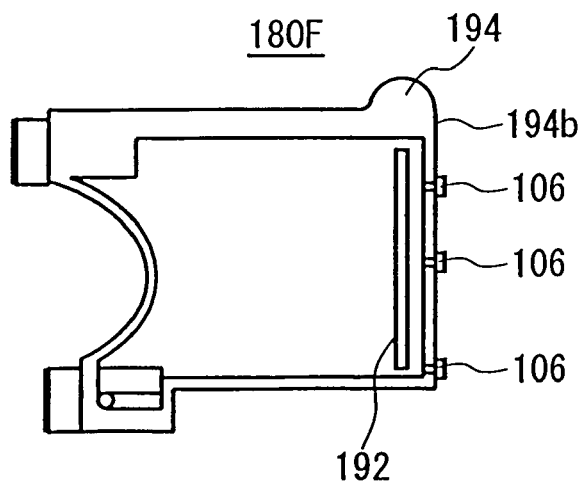

FIG. 44 shows further other embodiment of the ink cartridge 180. A plurality of actuators 106 is mounted on the side wall 194*b* of the ink container 194 in the ink cartridge 180D shown in FIG. 44(A). It is preferable to use the plurality of the actuators 106 which is formed in one body as shown in FIG. 24 for these plurality of actuators 106. The plurality of actuators 106 is arranged on the side wall 194*b* with interval in vertical direction. By arranging the plurality of actuators 106 on the side wall 194*b* with interval in vertical direction, the residual quantity of ink can be detected step by step.

The ink cartridge 180E shown in FIG. 44(B) mounts a actuator 606 which is long in vertical direction on the side wall 194*b* of the ink container 194. The change of the residual quantity of ink inside the ink container 194 can be detected continuously by the actuator 606 which is long in vertical direction. The length of the actuator 606 is preferably longer than the half of the height of the side wall 194*b*. In FIG. 44(B), the actuator 606 has the length from the substantially from the top end to the bottom end of the side wall 194*b*.

The ink cartridge 180F shown in FIG. 44(C) mounts a plurality of actuators 106 on the side wall 194*b* of the ink container 194 as the ink cartridge 180D shown in FIG. 44(A). The ink cartridge 180F further comprises the wave preventing wall 192, which is long in vertical direction, along the side wall 194*b* with predetermined space with the side wall 194*b* such that the wave preventing wall 192 faces directly to the plurality of actuators 106. It is preferable to use the plurality of the actuators 106 which is formed in one body as shown in FIG. 24 for these plurality of actuators 106. A gap which is filled with ink is formed between the actuator 106 and the wave preventing wall 192. Moreover, the gap between the wave preventing wall 192 and the actuator 106 has a space such that the gap does not hold ink by capillary force. When the ink container 194 is rolled, ink wave is generated inside the ink container 194 by the rolling, and there is possibility that the actuator 106 malfunctions by detecting gas or an air bubble caused by the shock of the ink wave. By providing the wave preventing wall 192, ink wave around the actuator 106 can be prevented so that the malfunction of the actuator 106 can be prevented. The wave preventing wall 192 also prevents the air bubble generated by the rolling of ink to enter to the actuator 106.

FIG. 45 shows further other embodiment of the ink cartridge 180. The ink cartridge 180G shown in FIG. 45(A) has a plurality of partition walls 212, each of which extends downward from the top face 194*c* of the ink container 194. Because each of lower end of the partition walls 212 and the bottom face of the ink container 194 has a predetermined gap, the bottom part of the ink container 194 communicates with each other. The ink cartridge 180G has a plurality of containing chambers 213 divided by the each of plurality of partition walls 212. The bottom part of the plurality of the containing chambers 213 communicates with each other. In each of the plurality of the containing chamber 213, the actuator 106 is mounted on the top face 194c of the ink container 194. It is preferable to use the plurality of the actuators 106 which is formed in one body as shown in FIG. 24 for these plurality of actuators 106. The actuator 106 is arranged on substantially center of the top face 194c of the containing chamber 213 of the ink container 194. The volume of the containing chamber 213 is arranged such that the volume of the containing chamber 213 of the ink supply port 187 is the largest, and the volume of the containing chamber 213 gradually decreases as the distance from the ink supply port 187 increases to the inner part of the ink cartridge 180G. Therefore, the space between each of the actuator 106 is widest at the ink supply port 187 side and becomes narrower as the distance from the ink supply port 187 increases to the inner part of the ink cartridge 180G. Because ink is drained from the ink supply port 187, and air enters from the air introducing inlet 185, ink is consumed from the containing chamber 213 of the ink supply port 187 side to the containing chamber 213 of the inner part of the ink cartridge 180G. For example, the ink in the containing chamber 213 which is most near to the ink supply port 187 is consumed, and during the ink level of the containing chamber 213 which is most near to the ink supply port 187 decreases, the other containing chamber 213 are filled with ink. When the ink in the containing chamber 213 which is most near to the ink supply port 187 is consumed totally, air enters to the containing chamber 213 which is second by counted from the ink supply port 187, then the ink in the second containing chamber 213 is beginning to be consumed so that the ink level of the second containing chamber 213 begin to decrease. At this time, ink is filled in the containing chamber 213 which is third or more than third by counted from the ink supply port 187. In this way, ink is consumed from the containing chamber 213 which is most near to the ink supply port 187 to the containing chamber 213 which is far from the ink supply port 187 in order.

As shown above, because the actuator 106 is arranged on the top face 194c of the ink container 194 with interval for each of the containing chamber 213, the actuator 106 can detect the decrease of the ink quantity step by step. Furthermore, because the volume of the containing chamber 213 decreases from the ink supply port 187 to the inner part of the containing chamber 213 gradually, the time interval when the actuator 106 detects the decrease of the ink quantity gradually decreases. Therefore, the frequency of the ink quantity detection can be increased as the ink end is drawing near.

Figure 45A:
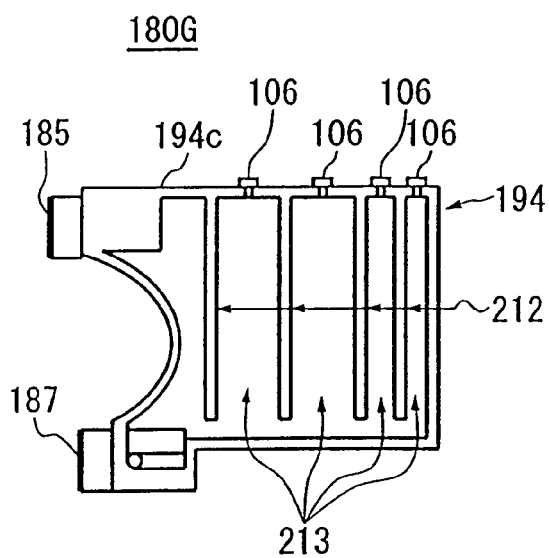
FIGS. 45A, 45B, 45C and 45D show still another embodiment of the ink cartridge 180.
Figure 45B:
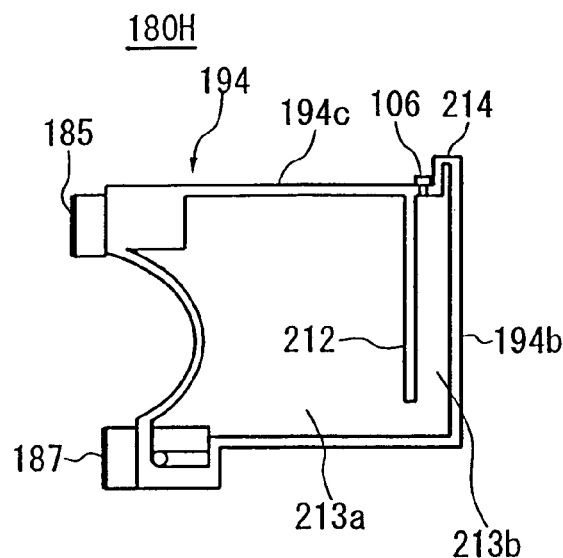

The ink cartridge 180H shown in FIG. 45(B) has one partition wall 212 which extends downward from the top face 194c of the ink container 194. Because lower end of the partition walls 212 and the bottom face of the ink container 194 have a predetermined space, the bottom part of the ink container 194 communicates with each other. The ink cartridge 180H has two containing chambers 213a and 213b divided by the partition wall 212. The bottom part of the containing chambers 213a and 213b communicates with each other. The volume of the containing chamber 213a of the ink supply port 187 side is larger than the volume of the containing chamber 213b which is located in a inner part of the ink cartridge 180H far from the ink supply port 187. The volume of the containing chamber 213b is preferably smaller than the half of the volume of the containing chamber 213a.

The actuator 106 is mounted on the top face 194c of the containing chamber 213B. Furthermore, a buffer 214, that is a groove for catching the air bubble which enters to the ink cartridge 180H during manufacturing of the ink cartridge 180H, is formed on the containing chamber 213b. In FIG. 45(B), the buffer 214 is formed as a groove extended upward from the side wall 194b of the ink container 194. Because the buffer 214 catches the air bubble enters inside the containing chamber 213b, the malfunction of the actuator 106 by detecting an ink end when catching the air bubble can be prevented. Furthermore, by providing actuator 106 on the top face 194c of the containing chamber 213b, ink can be completely consumed by compensating the ink quantity, which is measured from the detection of the ink end until the complete consumption of ink, with the corresponding ink consumption status of the containing chamber 213a calculated from the dot counter. Furthermore, by adjusting the volume of the containing chamber 213b by changing the length or the interval of the partition wall 212, the ink quantity which can be consumed after the detection of the ink end can be changed.

Figure 45C:
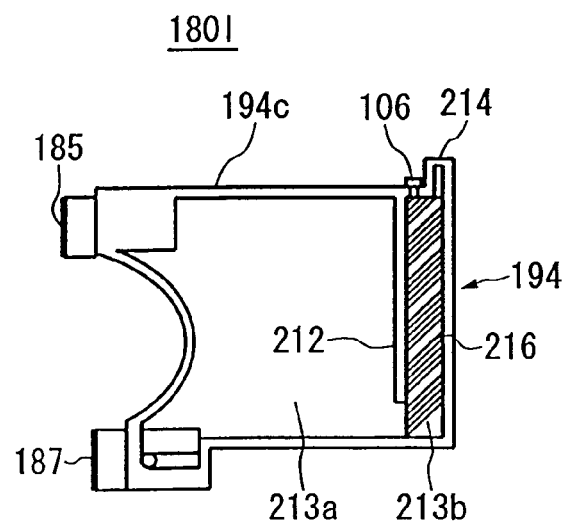

The ink cartridge 180I shown in FIG. 45(C) fills a porous member 216 in the containing chamber 213b of the ink cartridge 180H shown in FIG. 45(B). The porous member 216 is filled inside the containing chamber 213b from the top face to the bottom face of the porous member 216b. The porous member 216 contacts with the actuator 106. There is a possibility that the actuator 106 malfunctions by the entering of the air bubble inside the containing chamber 213b when the ink container fall down or when the containing chamber 213b moves back and forth with the carriage. If the porous member 216 is provided on the containing chamber 213b, the porous member 216 captures air to prevent entering of air into the actuator 106. Furthermore, because the porous member 216 holds ink, the porous member 216 can prevent the actuator 106 to malfunction as detecting the ink end status as ink exist status which is caused by attaching of the ink on the actuator 106 when the ink container shakes. The porous member 216 is preferable to be provided in the containing chamber 213 having a smallest volume. Furthermore, by providing actuator 106 on the top face 194c of the containing chamber 213b, ink can be consumed to the end by compensating the ink quantity which is measured from the detection of the ink end until the complete consumption of ink. Furthermore, The ink quantity which can be consumed after the detection of the ink near end can be changed by adjusting the volume of the containing chamber 213b by changing the length and interval of the partition wall 212.

Figure 45D:
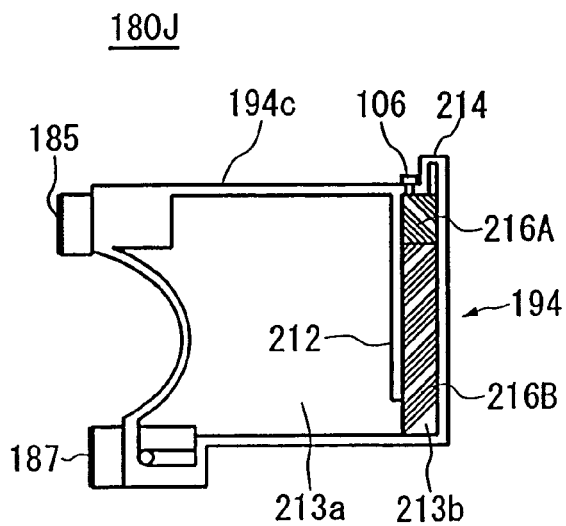

FIG. 45(D) shows an ink cartridge 180J, the porous member 216 of which is constituted by two kinds of porous members 216A and 216B having a different hole diameter with each other. The porous member 216A is located on the upper side of the porous member 216B. The hole diameter of the porous member 216A which is located on the upper side of the containing chamber 213b is larger than the hole diameter of the porous member 216B which is located on the lower side of the containing chamber 213B. The porous member 216A can be formed by the member which has a lower affinity for liquid than the affinity for liquid of the member which forms the porous member 216B. Because the capillary force of the porous member 216B, which has small hole diameter, is larger than the capillary force of the porous member 216A, which has large hole diameter, the ink in the containing chamber 213b is collected to the porous member 216B located on the lower side of the containing chamber 213B and held by the porous member 216B. Therefore, once the air reaches to the actuator 106, and the actuator 106 detects the non-ink status, ink does not reaches to the actuator 106 again so that the actuator 106 does not malfunction to detect the ink exist status. Furthermore, because the porous member 216B which is far from the actuator 106 absorbs ink, the drainage of ink around the actuator 106 improves, and the quantity of change of the acoustic impedance during the detection of the ink existence increases. Moreover, by providing the actuator 106 on the top face 194c of the containing chamber 213b, ink can be consumed to the end by compensating the ink quantity which is measured from the detection of the ink near end until the complete consumption of ink. Furthermore, The ink quantity which can be consumed after the detection of the ink near end can be changed by adjusting the volume of the containing chamber 213b by changing the length and interval of the partition wall 212.

FIG. 46 shows a cross section of an ink cartridge 180K which is further other embodiment of the ink cartridge 180I shown in FIG. 45(C). The porous member 216 in the ink cartridge 180K shown in FIG. 46 is designed such that the area of the cross section on the horizontal plane of the lower part of the porous member 216 is compressed to be decreases gradually to the direction to the bottom face of the ink container 194. Therefore, the hole diameter of the porous member 216 decreases gradually to the direction to the bottom face of the ink container 194. Ink cartridge 180K shown in FIG. 46(A) has a rib which is provided on the side wall of the ink container 194 to compress the lower part of the porous member 216 to reduce the hole diameter of the lower part of the porous member 216. Because the hole diameter of the lower part of the porous member 216 reduced by the compression, ink is collected and held by the lower part of the porous member 216. Because the lower part of the porous member 216 which is far from the actuator 106 absorbs ink, the drainage of ink around the actuator 106 improves, and the quantity of change of the acoustic impedance during the detection of the ink existence increases. Therefore, the error, of which the actuator 106 detects the non ink status as the ink exist status by the attaching of ink on the actuator 106 mounted on the top face of the ink cartridge 180K by rolling of ink, can be prevented In the ink cartridge 180L shown in FIG. 46(B) and FIG. 46(C), to compress to decrease the area of the cross section on the horizontal plane of the lower part of the porous member 216 gradually to the direction to the bottom face of the ink container 194, the area of the cross section on the horizontal plane of the containing chamber gradually decreases to the direction to the bottom face of the ink container 194. Because the hole diameter of the lower part of the porous member 216 reduced by the compression, ink is collected and held by the lower part of the porous member 216. Because the lower part of the porous member 216B which is far from the actuator 106 absorb sink, the drainage of ink around the actuator 106 improves, and the quantity of change of the acoustic impedance during the detection of the ink existence increases. Therefore, the error, of which the actuator 106 detects the non ink status as the ink exist status by the attaching of ink on the actuator 106 mounted on the top face of the ink cartridge 180L by rolling of ink, can be prevented FIG. 47 shows other embodiment of the ink cartridge using the actuator 106. The ink cartridge 220A shown in FIG. 47(A) has a first partition wall 222 provided such that it extends downward from the top face of the ink cartridge 220A. Because there is a predetermined space between the lower end of the first partition wall 222 and the bottom face of the ink cartridge 220A, ink can flows into the ink supply port 230 through the bottom face of the ink cartridge 220A. A second partition wall 224 is formed such that the second partition wall 224 extends upward from the bottom face of the ink cartridge 220A on the more ink supply port 230 side of the first partition wall 222. Because there is a predetermined space between the upper end of the second partition wall 224 and the top face of the ink cartridge 220A, ink can flows into the ink supply port 230 through the top face of the ink cartridge 220A.

A first containing chamber 225a is formed on the inner part of the first partition wall 222, seen from the ink supply port 230, by the first partition wall 222. On the other hand, a second containing chamber 225b is formed on the front side of the second partition wall 224, seen from the ink supply port 230, by the second partition wall 224. The volume of the first containing chamber 225a is larger than the volume of the second containing chamber 225b. A capillary passage 227 is formed by providing a space, which can generate the capillary phenomenon, between the first partition wall 222 and the second partition wall 224. Therefore, the ink in the first containing chamber 225a is collected to the capillary passage 227 by the capillary force of the capillary passage 227. Therefore, the capillary passage 227 can prevent that the air or air bubble enters into the second containing chamber 225b. Furthermore, the ink level in the second containing chamber 225b can decrease steadily and gradually. Because the first containing chamber 225a is formed at more inner part of the second containing chamber 225b, seen from the ink supply port 230, the ink in the second containing chamber 225b is consumed after the ink in the first containing chamber 225a is consumed.

The actuator 106 is mounted on the side wall of the ink cartridge 220A of the ink supply port 230 side, that is, the side wall of the second containing chamber 225b of the ink supply port 230 side. The actuator 106 detects the ink consumption status inside the second containing chamber 225b. The residual quantity of ink at the timing closed to the ink near end can be detected stably by mounting the actuator 106 on the side wall of the second containing chamber 225b. Furthermore, by changing the height of the mounting position of the actuator 106 on the side wall of the second containing chamber 225b, the timing to determine which ink residual quantity as an ink end can be freely set. Because ink is supplied from the first containing chamber 225a to the second containing chamber 225b by the capillary passage 227, the actuator 106 does not influenced by the rolling of ink caused by the rolling of the ink cartridge 220A, and actuator 106 can thus reliably measure the ink residual quantity. Furthermore, because the capillary passage 227 holds ink, the capillary passage 227 can prevent ink to flow backward from the second containing chamber 225b to the first containing chamber 225a.

A check valve 228 is provided on the top face of the ink cartridge 220A. The leaking of ink outside of the ink cartridge 220A caused by the rolling of the ink cartridge 220A can be prevented by the check valve 228. Furthermore, the evaporation of ink from the ink cartridge 220A can be prevented by providing the check valve 228 on the top face of the ink cartridge 220A. If ink in the ink cartridge 220A is consumed, and negative pressure inside the ink cartridge 220A exceeds the pressure of the check valve 228, the check valve 228 opens and introduces air into the ink cartridge 220A. Then the check valve 228 closes to maintain the pressure inside the ink cartridge 220A to be stable.

FIGS. 47(C) and (D) shows a detailed cross-section of the check valve 228. The check valve 228 shown in FIG. 47(C) has a valve 232 which includes flange 232a formed by rubber. An airhole 233, which communicates air between inside and outside of the ink cartridge 220, is provided on the ink cartridge 220 such that the airhole 233 faces to the flange 232a. The airhole 233 is opened and closed by the flange 232a. The check valve 228 opens the flange 232a inward the ink cartridge 220 when the negative pressure in the ink cartridge 220 exceeds the pressure of the check valve 228 by the decrease of ink inside the ink cartridge 220A, and thus the air outside the ink cartridge 220 is introduced into the ink cartridge 220. The check valve 228 shown in FIG. 47(D) has a valve 232 formed by rubber and a spring 235. If the negative pressure inside the ink cartridge 220 exceeds the pressure of the check valve 228, the valve 232 presses and opens the spring 235 to introduce the outside air into the ink cartridge 220 and then closes to maintain the negative pressure inside the ink cartridge 220 to be stable.

The ink cartridge 220B shown in FIG. 47(B) has a porous member 242 in the first containing chamber 225a instead of providing the check valve 228 on the ink cartridge 220A as shown in FIG. 47. The porous member 242 holds the ink inside the ink cartridge 220B and also prevents ink to be leaked outside of the ink cartridge 220B during the rolling of the ink cartridge 220B.

The embodiment that the actuator 106 is mounted on an ink cartridge or a carriage, in which the ink cartridge is a separate body with the carriage and mounted on the carriage, has been explained above. However, the actuator 106 can be mounted on the ink tank which is mounted on the ink jet recording apparatus together with a carriage and formed together with a carriage as one body. Furthermore, the actuator 106 can be mounted on the ink tank of the off-carriage type. The off-carriage type ink tank is a separate body with a carriage and supplies ink to carriage through such as tube. Moreover, the actuator of the present embodiment can be mounted on the ink cartridge 180 constituted so that a recording head and an ink container are formed as on body and possible to be exchanged.

"The Structure and the Advantage of a Liquid Detecting Device with a Cavity"

The several kinds of ink cartridges which have a function of detecting ink consumption of the present embodiment are explained above. In these ink cartridges, a piezoelectric element is used for detecting the ink consumption. The actuator which is an apparatus for detecting liquid with cavity has been shown in these configuration. The typical configuration is shown in, for example, FIG. 20. Moreover, a mounting module, in which a piezoelectric device and a mounting structure are formed as one body, was shown in another embodiment. The representative example is shown in, for example, FIG. 32. As shown above, the piezoelectric device can be protected using mounting module. Furthermore, the mounting of piezoelectric device becomes easier by mounting module. In the present embodiment, especially the mounting module with a cavity has been shown. Furthermore, the piezoelectric device has been used for detecting the ink consumption in these ink cartridges. In these configurations, the ink cartridges with a cavity were shown. The typical configuration of this embodiment is shown in FIG. 28, for example. The advantages shown below can be obtained by providing an opening cavity. The following advantages can be obtained by these types of liquid detecting device.

(1) Refer to FIG. 20 again, the actuator 106 has a base plate 178 as a base member. The piezoelectric element (160, 164, 166) is formed on the base plate 178. The cavity 162 of the base plate 178 is provided on the position which faces with the piezoelectric element. A vibration is transferred between the piezoelectric element and inside the container through the cavity 162. On the other hand, FIG. 32 shows the module 100 during the assembling of the module 100, and FIG. 33 shows the module 100 when the module 100 is taken apart for other embodiment. The actuator 106 (piezoelectric device) and the mounting structure are formed in one body. The mounting module 100 is mounted on the ink cartridge. A through hole 112 is provided on a plate 110, which is a part of the mounting structure. The through hole 112 corresponds to the opening cavity of the present invention (the through hole 112 will be called as opening cavity in following at suitable time). The through hole 112 faces to the actuator 106, and the through hole 112 is also arranged at the position where faces to the inside direction of the ink cartridge 180 from the actuator 106. The vibration transmits between the piezoelectric device and the inside the container through the cavity 112. If the ink consumption advances, the liquid level decreases, and the through hole 112 exposes. At this time, a substantially constant quantity of ink is remained and held in the through hole 112. Furthermore, in the other embodiment shown in FIG. 28, the container 1 of the ink cartridge has a bottom face 1a. The actuator 650 as a piezoelectric device is mounted on the lower part of the bottom face 1a. The container 1 has a through hole 1c, called as cavity in following, at the position which faces to the piezoelectric element 73 of the actuator 650. That is, the cavity 1c is formed on the position where faces to the inside the container from the piezoelectric element 73 and communicate with the inside of the container. The vibration transmits between the piezoelectric device and inside the container trough the cavity. When the ink consumption advances, the liquid level decreases, and the cavity 162 exposes. At this time, substantially constant quantity of ink is remained and held inside the cavity 162. The ink quantity held in the cavity 162 is determined by the shape and setting angle of the cavity 162 and the viscosity of ink in the cavity 162. The acoustic impedance corresponds to this constant quantity of ink can be previously obtained by measurement. It can be possible to obtain the ink consumption reliably by judging whether this kind of acoustic impedance is detected or not.

As explained above, the residual vibration status of the piezoelectric element can be used for detecting the ink consumption. The piezoelectric element enters residual vibration status after the oscillation. The residual vibration status, especially, its resonant frequency corresponds to the change of the acoustic impedance and the ink consumption status. The ink consumption status can be reliably detected by judging whether the residual vibration status when the small quantity of ink is held in the cavity 162 is detected or not. Furthermore, ink consumption can be reliably detected by judging whether the residual vibration status when the small quantity of ink is held in the through hole 112 is detected or not. Furthermore, according to the present embodiment, as explained above, the malfunction caused by the wave of ink can be prevented by providing the cavity on the actuator. Because ink is attached on the cavity beforehand, there is no difference occurred by attaching of ink on the cavity by wave of ink, and thus the detection results does not influenced by the attaching of ink on the cavity.

Moreover, the distance between the piezoelectric element and ink reduced by providing the cavity 162 on the actuator of the present embodiment. Concretely, the vibrating-plate 176 provided between the piezoelectric element 174 and ink is extremely thinner than the base plate 178. Here, the element which mainly influence to the residual vibration of the piezoelectric element is only small amount of ink nearby the piezoelectric element. This small amount of ink exists nearby the piezoelectric element and contacts with vibrating plate by providing the cavity 162 on the actuator. Because the change of the residual vibration which involves with the ink consumption becomes remarkable, the ink consumption can be reliably detected.

Furthermore, the distance between the actuator 106 and ink is reduced by providing the cavity on the actuator. Therefore, the vibration transmits between the actuator 106 and ink without through the plate 110. Here, the element which mainly influence to the residual vibration of the piezoelectric device is only small amount of ink nearby the piezoelectric device. This small amount of ink exists nearby the piezoelectric device and contacts with piezoelectric device by providing the cavity 162 on the piezoelectric device. Because the change of the residual vibration which involves with the ink consumption becomes remarkable, the ink consumption can be reliably detected.

The cavity does not have to penetrate through the plate 110. In this case, the cavity is constituted by the concave part of the plate 110.

Furthermore, the cavity is provided on the limited part of the actuator, and ink is sealed by the member provided around the cavity. The actuator 106, especially the piezoelectric element of the actuator 106, is protected effectively from ink which has a conductivity.

The distance between the actuator 650, especially piezoelectric element 73, and ink is reduced by providing the through hole 1c on the actuator 106. In the example shown in FIG. 28, the wall of the container does not exist between the actuator 650 and ink. The vibrating plate 72 is thinner than the base plates 71 and the container wall.

Here, the detection of ink consumption based on the acoustic impedance, especially the detection using the residual vibration is explained. However, the ink consumption can be detected by the elastic wave and reflected wave using the actuator 106. The time until the reflected wave returns can be measured. Other principle also can be applied. The above explanation also applies to the explanation which will be explained below (2) The cavity has a shape that holds ink at the predetermined liquid condition. The shape of the cavity is determined such that the cavity can hold ink even at the ink consumption status at the detection aim. By using the residual vibration corresponds to the ink quantity at the ink consumption status at the detection aim as a reference value, it can be detected that ink is consumed or not.

Here, it can be considered that the case, in which the ink does not remained in the cavity, is much easier to detect the ink consumption. However, the problem of the ink attachment explained above will be occurred. If ink remains or not remains in cavity, that is, if there is unevenness of the ink remaining status, this unevenness can be cause the detection error. In this case, it is preferable for cavity to hold ink as explained above. To accomplish this, the cavity may have a predetermined depth which can prevent all the ink to be flowed out. Because the base plate of the present embodiment has enough thickness, the necessary depth can be provided to the cavity.

(3) In the present embodiment, the cavity 162 penetrates through the base plate 178, which is provided as a base member. In the embodiment shown in FIG. 28, the cavity 1c penetrates trough the wall of the container at the bottom face 1c. By penetrating through the container wall by the cavity 162, the status of ink is further reliably transmits to the piezoelectric element. Moreover-, a vibrating plate 72 is provided between the piezoelectric element 73 and the container wall as an intermediate member. The vibrating plate 72 vibrates together with piezoelectric device and also seals the cavity 1c. A vibrating plate 176 is provided between the piezoelectric element and the base plate 178 as an intermediate member. The vibrating plate 176 vibrates together with the piezoelectric element and also seals the cavity 162. Therefore, the present embodiment can secure the ink seal condition and also detects the ink consumption status reliably.

Figure 48:
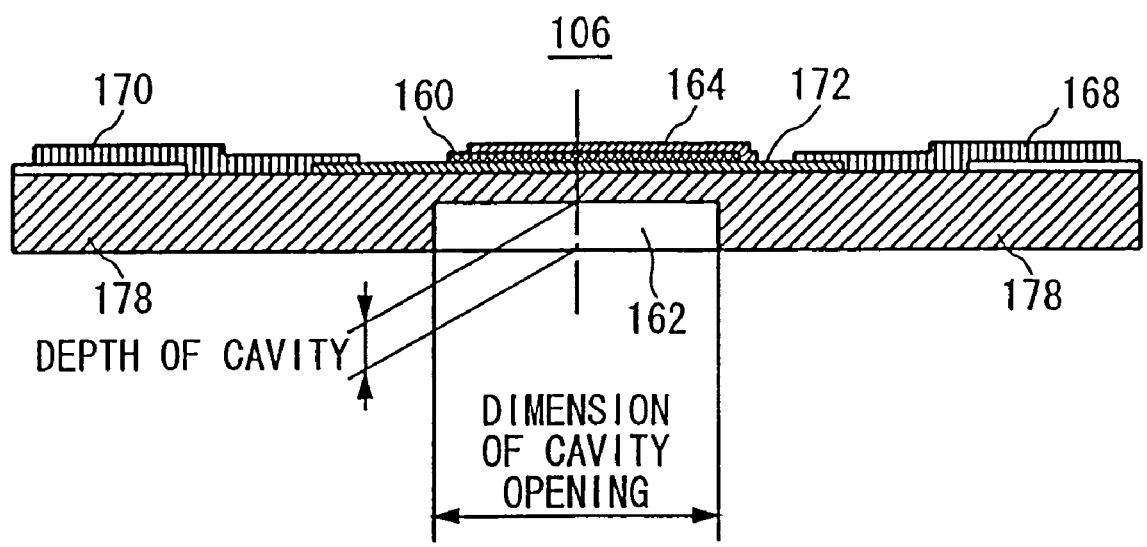
FIG. 48 shows an example where the opening cavity is comprised of a concave part of the base member.

As a variation of the present embodiment, the cavity may not penetrate through the base plate. In other words, the cavity is comprised by concave part on the base plate. In this case, there is advantage that it is easier to secure the sealing. Moreover, because the vibrating plate is not necessarily if forming the vibrating region by forming the thickness of the concave part of the base plate thinner, the structure of the actuator becomes simple, and the manufacturing of the actuator becomes easy. FIG. 48 shows an example of the configuration shown above.

In an example which uses the present invention for a module, because the plate of the module has a suitable thickness, the necessary depth is provided to the cavity.

Figure 49:
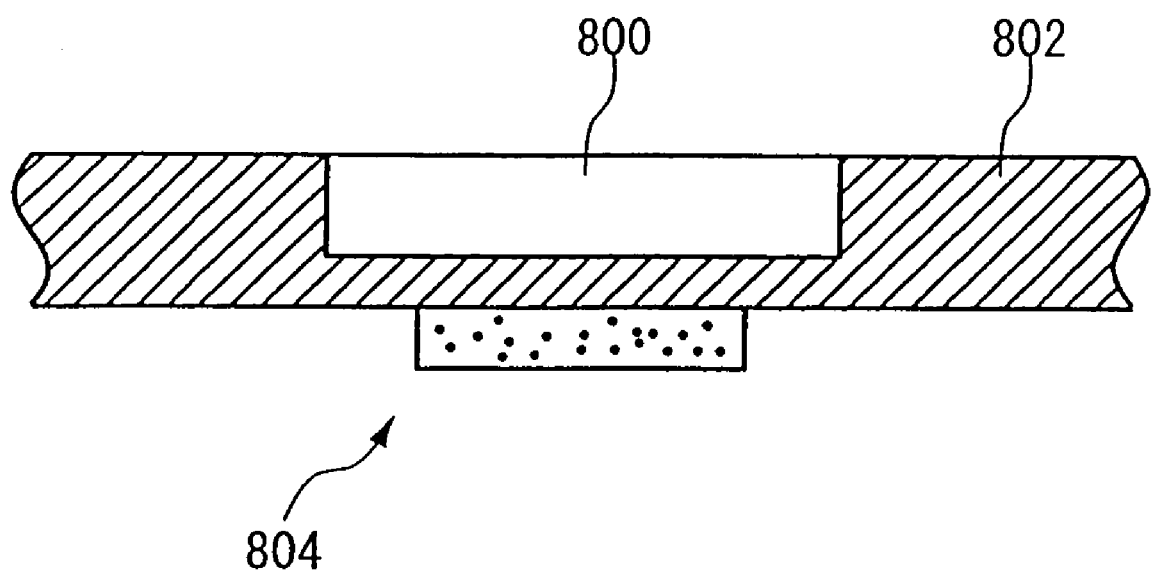
FIG. 49 shows an exemplary opening cavity comprised of a concave part provided in a wall section of the ink cartridge.

As shown in FIG. 49 as an example, a cavity 800 does not have to penetrate through a container wall 802 as a variation of the present embodiment. In other words, the cavity 800 is comprised by the concave part of the container wall. A piezoelectric device 804 is arranged such that the piezoelectric device faces to the concave part. In this case, there is advantage that the securing of the sealing becomes easy. Furthermore, if the vibrating region is formed by forming the thickness of the concave part of the base plate thinner, the vibrating plate and base plate becomes not necessarily. Therefore, the structure of the module becomes simple, and the manufacturing of the module becomes easy.

Figure 31:
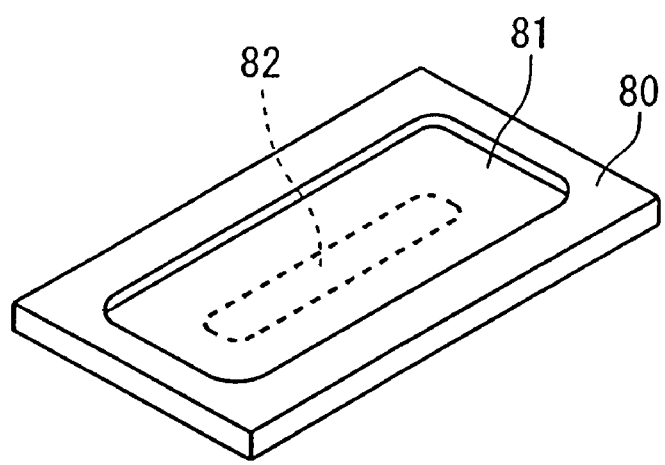
FIGS. 31A and 31B show an actuator 670 according to still another embodiment.
Figure 31:
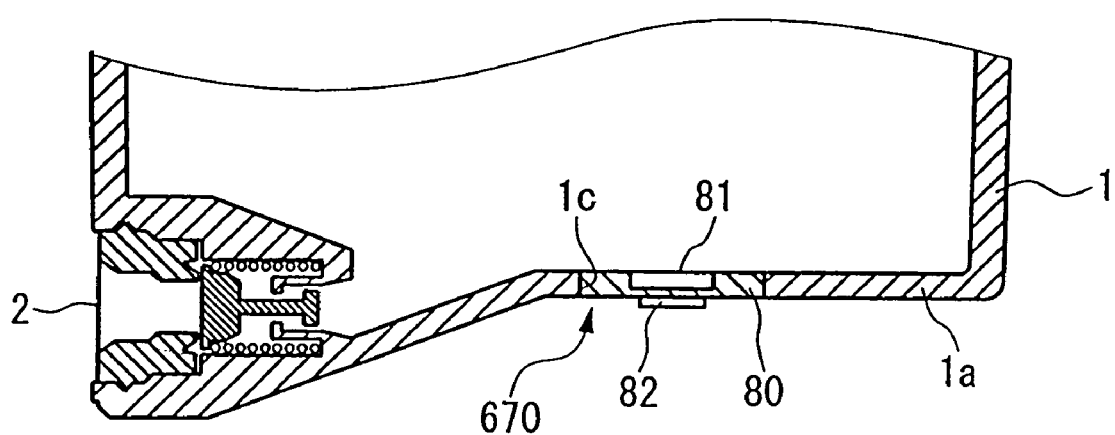

The configuration similar to FIG. 49 is also shown in FIG. 31. Here, a concave part 81, which functions as a cavity, is formed on the base plate 80 of the actuator 670. This base plate 80 is fit into the through hole provided on the bottom face 1a of the container 1, and as a result, the configuration similar to FIG. 49 is obtained. It is also relatively easy to manufacture the actuator having this configuration.

(4) Referring to FIG. 20 again, the piezoelectric element is comprised by the piezoelectric layer 160, the upper electrode 164, and the lower electrode 166. The lower electrode 166 is formed on the base plate, and the piezoelectric layer 160 is formed on the lower electrode 166, and the upper electrode 164 is further formed on the piezoelectric layer 160. In other embodiment, the actuator 106, or piezoelectric device, of the mounting module 100 includes a piezoelectric element. As one of the feature of the present embodiment, the area of the cavity is set to be larger than the area of the lower electrode. In detail, the area of the piezoelectric element side of the opening cavity is set to be larger than the area of the overlapped part of the piezoelectric layer and the lower electrode. The following advantages can be earned by this configuration.

In the configuration shown in FIG. 20, the lower electrode 166 is the closest to the cavity and also the smallest element in the piezoelectric element. The piezoelectric element vibrates within the range which is covered by the lower electrode 166. The magnitude of the vibrating region is substantially equivalent to the lower electrode 166. Furthermore, the vibrating characteristic of the piezoelectric element can be adjusted by changing the size of the lower electrode 166. The shape of the cavity is set to be corresponded with this lower electrode 166 in the present embodiment. That is, the area of the cavity 162 is set to be larger than the area of the lower electrode 166. The piezoelectric element can vibrate in suitable condition by this configuration.

(5) Next, the suitable relationship between a cavity depth and a size of cavity opening will be further explained. The cavity depth is a size of the base plate in the direction of thickness in FIG. 20 and FIG. 48. When the cavity penetrates through the base plate, the cavity depth is equal to the thickness of the base plate. The size of the cavity opening is the size which is perpendicular direction to the cavity depth, that is, the size of the opening on the base plate. The suitable relationship between the cavity depth and the size of the cavity opening is further explained for the embodiment of the module. In FIG. 33, the cavity depth is the size of the cavity in the direction of central axis of the module 100. In FIG. 33, because the cavity 112 penetrates through the plate 110, the cavity depth is equal to the sum of the plate thickness and the base plate thickness. The size of the cavity opening is the size in the perpendicular direction to the cavity depth, and also the size of the opening on the plate. Furthermore, the suitable relationship between the cavity depth and the size of the cavity opening in the embodiment of the liquid container will be explained. In FIG. 28, the cavity depth is the size of the cavity in the direction penetrating through the container wall. Because the through hole 1c penetrates through the container wall in FIG. 28, the cavity depth equals to the sum of the wall thickness and the base plate thickness. The size of the cavity opening is the size which is perpendicular to the direction of the cavity depth, and also the size of the hole of the container wall.

In the present embodiment, the cavity depth is set to be smaller than the size of the opening. Therefore, the cavity has a shallow and wide shape. The following advantage will be earned by this shape of the cavity.

Because the cavity is shallow and wide, the ink quantity remained in the cavity when ink decreases is little. Therefore, the change of the residual vibration by the ink consumption becomes large so that the accuracy of detection improves.

Furthermore, if the cavity has a deep and narrow shape, there is a possibility that the vibration does not transmit properly from the cavity to the container. However, according to the present embodiment, because the cavity is shallow and wide, the vibration transmits properly to detect the change of the residual vibration.

According to the inventors research, the cavity depth is preferable to be one third or less than one third of the size of the opening. The change of the residual vibration appears remarkably by this configuration.

In the above explanation, the cavity having a circular shape is mainly discussed. However, the cavity can have several kinds of shape within a scope of the present invention. If considering the shape of the cavity, the cavity depth may set to be smaller than the minimum width of the cavity opening. Preferably, the cavity depth is one third or less than one third of the minimum width of the cavity opening. For example, if the cavity has a rectangular shape, the size of the shorter side is set to be larger than the cavity depth.

(6) Moreover, as one of the characteristic of the present embodiment, the opening cavity has a shape substantially symmetrical about the center of the piezoelectric element. Preferably, the cavity has a circular shape. Moreover, as an another characteristic of the embodiment, the opening cavity has a shape substantially symmetrical about the center of vibrating center, or center of the piezoelectric element, of the liquid detection device. Preferably, the cavity has a circular shape.

According to this configuration, the frequency characteristic in which the single peak appears on the lower level can be obtained. The primary vibration mode dominates in the piezoelectric layer, and signal-to-noise ratio increases. The amplitude of the residual vibration also increases. Therefore, the detectivity is good. Furthermore, the influence of the fixing of the sensor on the accuracy of detection can be reduced by adopting the isotropic shape. For example, the case for using an epoxy adhesive to fix the sensor is considered. This kind of adhesive causes the contraction during the curing. Therefore, if the shape of the cavity is not symmetric, a deformation will be generated by the influence of contraction, and thus the vibration characteristic becomes different depends on the location around the cavity.

On the other hand, the shape of the cavity is symmetrical in the present embodiment. Therefore, because the sensor is hard to be influenced by the deformation even if the plate is fixed by using the adhesive, a uniform vibration characteristic can be obtained around the whole cavity. Moreover, because the sensor is hard to be influenced by the deformation even the sensor is fixed by the normal adhesive, a uniform vibration characteristic can be obtained around the whole cavity. As shown in this example, because the influence of the fixing the sensor can be reduced according to the present embodiment, the sensor can be reliably mounted on the ink cartridge. A relatively simple mounting method can also be adopted. Therefore, the manufacturing of the piezoelectric element and the ink cartridge becomes easy.

Especially, according to the present embodiment, a high uniformity can be obtained by forming the cavity in circular shape. Because the detectivity increases, the advantages explained above is further becomes remarkable. Also, the advantages that the cavity can be formed by such as boring using a punch by adopting the circular shape of the cavity can be obtained so that the manufacturing of the sensor becomes easy.

(7) A liquid detecting device, or actuator, is mounted on the position of the liquid level which is corresponded with the predetermined liquid consumption status of the detection aim. In other embodiment, the mounting module 100 and the piezoelectric device, or actuator 106, is mounted on the position of the liquid level which is corresponded with the predetermined liquid consumption status of the detection aim. If the liquid level passes through the detecting device, ink is remained in the cavity and held by the cavity. The liquid detecting device, especially, the shape of the cavity is constructed so that the liquid detecting device generates the detection signal which indicates the residual vibration status which corresponds to the ink in the opening cavity at the time when the liquid level passes through the detecting device.

As explained above, when the cavity depth "t" and the radius of the cavity opening "a" satisfies the condition shown below, $$(a/t) > (3*\pi/8),$$

in which the cavity is substantially circular shape, the ink consumption status can be detected at the condition where ink is remained in cavity.

(8) As other suitable applied example of the present embodiment, the opening area, or size, of the inside of container side of the cavity is set to be larger than the opening area, or size, of the piezoelectric element side. By this configuration, the shape which widens toward the inside of the container is provided to the cavity. Because this configuration can prevent unnecessary ink to be remained in the cavity, the detection ability can be improved.

Figure 50A:
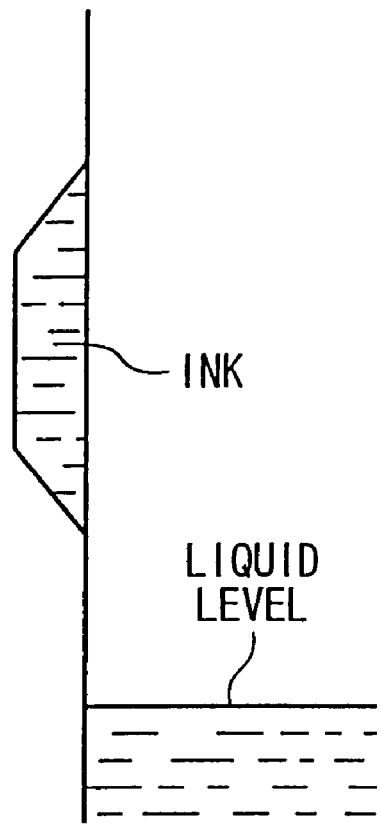
FIGS. 50A and 50B illustrate advantageous aspects obtained when the opening cavities are of a tapered form and of a stepped form, respectively.
Figure 50B:
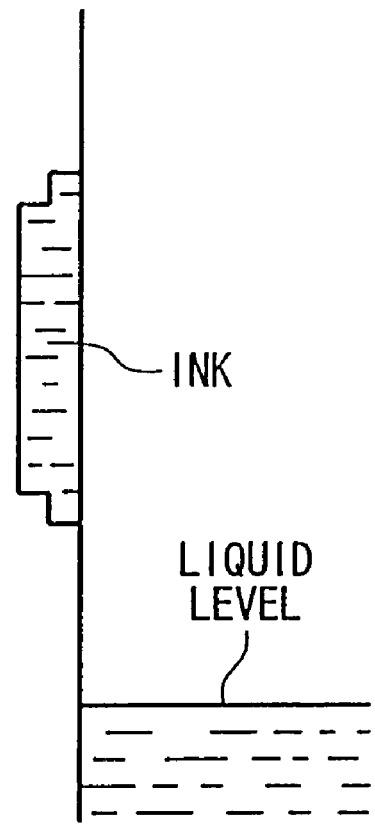

Refer to FIG. 50(*a*) and FIG. 50(*b*). FIG. 50(*a*) shows the cavity which has a tapered shape. FIG. 50(*b*) shows the cavity which has a stepped shape. Both cavities widen toward the inside of the ink container. By these cavity shapes, unnecessary ink is hard to remain around the cavity. That is, because an approximately constant amount of ink only remains in the cavity, the detection having a high reliability becomes possible, and the accuracy of detection can be improved. If the cavity does not have taper shape or stepped shape, there is possibility of remaining unnecessary ink around the cavity by the influence of the surface tension. In this case, there is unevenness in ink holding quantity of the cavity. The unevenness of the ink holding quantity causes the unreliable detection. The present embodiment can avoid these situations and detect the ink consumption reliably.

Figure 51:
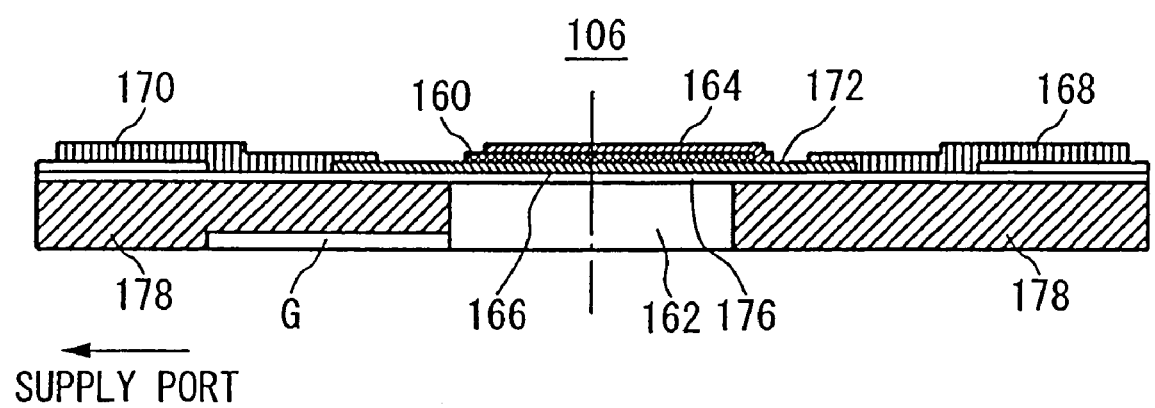
FIG. 51 shows an exemplary communicating groove suitably provided in the periphery of the cavity.

(9) As a suitable applied example of the present embodiment, a communicating groove which communicates with the cavity and extends from the cavity can be provided on the actuator. FIG. 51 shows an example of the communicating groove. The communicating groove G is provided on the part which faces to the inside of the cartridge on the base plate 178. The communicating groove starts from the cavity 162 and extends to halfway of the base plate 178. By providing the communicating groove, ink inside the cavity becomes easy to flow outside, and the ink quantity remained inside the cavity decreases. Therefore, the quantity of unnecessary ink remained around the cavity by the influence of the surface tension can be reduced effectively so that the ink holding quantity becomes stable. Because the change of the residual vibration caused by whether the liquid level pass through the cavity, that is, whether ink is consumed or not becomes even remarkable, the ink consumption can be further reliably detected, and thus the accuracy of detection can be improved. It is preferable to form the communicating groove such that the much more ink can be flow out of the cavity. Moreover, it is preferable to provide the communicating groove toward the supply port of the ink cartridge. The communicating groove extends along the direction from the cavity toward the supply port. By this configuration, the ink inside the cavity can be introduced to the supply port smoothly.

(10) Preferably, the liquid detection device, actuator, is mounted on the ink cartridge as in a shape of mounting module formed together with mounting structure in one body as shown in FIG. 32 and other plurality of figures. By this configuration, the liquid detection device can be protected from outside.

Figure 52:
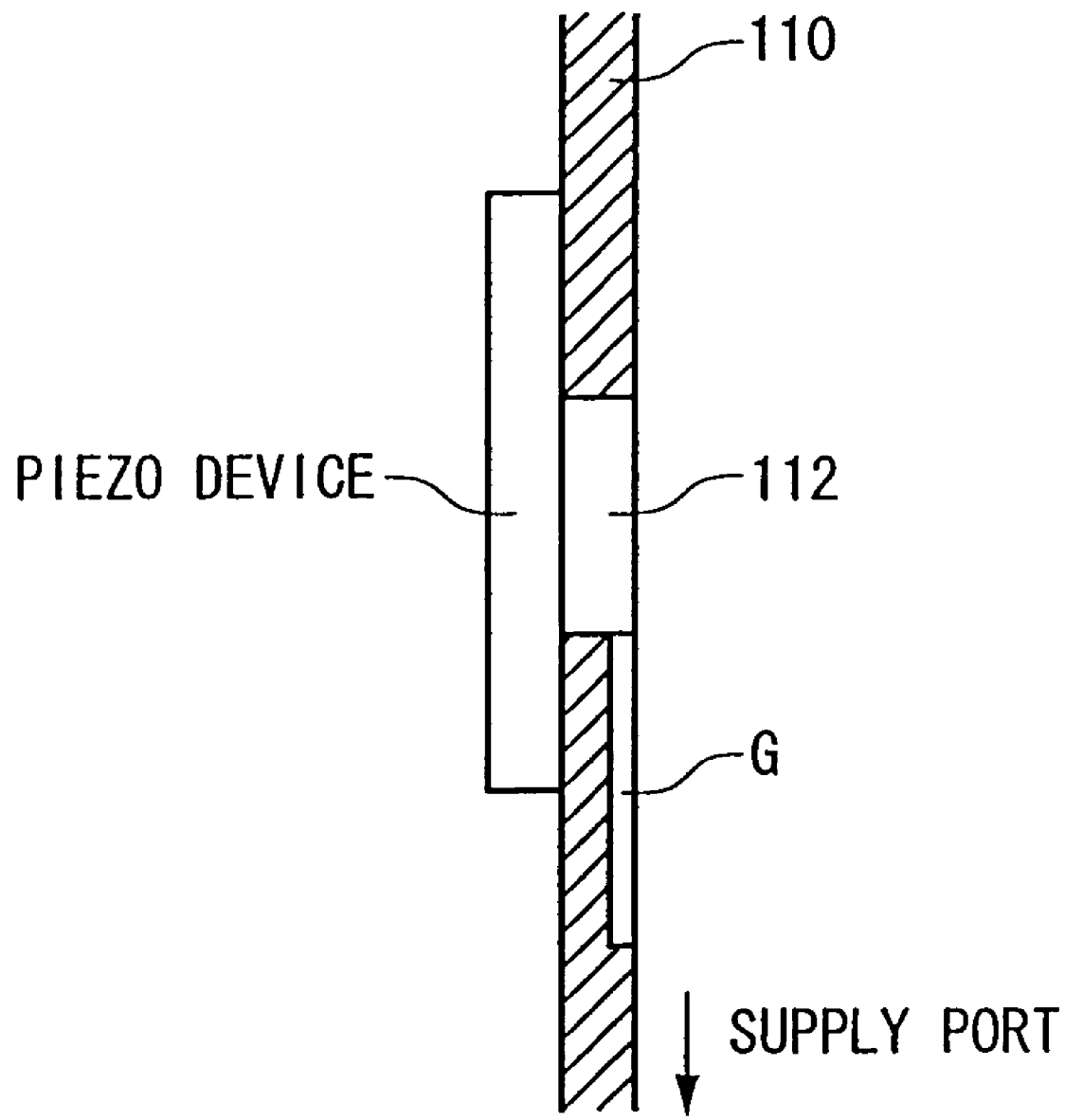
FIG. 52 shows an exemplary communicating groove suitably provided in the periphery of the cavity.

(11) Moreover, as a suitable applied example of the present embodiment, a communicating groove, which communicate with the cavity, is provided such that it extends from the cavity on the location which faces to the inside of the cartridge. An example of the communicating groove is shown in FIG. 52. The communicating groove G starts from the cavity 112 and continues to the halfway of the plate 110. By providing the communicating groove, ink inside the cavity becomes easy to flow outside, and the ink quantity remained inside the cavity decreases. Therefore, the quantity of unnecessary ink remained around the cavity by the influence of the surface tension can be reduced effectively so that the ink holding quantity becomes stable. Because the change of the residual vibration caused by whether the liquid level pass through the cavity, that is, whether ink is consumed or not becomes even remarkable, the ink consumption can be further reliably detected, and thus the accuracy of detection can be improved. It is preferable to form the communicating groove such that the much more ink can be flow out of the cavity. Moreover, it is preferable to provide the communicating groove toward the supply port of the ink cartridge. The communicating groove extends along the direction from the cavity toward the supply port. By this configuration, the ink inside the cavity can be introduced to the supply port smoothly.

Figure 53:
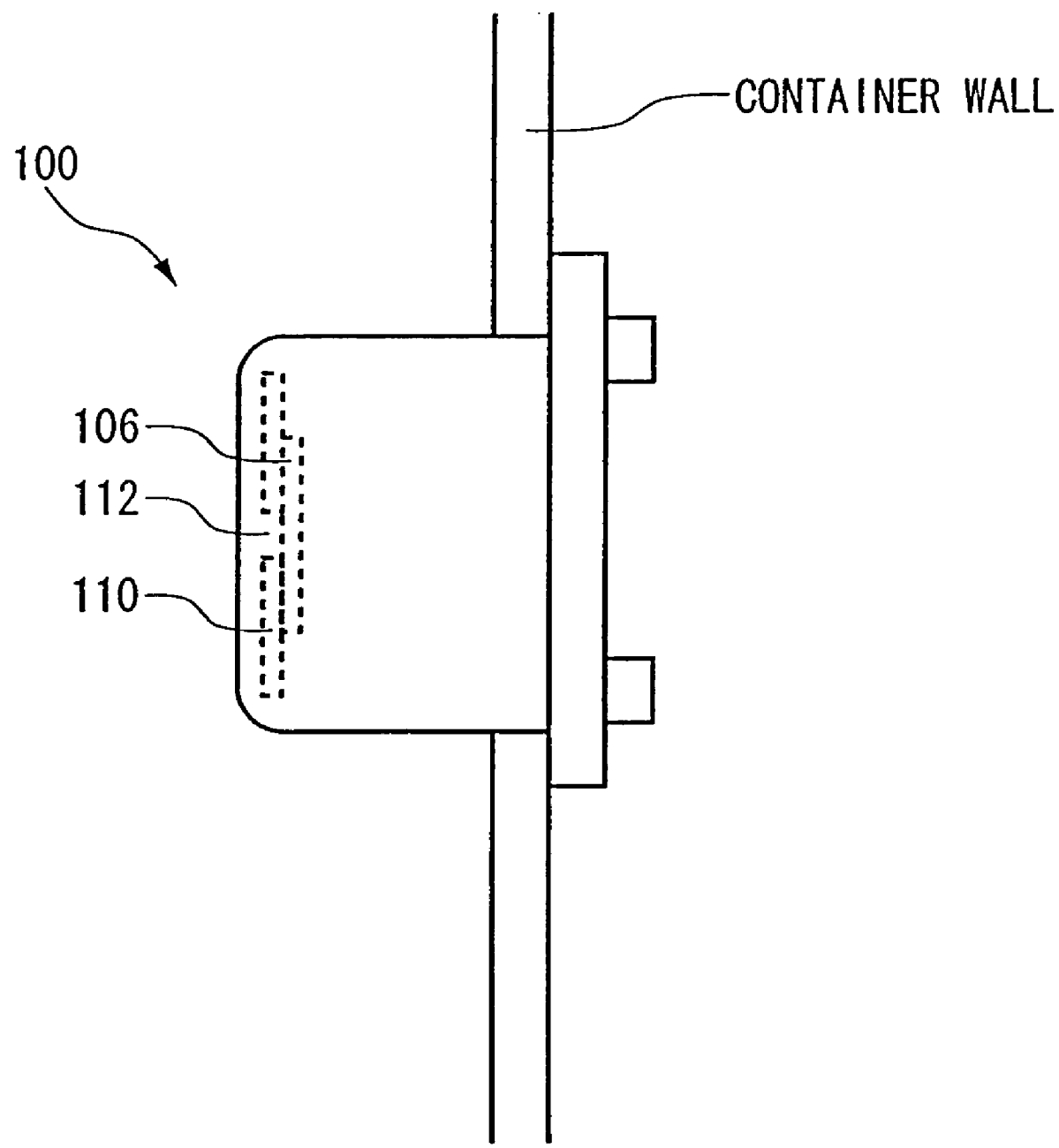
FIG. 53 shows an exemplary structure in which the module is inserted into the through hole of the ink cartridge in a tightly engaged manner.

(12) As a characteristic of the present embodiment, a mounting structure of the module is fit into the through hole provided on the ink cartridge. Refer to FIG. 53, a module 100 shown in FIG. 32 is mounted on the through hole of the cartridge wall. The main body of the module 100 and the hole on the cartridge wall have a same shape so that the module 100 can fit into the through hole 112 without gap. Furthermore, sealing is secured by a flange provided on the end part of the module 100. By adopting this structure, the module can be easily assembled, and also a sensor member having a cavity can be arranged at a suitable position.

(13) Moreover, a concave part, which communicates with the opening cavity of a mounting structure, is formed on the piezoelectric device, or actuator, in the present embodiment. This concave part is a through hole 112 provided on the base plate of the actuator and functions as, or part of, an opening cavity. By this configuration, the opening cavity is arranged nearby the vibrating section of the piezoelectric device, as refer to FIG. 38.

(14) As a suitable embodiment, an opening cavity is provided nearby a liquid absorbing member which absorbs ink inside the cavity. The liquid absorbing member is comprised by the material such as porous member, in short, sponge like member.

Figure 54A:
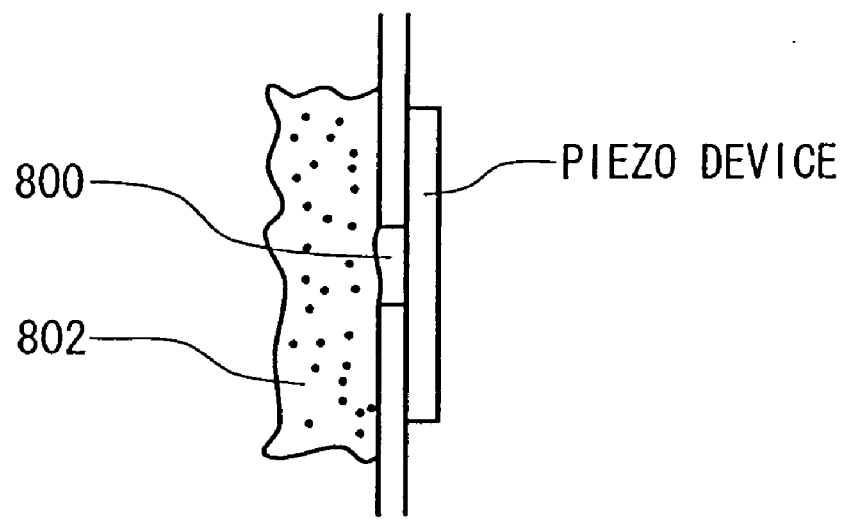
FIGS. 54A and 54B show exemplary structures where the cavity is provided in the close vicinity of the absorbing member.
Figure 54B:
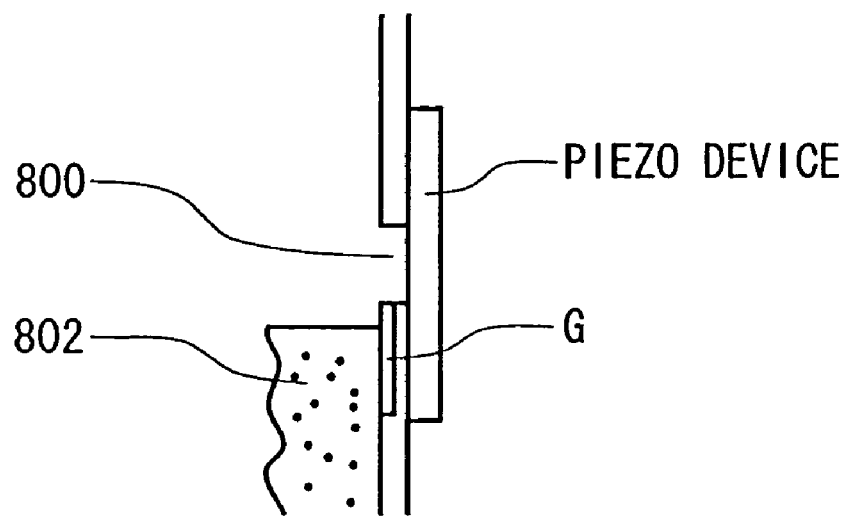

FIG. 54(*a*) and FIG. 54(*b*) shows an example of the structure of which a cavity 800 and an absorbing member 802 are formed nearby. In the former case, the absorbing member 802 directly faces with the cavity 800. In the latter case, the absorbing member 802 is face to the communicating groove G extended from the cavity 800.

By these configurations, unnecessary ink inside the cavity can be absorbed out of the cavity. Therefore, these configuration can prevent the ink remained status to be unstable by the influence of the surface tension. That is, the unevenness of the ink holding quantity in the cavity decreases. The ink inside the cavity can be absorbed completely. Because the detection error caused by the unevenness of the ink holding quantity decreases, the accuracy of detection improves.

Figure 55:
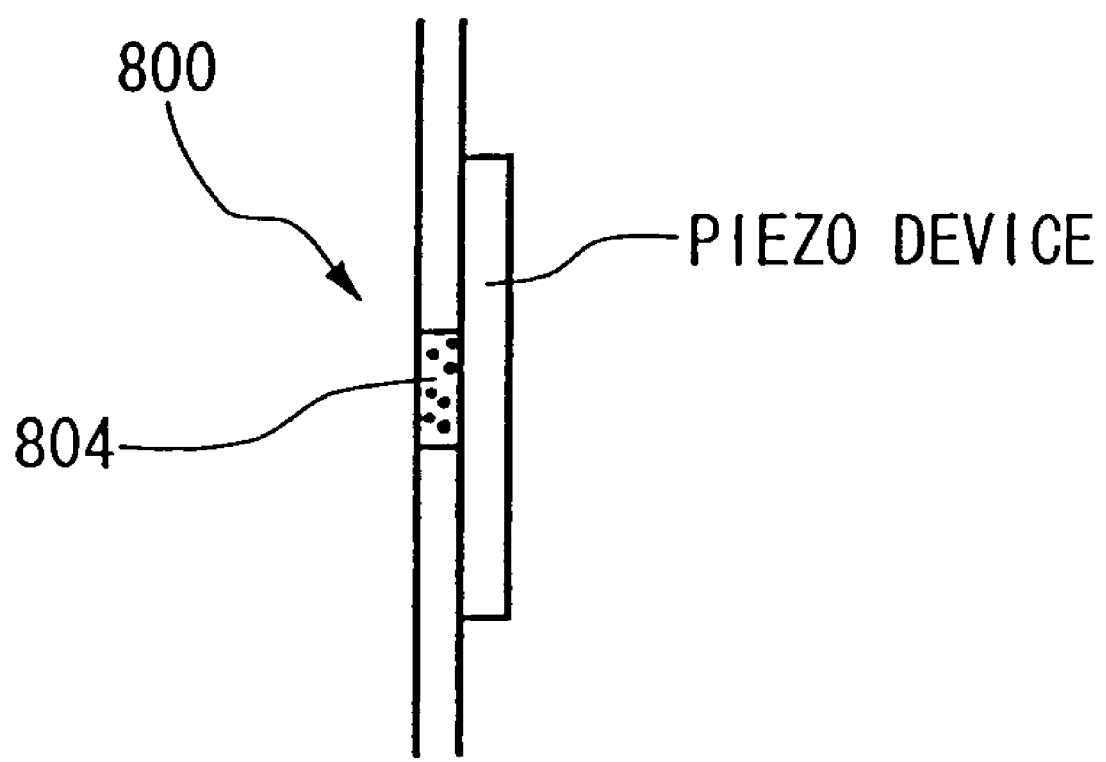
FIG. 55 shows an exemplary structure in which the absorbing member is provided inside the cavity.

(15) As other suitable embodiment, a liquid absorbing member, which holds ink, is provided in the opening cavity. That is, the absorbing member is provided not on outside of the cavity but inside of the cavity. Here also, the liquid absorbing member is constituted by such as porous member, in short, sponge like member. FIG. 55 shows an example of the configuration that provides the absorbing member 804 in the cavity 800.

In this configuration, ink is positively held inside the cavity. The ink holding quantity is determined by a structure and a shape of the absorbing member. If the absorbing member fills the cavity as shown in the figure, ink-holding quantity is determined by the shape of the cavity. The unevenness of the ink holding quantity inside the cavity can be reduced also by this embodiment. Because the detection error caused by the unevenness of the ink holding quantity decreases, the accuracy of detection can be improved.

(16) Preferably, the mounting module is mounted on the ink cartridge such that the mounting module can be attached to and removed from the ink cartridge. Because the sensor can be mounted on the ink cartridge in a form of the mounting module, the mounting of the sensor becomes easy. Because the sensor can be removed by removing the mounting module, recycling of the ink cartridge becomes easy.

(17) The piezoelectric device can be fit into the through hole which is provided on the liquid container. The mounting of the piezoelectric device is easy. As a suitable applied example, the through hole is formed when mounting the piezoelectric device. At this time, the piezoelectric device break through a thin part which is formed on the mounting position of the piezoelectric device on the container wall.

Figure 56:
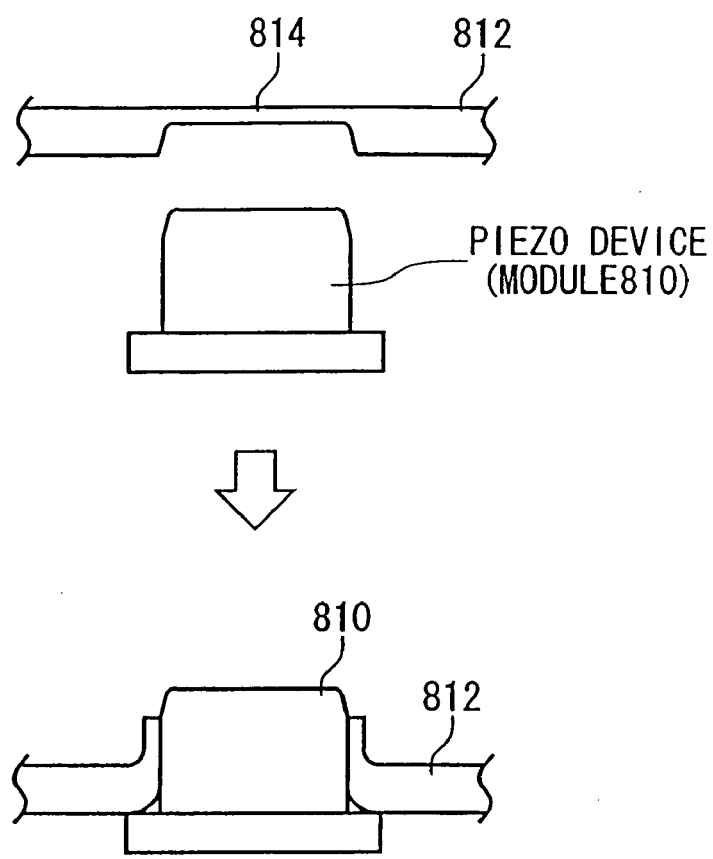
FIG. 56 shows a structure in which the piezoelectric device is mounted by breaking through a thin portion of the container wall.

FIG. 56 shows a status before mounting a mounting module 810 with a piezoelectric device. A thin part 814 is provided on the container wall 812. The thin part 814 is provided on the mounting position of the mounting module 810. If push the mounting module into the container wall 812 to mount the mounting module, or piezoelectric device, the mounting module 810 breaks through the thin part 814. A through hole is formed by this process. The mounting module 810 has close adherence to the through hole. As shown above, according to the present embodiment, the mounting of the mounting module becomes easy, and good sealing condition between the mounting module 810 and the container wall 812 can be obtained.

(18) As a suitable embodiment, an opening cavity is provided nearby a liquid absorbing member which absorbs ink inside the cavity. The liquid body is constituted by such as porous member, in short, sponge like member.

FIG. 13 shows an example of a structure that a cavity and an absorbing member are arranged nearby. In former case, the absorbing member 74 directly faces with the through hole 1c. In latter case, the absorbing member 75 faces to the communicating groove 1h which extends from the cavity 1c.

By this configuration, unnecessary ink can be absorbed out of the cavity. Therefore, this configuration can prevent that the ink remaining status becomes unstable by the influence of such as surface tension. That is, the unevenness of the ink holding quantity inside the cavity is reduced. Ink can be completely absorbed out of the cavity. Because the detection error caused by the unevenness of the ink holding quantity is reduced, the accuracy of detection can be improved.

Figure 57:
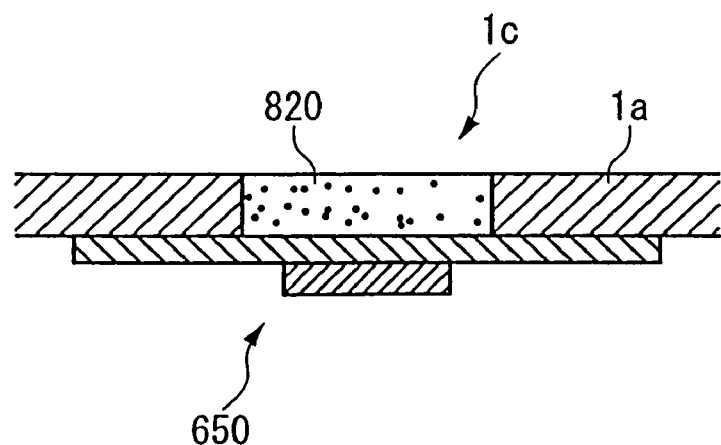
FIG. 57 shows a structure in which the absorbing member is arranged inside the cavity.

(19) As other suitable embodiment, a liquid absorbing member, which holds the liquid inside of the opening cavity, is provided. That is, the absorbing member is provided inside the cavity and not outside the cavity. Here also, the liquid absorbing member is constituted by such as porous member, in short, sponge like member. FIG. 57 shows an example of the configuration that provides the absorbing member 800 in the cavity 1c.

In this configuration, ink is positively held inside the cavity. The ink holding quantity is determined by a structure and a shape of the absorbing member. If the absorbing member fills the cavity as shown in the figure, ink-holding quantity is determined by the shape of the cavity. The unevenness of the ink holding quantity inside the cavity can be reduced also by this embodiment. Because the detection error caused by the unevenness of the ink holding quantity decreases, the accuracy of detection can be improved.

(20) As a suitable embodiment, a piezoelectric device includes a piezoelectric element and a base member, or base plate, on which the piezoelectric element is formed, and the opening cavity is formed on the base member. This kind of piezoelectric device is shown in such as FIG. 20, as an example. Because the cavity is provided directly near to the vibrating section, the advantage of the present embodiment can obtained remarkably. As shown in FIG. 28, the cavity can be provided on both of the base member and the container wall.

(21) As shown in FIG. 32, the piezoelectric device can be mounted by using a mounting module. The mounting module includes a mounting structure, which will be formed together with the piezoelectric device in one body. The mounting structure has a structure that mounts the piezoelectric device on the ink container. The mounting module is mounted on the ink container in one body condition with the piezoelectric device. The cavity is provided on the front side of the mounting module, and the cavity faces to the inside of the container when the mounting module is mounted on the ink container. By this configuration of using the mounting module, the cavity can be arranged inside the container. The piezoelectric device and the cavity can be arranged at the position where can detect the liquid consumption status properly and also can be protected from the outside of the container.

(22) A liquid container was an ink cartridge in the present embodiment. An ink cartridge is one example of the form of an ink container and an ink tank. As it will be explained below that the ink tank does not limited to the type of the cartridge which has been shown above.

There are an on-carriage type ink tank and an off-carriage type ink tank as an ink tank of the ink jet recording apparatus. In the embodiment shown above, the on-carriage type ink cartridge has been mainly explained in the above embodiments. In case of on-carriage type ink cartridge, the cartridge is mounted on a carriage. However, the present invention can also be applied for an off-carriage type ink cartridge, similarly. In this case, the cartridge as an ink tank is provided on the fixed part, such as housing, of the ink jet recording apparatus. A cartridge and a recording head are connected by such as a tube. The piezoelectric device is provided on this fixed cartridge.

Figure 58:
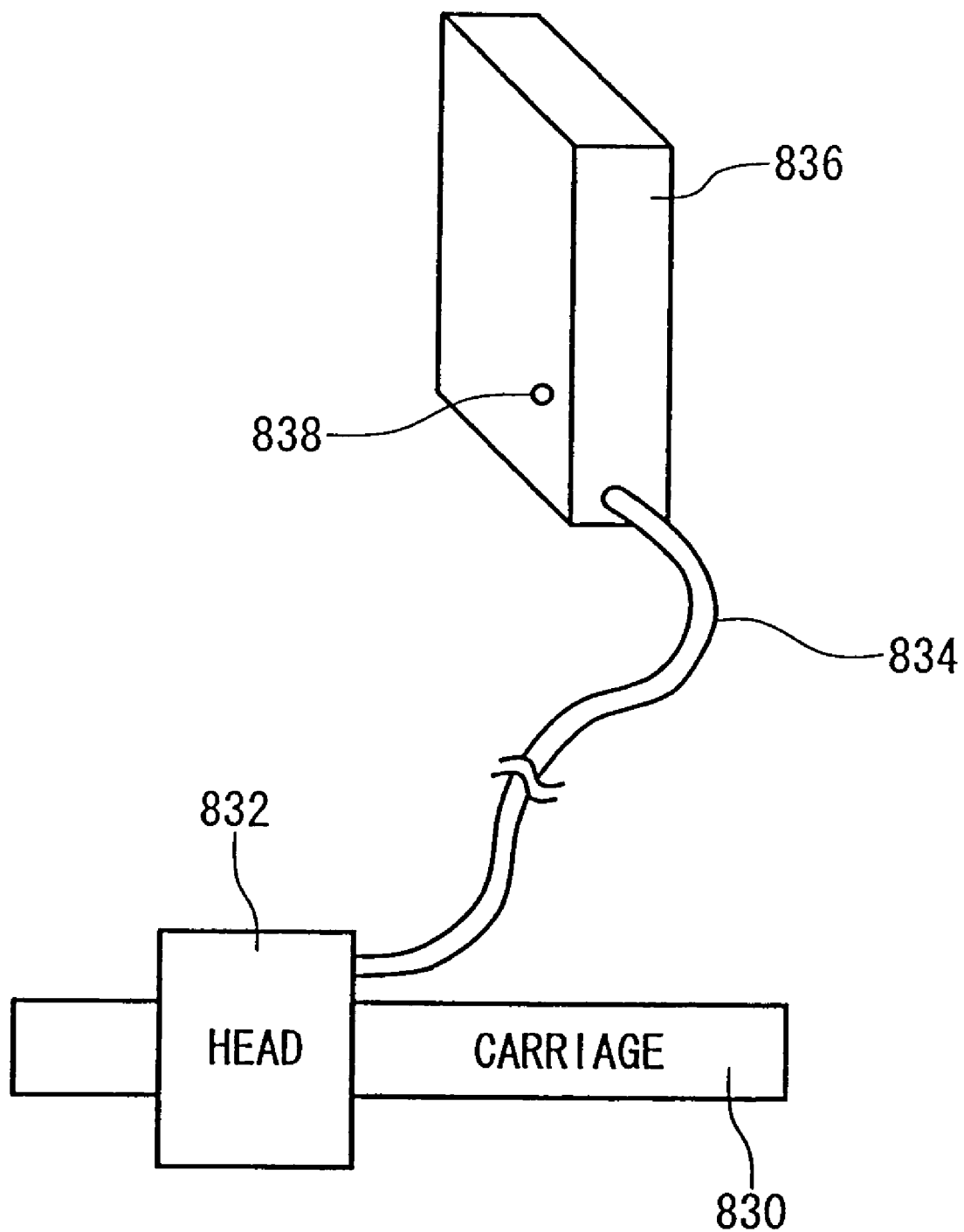
FIG. 58 shows an exemplary structure of a case where the present invention is implemented to an ink cartridge of a off-carriage type.

FIG. 58 shows an example of off-carriage type ink cartridge. A head 832 is mounted on the carriage 830. The head 832 is connected to an ink cartridge 836 through a tube 834. The ink cartridge 836 is fixed to a suitable mounting position in the ink jet recording apparatus, not shown in the figure. The mounting position can be movable. The ink cartridge 836 comprises the piezoelectric device 838 and further has an opening cavity which faces to the piezoelectric device 838.

Furthermore, in the embodiment explained above, a sub tank is provided nearby the recording head, and the sub tank communicates with the ink cartridge which is possible to be exchange. The sub tank is shown in FIG. 3 and FIG. 4 in reference number 33. This sub tank also functions as an ink tank. Therefore, the piezoelectric device can be mounted on the sub tank. An opening cavity is provided on the piezoelectric device. This variation can be applied for the both configurations of the on-carriage type and the off-carriage type.

(23) Moreover, the ink tank includes a partition member which divides the inside of the tank to a plurality of chambers, and a plurality of piezoelectric devices can be provided to each of these plurality of chambers. This embodiment is shown in such as FIG. 2 and is suitable for color printer. Ink consumption status for plurality of colors of ink, each of which is filled in each of plurality of chambers, can be individually detected. An opening cavity is provided on the corresponding piezoelectric device of each chamber.

Although the present invention has been described with reference to specific embodiments, the scope of the present invention is not limited to these embodiments. Those skilled in the art can make various modifications and improvements to these embodiments of the present invention. It is clear from the appended claims that such modifications or improvements are also covered by the scope of the present invention.

For example, the liquid container is not limited to an ink cartridge. The present invention can be applied to an ink tank for a printer other than an ink cartridge. Furthermore, the present invention can be applied to the container which contains liquid other than ink.

Moreover, the liquid detecting device does not have to generate a vibration by itself. That is, the liquid detecting device does not have to perform both of the oscillation and the output of the residual vibration status. For example, after the other actuator generates the vibration, the vibration status of the liquid detecting device is detected. As another embodiment, if the piezoelectric element vibrates by the vibration generated in the ink cartridge caused by the carriage movement, the vibration of the piezoelectric element is detected. That is, without positively generates the vibration but using the vibration generated naturally by the operation of the printer, the ink consumption is detected. On the other hand, opposite to the above-varied example, the liquid detecting device can just shoot the vibration. In this case, the vibration status of other sensor can be obtained.

The above varied example can be applied similarly to the other detecting function which use a piezoelectric element, for example, the detecting function that uses an elastic wave and reflected wave. That is, the piezoelectric element can be used for either one of the generating of vibration or the detection.

As explained above, according to the present invention, the ability of detecting the liquid consumption status can be improved by providing the opening cavity in the liquid detecting device. Moreover, according to the present invention, the ability of detecting the liquid consumption status can be improved by providing the opening cavity on the mounting module which is for mounting the piezoelectric device on the liquid container. Furthermore, according to the present invention, the ability of detecting the liquid consumption status can be improved by providing the opening cavity on the liquid container on which the piezoelectric device is mounted.

What is claimed is:

1. A liquid detection device attached on a liquid container for detecting a liquid consumption status of the liquid contained in the liquid container, the liquid detection device comprising:
   a vibrating section symmetrical about a center thereof;
   a piezoelectric element;
   a vibrating plate on which said piezoelectric element is mounted, said vibrating plate including a vibrating region having an upper surface and a lower surface, a part of said lower surface contacting the liquid contained in the liquid container when the detection device is mounted on the liquid container;
   an upper electrode disposed on an upper surface of said piezoelectric element and extending from said vibrating region of said vibrating plate towards the outside of said vibrating region;
   a lower electrode disposed on a lower surface of said piezoelectric element and extending from said vibrating region of said vibrating plate towards the outside of said vibrating region, said lower electrode extending substantially on the same plane as said upper electrode extends on; and
   a base member on which said vibrating section and said upper and lower electrode are disposed, said base member comprising a cavity formed at a position facing said vibrating section, said cavity contacting the liquid contained in said liquid container when the detection device is mounted on the liquid container.

2. A liquid container comprising:
   a housing containing therein liquid;
   a liquid supply opening formed in said housing; and
   a liquid detection device attached on said housing, comprising:
   a piezoelectric layer having a main portion, said main portion comprising a first surface and a second surface opposite to said first surface;
   a vibrating plate on which said piezoelectric layer is mounted, said vibrating plate including a vibrating region having a first surface and a second surface, a part of said second surface contacting the liquid contained in the liquid container;
   a first electrode contacting said first surface of said main portion of said piezoelectric layer and connecting to an external apparatus, said first electrode extending from said vibrating region of said vibrating plate towards an outside of said vibrating region;
   a second electrode having a first surface and a second surface and connecting to the external apparatus, said first surface contacting said second surface of said main portion of said piezoelectric layer, said second electrode extending from said vibrating region of said vibrating plate towards the outside of said vibrating region, said second electrode extending substantially on the same plane as said first electrode extends on; and
   a base member on which said vibrating plate and said first and second electrode are disposed, said base member comprising a cavity formed at a position facing said vibrating region of said vibrating plate, said cavity contacting the liquid contained in said liquid container.

3. A module for detecting a liquid consumption status of a liquid contained in a liquid container, comprising:
   a liquid detection device attached on said housing, comprising;
   a piezoelectric layer having a main portion, said main portion comprising a first surface and a second surface opposite to said first surface;
   a vibrating plate on which said piezoelectric layer is mounted, said vibrating plate including a vibrating region having a first surface and a second surface, a part of said second surface contacting the liquid contained in the liquid container when the module is mounted on the liquid container;
   a first electrode contacting said first surface of said main portion of said piezoelectric layer and connecting to an external apparatus, said first electrode extending from said vibrating region of said vibrating plate towards an outside of said vibrating region;
   a second electrode having a first surface and a second surface and connecting to the external apparatus, said first surface contacting said second surface of said main portion of said piezoelectric layer, said second electrode extending from said vibrating region of said vibrating plate towards the outside of said vibrating region, said second electrode extending substantially on the same plane as said first electrode extends on; and a base member on which said vibrating plate and said first and second electrode are disposed, said base member comprising a cavity formed at a position facing said vibrating section, said cavity contacting the liquid contained in said liquid container.

4. A liquid detection device attached on a liquid container for detecting a liquid consumption status of the liquid contained in the liquid container, the liquid detection device comprising:

a piezoelectric layer having a main portion, said main portion comprising a first surface and a second surface opposite to said first surface;

a vibrating plate on which said piezoelectric layer is mounted, said vibrating plate including a vibration region having a first surface and a second surface, a part of said second surface contacting the liquid contained in the liquid container;

a first electrode contacting said first surface of said main portion of said piezoelectric layer and connecting to an external apparatus, said first electrode extending from said vibrating region of said vibrating plate towards an outside of said vibrating region;

a second electrode having a first surface and a second surface and connecting to the external apparatus, said first surface contacting said second surface of said main portion of said piezoelectric layer, said second electrode extending from said vibrating region of said vibrating plate towards the outside of said vibrating region, said second electrode extending substantially on the same plane as said first electrode extends on, and a base member on which said vibrating plate and said first and second electrodes are disposed, said base member comprising a cavity formed at a position facing said vibrating section, said cavity contacting the liquid contained in said liquid container.

5. The liquid detection device as claimed in claim 4, further comprising a first conductive member connecting to said first electrode of said main portion of said piezoelectric layer and a second conductive member connecting to said second electrode of said main portion of said piezoelectric layer, said first conductive member extending from a plane of said first electrode at a certain angle and said second conductive member extending from a plane of said second electrode substantially in the same direction of the first conductive member.

6. The liquid detection device as claimed in claim 5, wherein said first conductive member and said second conductive member extend in a direction away from the liquid container.

7. The liquid detection device as claimed in claim 4, further comprising a base plate which supports one of said first electrode and said second electrode, and said base plate having a compliance at least a part thereof which is smaller than that of said vibrating plate.

8. The liquid container as claimed in claim 2, further comprising a first conductive member connecting to said first electrode of said main portion of said piezoelectric layer and a second conductive member connecting to said second electrode of said main portion of said piezoelectric layer, said first conductive member extending from a plane of said first electrode at a certain angle and said second conductive member extending from a plane of said second electrode substantially in the same direction of the first conductive member.

9. The liquid container as claimed in claim 2, wherein said first conductive member and said second conductive member extend in a direction away from the liquid container.

10. The liquid container as claimed in claim 2, wherein said liquid detection device further comprises a base plate attached to one of said first electrode and said second electrode, and said base plate has a compliance at least a part thereof which is smaller than that of said vibrating plate.

11. The module claimed in claim 3, further comprising a first conductive member connecting to said first electrode of said main portion of said piezoelectric layer and a second conductive member connecting to said second electrode of said main portion of said piezoelectric layer, said first conductive member extending from a plane of said first electrode at a certain angle and said second conductive member extending from a plane of said second electrode substantially in the same direction of the first conductive member.

12. The module as claimed in claim 3, wherein said first conductive member and said second conductive member extend in a direction away from the liquid container.

13. The module as claimed in claim 3, wherein said liquid detection device further comprises a base plate attached to one of said first electrode and said second electrode, and said base plate has a compliance at least a part thereof which is smaller than that of said vibrating plate.

14. The liquid detection device as claimed in claim 4, wherein said first electrode and said second electrode are disposed on substantially opposite sides of said piezoelectric layer.

15. The liquid detection device as claimed in claim 14, wherein both said first and second electrodes are directly mounted on said piezoelectric layer.

16. The liquid detection device as claimed in claim 4, wherein said vibrating plate comprises a cavity facing the liquid in the liquid container, said cavity comprising an inner wall which is symmetrical in cross-section.

17. A liquid detection device attached on a liquid container for detecting a liquid consumption status of the liquid contained in the liquid container, the liquid detection device comprising:

a vibrating section symmetrical about a center thereof;

a piezoelectric element;

a vibrating plate which mounts thereon said piezoelectric element, said vibrating plate including a vibrating region, a part of said vibrating region contacting the liquid contained in the liquid container;

an upper electrode disposed on an upper surface of said piezoelectric element and said vibrating plate, said upper electrode comprising an upper terminal forming member formed on said vibrating plate at a position outside said vibrating region thereof;

a lower electrode disposed on a lower surface of said piezoelectric element and said vibrating plate, said lower electrode comprising a lower terminal forming member formed on said vibrating plate at a position outside said vibrating region thereof; and a base member on which said vibrating section and said first and second electrodes are disposed, said base member comprising a cavity formed at a position facing said vibrating section, said cavity contacting the liquid contained in said liquid container.

18. A liquid detection device as claimed in claim 17, further comprising a base plate disposed on the lower surface of said vibrating plate, said base plate comprising a cavity formed at a position corresponding to said vibrating region.

19. A module for detecting a liquid consumption status of a liquid contained in a liquid container, comprising:
a liquid detection device attached on said housing, comprising;
a piezoelectric layer having a main portion, said main portion comprising a first surface and a second surface opposite to said first surface;
a vibrating plate which mounts thereon said piezoelectric element, said vibrating plate including a vibrating region having an upper surface and a lower surface, a part of said lower surface contacting the liquid contained in the liquid container when the module is mounted on the liquid container;
a first electrode contacting said first surface of said main portion of said piezoelectric layer and connecting to an external apparatus, said first electrode comprising a first terminal forming member formed on said vibrating plate at a position outside said vibrating region thereof;
a second electrode having a first surface and a second surface and connecting to the external apparatus, said first surface contacting said second surface of said main portion of said piezoelectric layer, said second electrode comprising a second terminal forming member formed on said vibrating plate at a position outside said vibrating region thereof;
a mounting structure formed integrally with said liquid detection device for mounting said liquid detection device onto the liquid container; and
a base member on which said vibrating plate and said first and second electrodes are disposed, said base member comprising a cavity formed at a position facing said vibrating section, said cavity contacting the liquid contained in said liquid container.

20. A module as claimed in claim 19, wherein said liquid detection device further comprising a base plate disposed on the lower surface of said vibrating plate, said base plate comprising a cavity formed at a position corresponding to said vibrating region.

21. A liquid detection device attached on a liquid container for detecting a liquid consumption status of the liquid contained in the liquid container, the liquid detection device comprising:
a piezoelectric layer having a main portion, said main portion comprising a first surface and a second surface opposite to said first surface;
a vibrating plate which mounts thereon said piezoelectric element, said vibrating plate including a vibrating region having an upper surface and a lower surface, a part of said lower surface contacting the liquid contained in the liquid container;
a first electrode contacting said first surface of said main portion of said piezoelectric layer and connecting to an external apparatus, said first electrode comprising a first terminal forming member formed on said vibrating plate at a position outside said vibrating region thereof;
a second electrode having a first surface and a second surface and connecting to the external apparatus, said first surface contacting said second surface of said main portion of said piezoelectric layer, said second electrode comprising a second terminal forming member formed on said vibrating plate at a position outside said vibrating region thereof; and
a base member on which said vibrating plate and said first and second electrodes are disposed, said base member comprising a cavity formed at a position facing said vibrating section, said cavity contacting the liquid contained in said liquid container.

22. A liquid detection device as claimed in claim 21, further comprising a base plate disposed on the lower surface of said vibrating plate, said base plate comprising a cavity formed at a position corresponding to said vibrating region.

23. A liquid detection device according to claim 1, wherein said upper electrode comprises an upper terminal forming member formed on said vibrating plate at a position outside said vibrating region thereof, and said lower electrode comprises a lower terminal forming member formed on said vibrating plate at a position outside said vibrating region thereof.

24. A module according to claim 3, wherein said first electrode comprises a first terminal forming member formed on said vibrating plate at a position outside said vibrating region thereof, and said second electrode comprises a second terminal forming member formed on said vibrating plate at a position outside said vibrating region thereof.

25. A liquid detection device according to claim 4, wherein said first electrode comprises a first terminal forming member formed on said vibrating plate at a position outside said vibrating region thereof, and said second electrode comprises a second terminal forming member formed on said vibrating plate at a position outside said vibrating region thereof.

26. A liquid detection device attached on a liquid container for detecting a liquid consumption status of the liquid contained in the liquid container, the liquid detection device comprising:
a piezoelectric element comprising a vibrating section;
a vibrating plate on which said piezoelectric element is mounted, said vibrating plate including a vibrating region facing said vibrating section of said piezoelectric element and having an upper surface and a lower surface, a part of said lower surface contacting the liquid contained in the liquid container when the detection device is mounted on the liquid container;
an upper electrode disposed on an upper surface of said piezoelectric element and extending from said vibrating region of said vibrating plate towards the outside of said vibrating region; and
a lower electrode disposed on a lower surface of said piezoelectric element and extending from said vibrating region of said vibrating plate towards the outside of said vibrating region, said lower electrode extending substantially on the same plane as said upper electrode extends on.

27. The liquid detection device according to claim 26, further comprising a first conductive member connecting to said upper electrode and a second conductive member connecting to said lower electrode, wherein said upper electrode extends substantially on the same plane as said first conductive member extends on, and said lower electrode extends substantially on the same plane as said second conductive member extends on.

28. The liquid detection device according to claim 27, wherein said first conductive member and said second conductive member extend substantially on the same plane as each other.

29. The liquid detection device according to claim 26, further comprising a base plate attached to said vibrating plate and having a compliance at least a part thereof which is smaller than that of said vibrating plate.

30. The liquid detection device according to claim 26, wherein said base member having an upper surface contacting said lower surface of said vibrating plate and a lower surface contacting the liquid contained in the liquid container, said base member comprising a cavity which contacts the liquid contained in the liquid container.

31. The liquid detection device according to claim 30, further comprising a cavity formed in said base plate and a groove formed in said base member and connecting with said cavity.

32. The liquid detection device according to claim 26, wherein said upper electrode and said lower electrode are disposed on substantially opposite sides with respect to said piezoelectric element.

33. The liquid detection device according to claim 26, wherein both said upper and lower electrodes are directly mounted on said piezoelectric element.

34. The liquid detection device according to claim 26, wherein said vibrating plate comprises a cavity facing the liquid in the liquid container, said cavity comprising an inner wall which is symmetrical in cross-section.

35. The liquid detection device according to claim 34, wherein a node of vibration of said vibrating section locates in the vicinity of a periphery of said cavity.

36. The liquid detection device according to claim 34, wherein a ratio of a radius of said cavity with a depth thereof is larger than $\pi/8$.

37. The liquid detection device according to claim 34, wherein the peripheral surface of said cavity is tapered.

38. The liquid detection device according to claim 34, wherein the peripheral surface of said cavity is stepped.

39. The liquid detection device according to claim 26, wherein the liquid detection device detects a liquid consumption status on the basis of a change in an acoustic impedance around said vibrating region.

40. The liquid detection device according to claim 26, wherein the liquid detection device detects a liquid consumption status on the basis of a change in a residual vibration around said vibrating region.

41. The liquid detection device according to claim 26, wherein the liquid detection device detects a liquid consumption status on the basis of a change in a resonant frequency around said vibrating region.

42. The liquid detection device according to claim 26, wherein at said vibrating region said piezoelectric element covers said lower electrode, said upper electrode covers said lower electrode, and said piezoelectric element is larger in area than said upper electrode.

43. The liquid detection device according to claim 26, wherein an area of a part of said piezoelectric element which generates a piezoelectric effect is substantially the same as an area of said lower electrode.

44. A module for detecting a liquid consumption status of liquid contained in a liquid container, comprising:
a liquid detection device comprising:
a piezoelectric element comprising a vibrating section;
a vibrating plate on which said piezoelectric element is mounted, said vibrating plate including a vibrating region facing said vibrating section of said piezoelectric element and having an upper surface and a lower surface, a part of said lower surface contacting the liquid contained in the liquid container when the detection device is mounted on the liquid container;
an upper electrode disposed on an upper surface of said piezoelectric element and extending from said vibrating region of said vibrating plate towards the outside of said vibrating region; and
a lower electrode disposed on a lower surface of said piezoelectric element and extending from said vibrating region of said vibrating plate towards the outside of said vibrating region, said lower electrode extending substantially on the same plane as said upper electrode extends on, and
a mounting section formed integrally with said liquid detection device and attached on the liquid container.

45. The module according to claim 44, wherein said liquid detection device further comprises a first conductive member connecting to said upper electrode and a second conductive member connecting to said lower electrode, said first conductive member extending from a plane of said upper electrode at a certain angle and said second conductive member extending from a plane of said lower electrode substantially in the same direction of the first conductive member.

46. The module according to claim 45, wherein said first conductive member and said second conductive member extend in a direction away from the liquid container.

47. The module according to claim 44, further comprising a mounting element having an upper surface contacting said lower surface of said vibrating plate and a lower surface facing inside the liquid container, said mounting element comprising an opening corresponding to a center of said vibrating section.

48. A liquid container comprising:
a housing containing therein liquid;
a liquid supply opening formed in said housing; and
a liquid detection device attached on said housing, comprising:
a piezoelectric element comprising a vibrating section;
a vibrating plate on which said piezoelectric element is mounted, said vibrating plate including a vibrating region facing said vibrating section of said piezoelectric element and having an upper surface and a lower surface, a part of said lower surface contacting the liquid contained in the liquid container when the detection device is mounted on the liquid container;
an upper electrode disposed on an upper surface of said piezoelectric element and extending from said vibrating region of said vibrating plate towards the outside of said vibrating region; and
a lower electrode disposed on a lower surface of said piezoelectric element and extending from said vibrating region of said vibrating plate towards the outside of said vibrating region, said lower electrode extending substantially on the same plane as said upper electrode extends on.

49. The liquid container according to claim 48, wherein at least said vibrating region of said liquid detection device is disposed on a plane which is inclined with respect to the liquid level contained in said housing.

50. The liquid container according to claim 48, further comprising a cavity formed in a wall of said housing at a position facing said vibrating section, said cavity contacting the liquid contained in said liquid container.

51. The liquid container according to claim 48, wherein said liquid detection device is disposed at a corner part of said housing.

52. The liquid container according to claim 48, further comprising a base member attached to said vibrating plate, said base member comprising a cavity formed at a position facing said vibrating section, said cavity contacting the liquid contained in said liquid container.

53. A liquid detection device attached on a liquid container for detecting a liquid consumption status of the liquid contained in the liquid container, the liquid detection device comprising:

a piezoelectric layer having a main portion, said main portion comprising a first surface and a second surface opposite to said first surface;

a vibrating plate on which said piezoelectric layer is mounted, said vibrating plate including a vibrating region having a first surface and a second surface, a part of said second surface contacting the liquid contained in the liquid container;

a first electrode contacting said first surface of said main portion of said piezoelectric layer and connecting to a first electrode terminal, said first electrode extending from said vibrating region of said vibrating plate towards an outside of said vibrating region through said first electrode terminal; and a second electrode having a first surface and a second surface and connecting to a second electrode terminal, said first surface contacting said second surface of said main portion of said piezoelectric layer, said second electrode extending from said vibrating region of said vibrating plate towards the outside of said vibrating region through said second electrode terminal, said second electrode extending substantially on the same plane as said first electrode extends on.

54. A liquid detection device according to claim 53, wherein said first electrode extends substantially on the same plane as said first electrode terminal extends on, and said second electrode extends substantially on the same plane as said second electrode terminal extends on.

55. A liquid detection device according to claim 54, wherein said first electrode terminal and said second electrode terminal extend substantially on the same plane as each other.

56. The liquid detection device according to claim 53, further comprising a base member attached to said vibrating plate and having a compliance at least a part thereof which is smaller than that of said vibrating plate.

57. The liquid detection device according to claim 53, wherein said base member comprising an upper surface contacting said lower surface of said vibrating plate and a lower surface contacting the liquid contained in the liquid container, said base member comprising a cavity which contacts the liquid contained in the liquid container.

58. A module for detecting a liquid consumption status of a liquid contained in a liquid container, comprising:

a liquid detection device, comprising:

a piezoelectric layer having a main portion, said main portion comprising a first surface and a second surface opposite to said first surface;

a vibrating plate on which said piezoelectric layer is mounted, said vibrating plate including a vibrating region having a first surface and a second surface, a part of said second surface contacting the liquid contained in the liquid container;

a first electrode contacting said first surface of said main portion of said piezoelectric layer and connecting to a first conductive member, said first electrode extending from said vibrating region of said vibrating plate towards an outside of said vibrating region through said first electrode terminal; and a second electrode having a first surface and a second surface and connecting to a second conductive member, said first surface contacting said second surface of said main portion of said piezoelectric layer, said second electrode extending from said vibrating region of said vibrating plate towards the outside of said vibrating region through said second electrode terminal, said second electrode extending substantially on the same plane as said first electrode extends on, and a mounting section formed integrally with said liquid detection device and attached on the liquid container.

59. The module according to claim 58, wherein said first conductive member extends from a plane of said first electrode at a certain angle and said second conductive member extending from a plane of said second electrode substantially in the same direction of the first conductive member.

60. A liquid container comprising:

a housing containing therein liquid;

a liquid supply opening formed in said housing; and a liquid detection device attached on said housing, comprising:

a piezoelectric layer having a main portion, said main portion comprising a first surface and a second surface opposite to said first surface;

a vibrating plate on which said piezoelectric layer is mounted, said vibrating plate including a vibrating region having a first surface and a second surface, a part of said second surface contacting the liquid contained in the liquid container;

a first electrode contacting said first surface of said main portion of said piezoelectric layer and connecting to a first electrode terminal, said first electrode extending from said vibrating region of said vibrating plate towards an outside of said vibrating region through said first electrode terminal; and a second electrode having a first surface and a second surface and connecting to a second electrode terminal, said first surface contacting said second surface of said main portion of said piezoelectric layer, said second electrode extending from said vibrating region of said vibrating plate towards the outside of said vibrating region through said second electrode terminal, said second electrode extending substantially on the same plane as said first electrode extends on.

61. A liquid detection device attached on a liquid container for detecting a liquid consumption status of the liquid contained in the liquid container, the liquid detection device comprising:

a piezoelectric element comprising a vibrating section;

a vibrating plate which mounts thereon said piezoelectric element, said vibrating plate including a vibrating region facing said vibrating section of said piezoelectric element, a part of said vibrating region contacting the liquid contained in the liquid container;

an upper electrode disposed on an upper surface of said piezoelectric element and said vibrating plate, said upper electrode comprising an upper terminal forming member formed on said vibrating plate at a position outside of said vibrating region thereof; and a lower electrode disposed on a lower surface of said piezoelectric element and said vibrating plate, said lower electrode comprising a lower terminal forming member formed on said vibrating plate at a position outside said vibrating region thereof.

62. The liquid detection device according to claim 61, wherein said upper electrode comprises a main portion facing said vibrating region of said vibrating plate and an extension extending from said main portion toward the outside of said vibrating region, said extension connecting to said upper terminal forming member at the position outside of said vibrating region, and wherein said lower electrode comprises a main portion facing said vibrating region of said vibrating plate and an extension extending from said main portion to the outside of said vibrating region, said extension connecting to said lower terminal forming member at the position outside of said vibrating region.

63. The liquid detection device according to claim 61, further comprising a base member attached to said vibrating plate and having a compliance at least a part thereof which is smaller than that of said vibrating plate.

64. The liquid detection device according to claim 63, wherein said base member having an upper surface contacting said lower surface of said vibrating plate and a lower surface contacting the liquid contained in the liquid container, said base member comprising a cavity which contacts the liquid contained in the liquid container.

65. The liquid detection device according to claim 63, wherein said base supports said extensions and at least a part of said upper and lower terminal forming members of both said upper and lower electrodes.

66. A module for detecting a liquid consumption status of liquid contained in a liquid container, the module comprising:

a liquid detection device comprising:
  a piezoelectric element comprising a vibrating section;
  a vibrating plate which mounts thereon said piezoelectric element, said vibrating plate including a vibrating region facing said vibrating section of said piezoelectric element, a part of said vibrating region contacting the liquid contained in the liquid container;
  an upper electrode disposed on an upper surface of said piezoelectric element and said vibrating plate, said upper electrode comprising an upper terminal forming member formed on said vibrating plate at a position outside of said vibrating region thereof; and
  a lower electrode disposed on a lower surface of said piezoelectric element and said vibrating plate, said lower electrode comprising a lower terminal forming member formed on said vibrating plate at a position outside said vibrating region thereof, and a mounting section formed integrally with said liquid detection device and attached on the liquid container.

67. A liquid container comprising:

a housing containing therein liquid;

a liquid supply opening formed in said housing; and a liquid detection device attached on a liquid container for detecting a liquid consumption status of the liquid contained in the liquid container, the liquid detection device comprising:
  a piezoelectric element comprising a vibrating section;
  a vibrating plate which mounts thereon said piezoelectric element, said vibrating plate including a vibrating region facing said vibrating section of said piezoelectric element, a part of said vibrating region contacting the liquid contained in the liquid container;
  an upper electrode disposed on an upper surface of said piezoelectric element and said vibrating plate, said upper electrode comprising an upper terminal forming member formed on said vibrating plate at a position outside of said vibrating region thereof; and
  a lower electrode disposed on a lower surface of said piezoelectric element and said vibrating plate, said lower electrode comprising a lower terminal forming member formed on said vibrating plate at a position outside said vibrating region thereof.

* * * * *